US011022813B2

(12) United States Patent
Ma

(10) Patent No.: US 11,022,813 B2
(45) Date of Patent: Jun. 1, 2021

(54) MULTIFUNCTION LIGHT PROJECTOR WITH MULTISTAGE ADJUSTABLE DIFFRACTIVE OPTICAL ELEMENTS

(71) Applicant: QUALCOMM Incorporated, San Diego, CA (US)

(72) Inventor: Jian Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/378,255

(22) Filed: Apr. 8, 2019

(65) Prior Publication Data

US 2020/0319474 A1 Oct. 8, 2020

(51) Int. Cl.
*G03B 21/00* (2006.01)
*G02B 27/42* (2006.01)
(Continued)

(52) U.S. Cl.
CPC ........ *G02B 27/4205* (2013.01); *G01S 7/4814* (2013.01); *G02B 5/3083* (2013.01)

(58) Field of Classification Search
CPC .............. G02B 27/0944; G02B 27/095; G02B 27/0977; G02F 21/133502; G03B 21/00; G03B 21/2006
See application file for complete search history.

(56) References Cited

U.S. PATENT DOCUMENTS 9,325,973 B1    4/2016 Hazeghi et al.
10,678,053 B2 *  6/2020 Waldern ............... G02B 5/1828
(Continued)

FOREIGN PATENT DOCUMENTS

CN     108169981 A     6/2018
DE  102012021179 A1    5/2013
(Continued)

OTHER PUBLICATIONS

An J-W: "Wavelength-Selective Device Using a Phase Delay Layer and Two Polarization-Sensitive Gratings", IEEE Photonics Technology Letters, IEEE Photonics Technology Letters, IEEE Service Center, Piscataway, NJ, US, vol. 18 (6), Mar. 15, 2007, pp. 369-371, XP011165588, ISSN: 1041-1135, p. 1; figure 1.
(Continued)

*Primary Examiner* — David P Porta
*Assistant Examiner* — Fani Boosalis
(74) *Attorney, Agent, or Firm* — Qualcomm Incorporated

(57) ABSTRACT

Aspects of the present disclosure relate to a device including a light projector. An example light projector includes a light source that emits a light, a first diffractive optical element block comprising a first diffractive optical element and a first refractive material, and a second diffractive optical element block comprising a second diffractive optical element and a second refractive material. The first diffractive optical element is configured to project a first distribution of light, and the first refractive material is configured to switch the first diffractive optical element between projecting the first distribution of light and being prevented from projecting the first distribution of light. The second diffractive optical element is configured to project a second distribution of light, and the second refractive material is configured to switch the second diffractive optical element between projecting the second distribution of light and being prevented from projecting the second distribution of light.

30 Claims, 26 Drawing Sheets

(51) Int. Cl.
  *G01S 7/481* (2006.01)
  *G02B 5/30* (2006.01)

(56) References Cited

U.S. PATENT DOCUMENTS

| | | |
|---|---|---|
| 10,802,382 B2 | 10/2020 | Ma et al. |
| 2006/0132772 A1 | 6/2006 | Maximus et al. |
| 2008/0204847 A1 | 8/2008 | Kamm et al. |
| 2008/0239420 A1 | 10/2008 | McGrew |
| 2008/0253265 A1 | 10/2008 | Murata et al. |
| 2010/0202725 A1 | 8/2010 | Popovich et al. |
| 2011/0298918 A1 | 12/2011 | McEldowney |
| 2014/0022616 A1 | 1/2014 | Popovich et al. |
| 2015/0260510 A1 | 9/2015 | Nakajima |
| 2016/0164258 A1 | 6/2016 | Weichmann et al. |
| 2018/0038685 A1 | 2/2018 | Torri et al. |
| 2018/0113200 A1 | 4/2018 | Steinberg et al. |
| 2018/0196998 A1 | 7/2018 | Price et al. |
| 2018/0205937 A1 | 7/2018 | Zhu et al. |
| 2018/0373134 A1 | 12/2018 | Takahama |
| 2019/0018175 A1 | 1/2019 | Mirell et al. |
| 2019/0101381 A1 | 4/2019 | Chen et al. |
| 2019/0129085 A1 | 5/2019 | Waldern et al. |
| 2020/0033710 A1 | 1/2020 | Ma et al. |
| 2020/0033711 A1 | 1/2020 | Ma et al. |
| 2020/0033713 A1 | 1/2020 | Ma et al. |

FOREIGN PATENT DOCUMENTS

| | | |
|---|---|---|
| WO | WO-2012172295 A1 | 12/2012 |
| WO | WO-2017178781 A1 | 10/2017 |

OTHER PUBLICATIONS

International Search Report and Written Opinion—PCT/US2020/026450—ISA/EPO—dated Jul. 29, 2020.

* cited by examiner

MULTIFUNCTION LIGHT PROJECTOR WITH MULTISTAGE ADJUSTABLE DIFFRACTIVE OPTICAL ELEMENTS

CROSS-REFERENCE TO RELATED APPLICATIONS

This patent application is related to the following co-pending United States utility patent applications: pending U.S. patent application Ser. No. 16/253,538, entitled "ADJUSTABLE LIGHT DISTRIBUTION FOR ACTIVE DEPTH SENSING SYSTEMS" and filed on Jan. 22, 2019; pending U.S. patent application Ser. No. 16/253,784, entitled "ADJUSTABLE LIGHT PROJECTOR FOR FLOOD ILLUMINATION AND ACTIVE DEPTH SENSING" and filed on Jan. 22, 2019; and pending U.S. patent application Ser. No. 16/253,648, entitled "ADJUSTABLE LIGHT DISTRIBUTION FOR ACTIVE DEPTH SENSING SYSTEMS" and filed on Jan. 22, 2019. The disclosures of the co-pending applications are incorporated by reference in this patent application.

TECHNICAL FIELD

This disclosure relates generally to light projectors, and specifically to multifunction light projectors with multistage adjustable diffractive optical elements (DOEs).

BACKGROUND

For active depth sensing, a device may include a light projector to project a distribution of light, for which reflections of the distribution of light are sensed and measured to determine distances of objects in a scene. For example, a device may include a light projector that projects a distribution of infrared (IR) light (such as a distribution of IR light points) onto a scene. An active light receiver captures reflections of the IR light in capturing an image, and the device determines depths or distances of objects in the scene based on the captured reflections of the distributions of the IR light.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Some aspects of the present disclosure relate to a device including a light projector. An example light projector includes a light source configured to emit a light. The example light projector further includes a first diffractive optical element block positioned to receive light from the light source. The first diffractive optical element block includes a first diffractive optical element configured to project a first distribution of light from the emitted light. The first diffractive optical element block further includes a first refractive material configured to switch the first diffractive optical element between projecting the first distribution of light and being prevented from projecting the first distribution of light. The example light projector further includes a second diffractive optical element block positioned to receive light from the first diffractive optical element block. The second diffractive optical element block includes a second diffractive optical element configured to project a second distribution of light from the emitted light. The second diffractive optical element block further includes a second refractive material configured to switch the second diffractive optical element between projecting the second distribution of light and being prevented from projecting the second distribution of light. The first and second diffractive optical elements are configured to transition the light projector between a plurality of modes.

Some other aspects of the present disclosure relate to a method. An example method includes emitting a light by a light source of a light projector. The example method further includes projecting, by a first diffractive optical element of a first diffractive optical element block of the light projector, a first distribution of light from the emitted light, the first diffractive optical element block positioned to receive light from the light source. The example method further includes switching, by a first refractive material of the first diffractive optical element block, the first diffractive optical element between projecting the first distribution of light and being prevented from projecting the first distribution of light. The example method further includes projecting, by a second diffractive optical element of a second diffractive optical element block of the light projector, a second distribution of light from the emitted light, the second diffractive optical element block positioned to receive light from the first diffractive optical element block. The example method further includes switching, by a second refractive material of the second diffractive optical element block, the second diffractive optical element between projecting the second distribution of light and being prevented from projecting the second distribution of light. At least the first and second diffractive optical elements are configured to transition the light projector between a plurality of modes.

Some other aspects of the present disclosure relate to a device. An example device includes means for emitting a light by a light source of a light projector. The device also includes means for projecting, by a first diffractive optical element of a first diffractive optical element block of the light projector, a first distribution of light from the emitted light, the first diffractive optical element block positioned to receive light from the light source. The device also includes means for switching, by a first refractive material of the first diffractive optical element block, the first diffractive optical element between projecting the first distribution of light and being prevented from projecting the first distribution of light. The device also includes means for projecting, by a second diffractive optical element of a second diffractive optical element block of the light projector, a second distribution of light from the emitted light, the second diffractive optical element block positioned to receive light from the first diffractive optical element block. The device also includes means for switching, by a second refractive material of the second diffractive optical element block, the second diffractive optical element between projecting the second distribution of light and being prevented from projecting the second distribution of light. At least the first and second diffractive optical elements are configured to transition the light projector between a plurality of modes.

BRIEF DESCRIPTION OF THE DRAWINGS

Aspects of the present disclosure are illustrated by way of example, and not by way of limitation, in the figures of the accompanying drawings and in which like reference numerals refer to similar elements.

DETAILED DESCRIPTION

Figure 1:
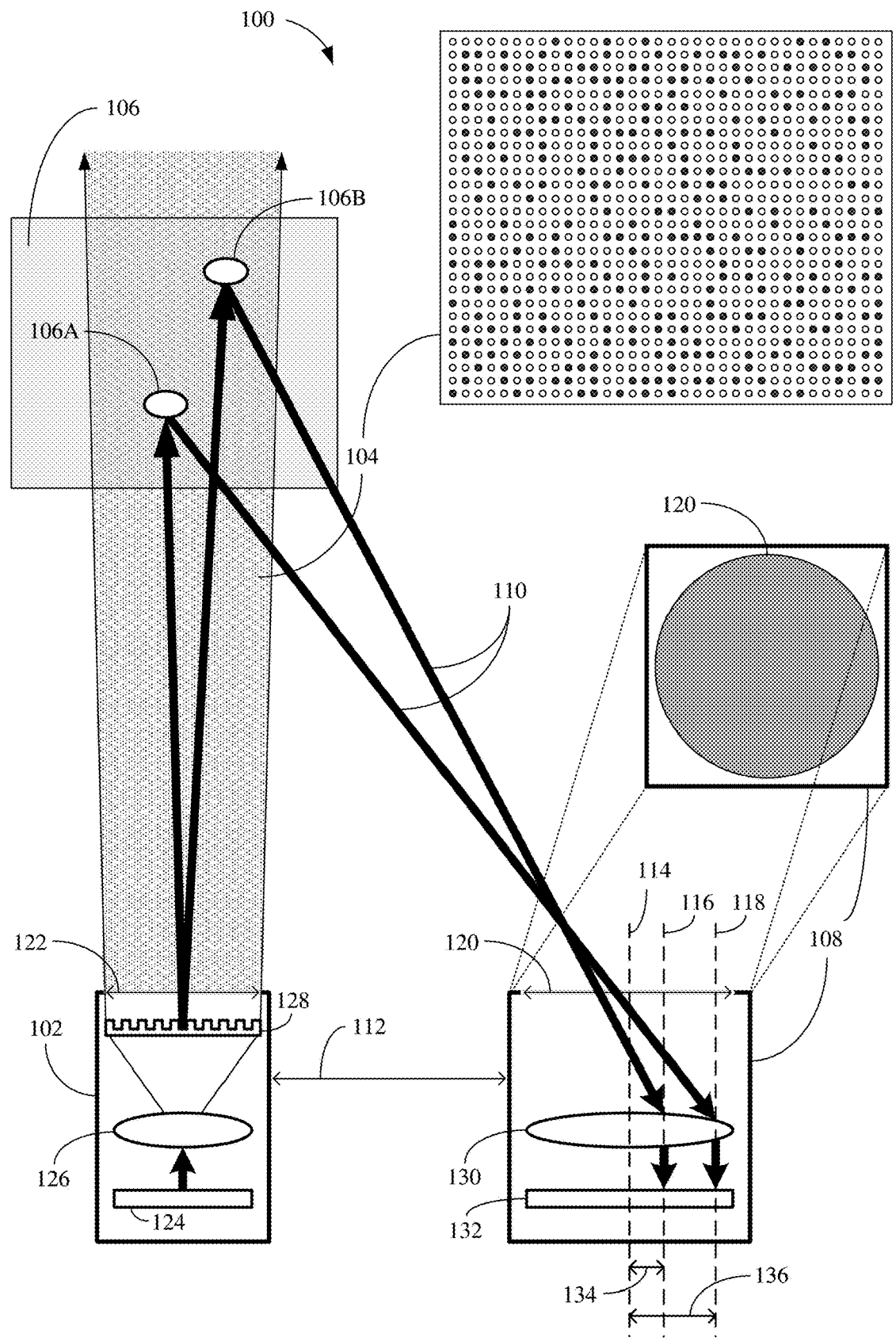
FIG. 1 is a depiction of an example active depth sensing system including a light projector for projecting a distribution of light.

Aspects of the present disclosure relate to light projectors and include a multifunction light projector with multistage adjustable diffractive optical elements.

An active depth sensing system may transmit light in a predefined distribution of points (or another suitable shape of focused light, including a flood light (or "flood illumination")). The points of light may be projected onto a scene, and the reflections of the points of light may be received by the active depth sensing system. Depths of objects in the scene may be determined by comparing the distribution of the received light and the distribution of the transmitted light. In comparing the distributions, a portion of the predefined distribution for the transmitted light may be identified in the received light. In the present disclosure, an active depth sensing system that projects a distribution of light (e.g., structured light, such as a distribution of light points, a flood light, and/or other shapes) is referred to as a structured light system (with a structured light projector).

The light distribution emitted by a structured light projector does not change. Denser distributions of light (such as additional light points or more instances of focused light in an area than for sparser distributions of light) may result in a higher resolution of a depth map or a greater number of depths that may be determined. However, the intensity of individual light points are lower for denser distributions than for sparser distributions where the overall intensity is similar between the distributions. As a result, interference may cause identifying reflections of a denser distribution of light more difficult than for sparser distributions of light. For example, a structured light projector may project IR light (such as near infrared (NIR) light) with a 905 nm or 940 nm wavelength (or other suitable wavelength). A structured light receiver may receive reflections of the IR light as well as sunlight and other ambient light. Ambient light may cause interference of the IR light points. As a result, brightly lit scenes (such as outdoor scenes in daylight) may cause more interference than darker scenes (such as indoor scenes or nighttime) because of the additional ambient light being captured by the structured light receiver.

A structured light system may overcome interference by increasing the light intensity. For example, the structured light projector may use more power to increase the intensity of each light point. However, to ensure eye safety and compliance with any regulations on light transmission, the overall intensity of light in an area of the projection may be restricted. In this manner, the number of points or instances of light in the area affects the maximum intensity of each point or instance of light. As a result, each light point in a sparser distribution may have a higher maximum intensity than each light point in a denser distribution. Thus, a sparser distribution may be more suitable for daylight scenes (with more interference), and a denser distribution may be more suitable for indoor or nighttime scenes (with less interference).

However, many devices (such as light projectors) use a structured light system in different types of lighting (with different amounts of interference). For example, a smartphone may include an active depth sensing system for face recognition, and the smartphone may be used indoors and outdoors. If the light distribution for the structured light projector is fixed, the smartphone would need to include more than one structured light projector to project distributions of light at different densities (and thus different intensities for each of the light instances in the light distributions). In some aspects of the present disclosure, a light projector may be configured to adjust the density of the light distribution.

Many devices also include a flood illuminator. A flood illuminator may project a diffuse light onto a scene so that enough light exists in the scene for an image sensor to capture one or more images of the scene. In one example, a device (such as a smartphone) that performs face recognition may first determine if a face to be recognized (and/or identified) exists in the scene. In some implementations, the device may capture a two-dimensional (2D) image using flood illumination and then use the 2D image in conjunction with a three-dimensional (3D) image to recognize (and/or identify) a face (if any) in the image. Specifically, a light projector of the device may include a flood illuminator to project IR light onto a scene so that an IR sensor may capture the scene, and the device may determine from the capture if a face exists in the scene. If a face is determined to exist in the scene, the device may then use an active depth sensing system (e.g., via one or more light projectors) for face recognition and/or liveness confirmation. In some implementations, the device may use a proximity sensor to determine whether a face is present in the scene. In some aspects, a user of the device may determine when to turn on the light projector. In some other aspects, the device may be configured to turn on the projector automatically. In these ways, the device may use a 2D image (e.g., captured via flood illumination) in conjunction with a 3D image to enhance the performance of the device. If a light projector has a fixed distribution or refraction of light, a device including a flood illuminator and a structured light projector therefore is required to include at least two light projectors (such as two IR projectors). In some aspects of the present disclosure, a light projector may be adjustable to project diffuse light for flood illumination (such as for face detection and identification) or project a distribution of light for active depth sensing (such as for face recognition and live image verification). If a light projector is configured to adjust the density of the structured light projection and/or is configured to adjust a light distribution function between flood illumination and active depth sensing, a device may include fewer light projectors, thus saving device space and requiring fewer device components.

Some devices may be capable of projecting multiple distributions of light and thus be considered "multifunction" devices (or multifunction light projectors). Such multifunction devices may have multiple DOEs. For example, two or more DOEs may be stacked to form a DOE stack for a light projector. The two or more DOEs described herein may share certain device components, such as one or more lasers, lenses, packaging, etc. In this manner, the cost to manufacture the light projector described herein may be lower than for a light projector for each DOE and/or diffusion element ("diffuser"). As one having ordinary skill in the art will appreciate, a DOE may include one or more diffusers in some configurations. The light projector described herein may be capable of independently toggling each of two or more DOEs via a single projector housing with a single illumination element on the device (such as via a single hole on the front surface).

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processes, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

FIG. 1 is a depiction of an example active depth sensing system 100. The active depth sensing system 100 (which herein also may be called a structured light system) may be used to generate a depth map (not pictured) of a scene 106. For example, the scene 106 may include a face (e.g., a live face), and the active depth sensing system 100 may be used for identifying or authenticating the live face. The active depth sensing system 100 may include a projector 102 and a receiver 108. The projector 102 may be referred to as a "transmitter," "projector," "emitter," and so on, and should not be limited to a specific transmission component. Throughout the following disclosure, the terms projector and transmitter may be used interchangeably. The receiver 108 may be referred to as a "detector," "sensor," "sensing element," "photodetector," and so on, and should not be limited to a specific receiving component.

While the disclosure refers to the distribution as a light distribution, any suitable wireless signals at other frequencies may be used (such as radio frequency waves, sound waves, etc.). Further, while the disclosure refers to the distribution as including a plurality of light points, the light may be focused into any suitable size and dimensions. For example, the light may be projected in lines, squares, or any other suitable dimension. In addition, the disclosure may refer to the distribution as a codeword distribution, where a defined portion of the distribution (such as a predefined patch of light points) is referred to as a codeword. If the distribution of the light points is known, the codewords of the distribution may be known. However, the distribution may be organized in any way, and the present disclosure should not be limited to a specific type of distribution or type of wireless signal.

The transmitter 102 may be configured to project or transmit a distribution 104 of light points onto the scene 106. The white circles in the distribution 104 may indicate where no light is projected for a possible point location, and the black circles in the distribution 104 may indicate where light is projected for a possible point location. In some example implementations, the transmitter 102 may include one or more light sources 124 (such as one or more lasers), a lens 126, and a light modulator 128. The transmitter 102 also may include an aperture 122 from which the transmitted light escapes the transmitter 102. In some implementations, the transmitter 102 may further include a diffractive optical element (DOE) to diffract the emissions from one or more light sources 124 into additional emissions. In some aspects, the light modulator 128 (to adjust the intensity of the emission) may be a DOE. In projecting the distribution 104 of light points onto the scene 106, the transmitter 102 may transmit one or more lasers from the light source 124 through the lens 126 (and/or through a DOE or light modulator 128) and onto the scene 106. The transmitter 102 may be positioned on the same reference plane as the receiver 108, and the transmitter 102 and the receiver 108 may be separated by a distance called the baseline (112).

In some example implementations, the light projected by the transmitter 102 may be IR light. IR light may include portions of the visible light spectrum and/or portions of the light spectrum that is not visible to the naked eye. In one example, IR light may include near infrared (NIR) light, which may or may not include light within the visible light spectrum, and/or IR light (such as, short wave IR (SWIR), middle wave IR (MWIR), long wave IR (LWIR), and far infrared (FIR) light) which is outside the visible light spectrum. The term IR light should not be limited to light having a specific wavelength in or near the wavelength range of IR light. Further, IR light is provided as an example emission from the transmitter. In the following description, other suitable wavelengths of light may be used. For example, light in portions of the visible light spectrum outside the IR light wavelength range or ultraviolet light may be used. Alternatively, other signals with different wavelengths may be used, such as microwaves, radio frequency signals, and other suitable signals.

The scene 106 may include objects at different depths from the structured light system (such as from the transmitter 102 and the receiver 108). For example, objects 106A and 106B in the scene 106 may be at different depths. The receiver 108 may be configured to receive, from the scene 106, reflections 110 of the transmitted distribution 104 of light points. To receive the reflections 110, the receiver 108 may capture an image. When capturing the image, the receiver 108 may receive the reflections 110, as well as (i) other reflections of the distribution 104 of light points from other portions of the scene 106 at different depths and (ii) ambient light. Noise may also exist in the captured image.

In some example implementations, the receiver 108 may include a lens 130 to focus or direct the received light (including the reflections 110 from the objects 106A and 106B) on to the sensor 132 of the receiver 108. The receiver 108 also may include an aperture 120. Assuming for the example that only the reflections 110 are received, depths of the objects 106A and 106B may be determined based on the baseline 112, displacement and distortion of the light distribution 104 (such as in codewords) in the reflections 110, and intensities of the reflections 110. For example, the distance 134 along the sensor 132 from location 116 to the center 114 may be used in determining a depth of the object 106B in the scene 106. Similarly, the distance 136 along the sensor 132 from location 118 to the center 114 may be used in determining a depth of the object 106A in the scene 106. The distance along the sensor 132 may be measured in terms of number of pixels of the sensor 132 or a distance (such as millimeters).

In some example implementations, the sensor 132 may include an array of photodiodes (such as avalanche photodiodes) for capturing an image. To capture the image, each photodiode in the array may capture the light that hits the photodiode and may provide a value indicating the intensity of the light (a capture value). The image therefore may be the capture values provided by the array of photodiodes.

In addition or alternative to the sensor 132 including an array of photodiodes, the sensor 132 may include a complementary metal-oxide semiconductor (CMOS) sensor. To capture the image by a photosensitive CMOS sensor, each pixel of the sensor may capture the light that hits the pixel and may provide a value indicating the intensity of the light. In some example implementations, an array of photodiodes may be coupled to the CMOS sensor. In this manner, the electrical impulses generated by the array of photodiodes may trigger the corresponding pixels of the CMOS sensor to provide capture values.

The sensor 132 may include at least a number of pixels equal to the number of possible light points in the distribution 104. For example, the array of photodiodes or the CMOS sensor may include a number of photodiodes or a number of pixels, respectively, corresponding to the number of possible light points in the distribution 104. The sensor 132 logically may be divided into groups of pixels or photodiodes (such as 4×4 groups) that correspond to a size of a bit of a codeword. The group of pixels or photodiodes also may be referred to as a bit, and the portion of the captured image from a bit of the sensor 132 also may be referred to as a bit. In some example implementations, the sensor 132 may include the same number of bits as the distribution 104.

If the light source 124 transmits IR light (such as NIR light at a wavelength of, e.g., 940 nm), the sensor 132 may be an IR sensor to receive the reflections of the NIR light. The sensor 132 also may be configured to capture an image using a flood illuminator (not illustrated).

As illustrated, the distance 134 (corresponding to the reflections 110 from the object 106B) is less than the distance 136 (corresponding to the reflections 110 from the object 106A). Using triangulation based on the baseline 112 and the distances 134 and 136, the differing depths of objects 106A and 106B in the scene 106 may be determined in generating a depth map of the scene 106. Determining the depths may further include determining a displacement or a distortion of the distribution 104 in the reflections 110.

Although a number of separate components are illustrated in FIG. 1, one or more of the components may be implemented together or include additional functionality. All described components may not be required for an active depth sensing system 100, or the functionality of components may be separated into separate components. Additional components not illustrated also may exist. For example, the receiver 108 may include a bandpass filter to allow signals having a determined range of wavelengths to pass onto the sensor 132 (thus filtering out signals with a wavelength outside of the range). In this manner, some incidental signals (such as ambient light) may be prevented from interfering with the captures by the sensor 132. The range of the bandpass filter may be centered at the transmission wavelength for the transmitter 102. For example, if the transmitter 102 is configured to transmit NIR light with a wavelength of 940 nm, the receiver 108 may include a bandpass filter configured to allow NIR light having wavelengths within a range of, e.g., 920 nm to 960 nm. Therefore, the examples described regarding FIG. 1 is for illustrative purposes, and the present disclosure should not be limited to the example active depth sensing system 100.

For a light projector (such as the transmitter 102), the light source may be any suitable light source. In some example implementations, the light source 124 may include one or more distributed feedback (DFB) lasers. In some other example implementations, the light source 124 may include one or more vertical-cavity surface-emitting lasers (VCSELs).

A DOE is a material situated in the projection path of the light from the light source. The DOE may be configured to split a light point into multiple light points. For example, the material of the DOE may be a translucent or a transparent polymer with a known refractive index. The surface of the DOE may include peaks and valleys (varying the depth of the DOE, e.g., to introduce proper phase delays) such that light passing through the DOE is diffracted and such that interferences among the diffracted light form the light into multiple light points. For example, the DOE may be configured to receive one or more lights points from one or more lasers and project an intended distribution with a greater number of light points than emitted by the one or more lasers. While the Figures may illustrate the depth of a DOE changing along only one axis of the DOE, the Figures are only to assist in describing aspects of the disclosure. The peaks and valleys of the surface of the DOE may be located at any portion of the surface of the DOE and cause any suitable change in the depth of portions of the DOE, and the present disclosure should not be limited to a specific surface configuration for a DOE. For purposes of discussion herein, a surface of a DOE including peaks and valleys may be referred to as an "edge," an "uneven surface," or simply a "surface" of the DOE.

If the light source 124 includes an array of lasers (such as a VCSEL array), a portion of the distribution of light points may be projected by the array. A DOE may be used to replicate the portion in projecting the distribution of light points. For example, the DOE may split (or "form") the projection from the array into multiple instances, and the distribution of the projection may be a repetition of the projection from the array. In some example implementations, the DOE may be configured to repeat the projection vertically, horizontally, or at an angle between vertical and horizontal relative to the projection. The repeated instances may be overlapping, non-overlapping, or any suitable configuration. While the examples describe a DOE configured to split the projection from the array and stack the instances above and below one another, the present disclosure should not be limited to a specific type of DOE configuration and repetition of the projection.

Figure 2:
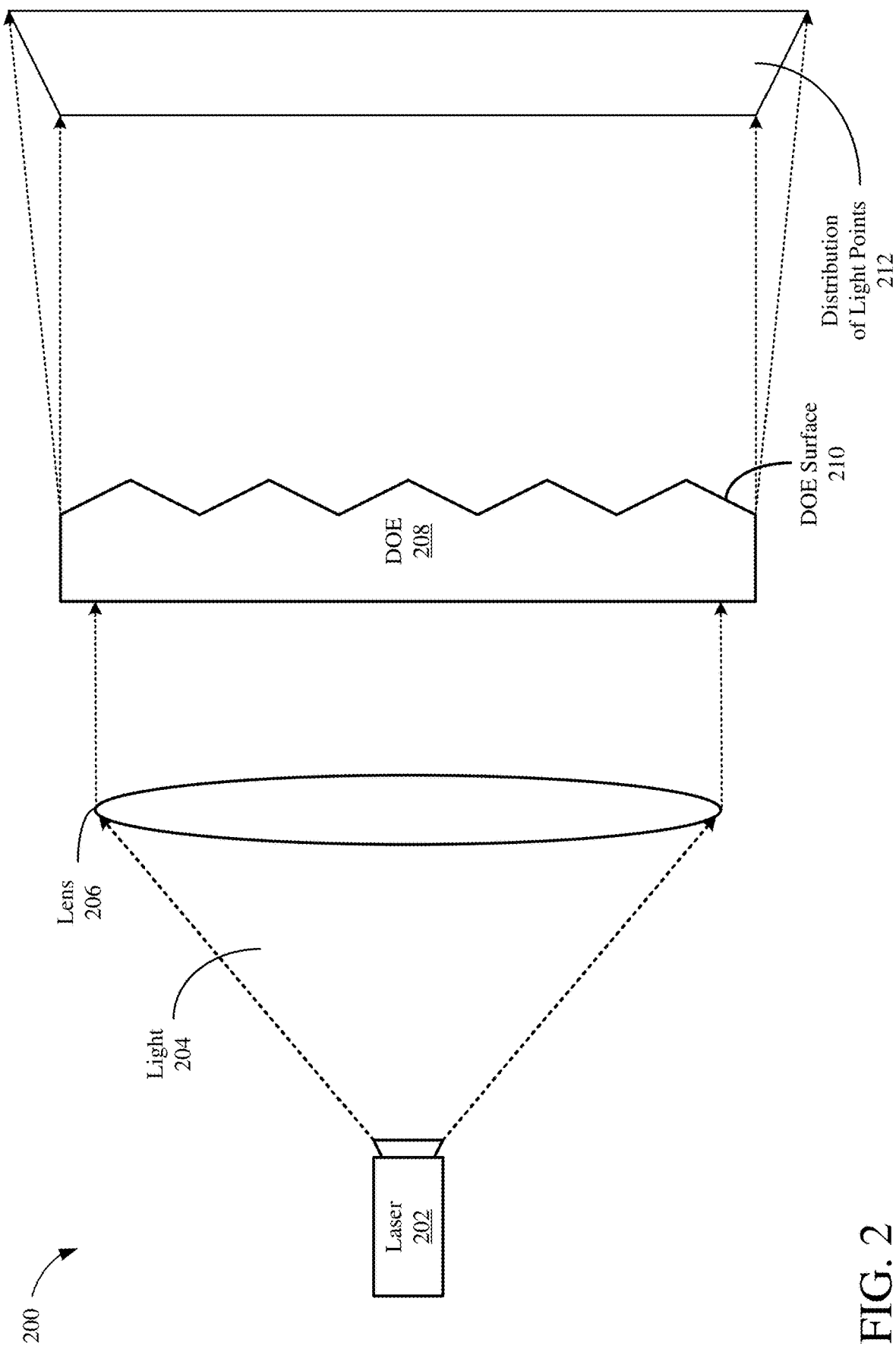
FIG. 2 is a depiction of an example projector of an active depth sensing system.

FIG. 2 is a depiction of an example projector 200 of an active depth sensing system. The projector 200 may be an example implementation of the transmitter 102 in FIG. 1. The example projector 200 may include a laser 202 that is configured to emit a light 204 toward a lens 206. The lens 206 may contain one or more lens elements to direct the light 204, and the lens 206 is shown only for illustrative purposes. An example laser 202 is a DFB laser, which may emit polarized light toward the lens 206. Another example laser 202 is a VCSEL, which may emit unpolarized light 204 toward the lens 206. The lens 206 may direct the light 204 toward the DOE 208. The DOE 208 may have a first refractive index, and a surface 210 of the DOE 208 may be configured for the DOE 208 to project the distribution of light points 212 from the light 204. Some example implementations of fabricating a DOE (such as DOE 208) include depositing a polymer layer or dielectric layer on a glass (or otherwise transparent) substrate. The deposited layer may have a desired refractive index and may be etched or embossed into different depths, thus providing desirable characteristics for the DOE.

Figure 3:
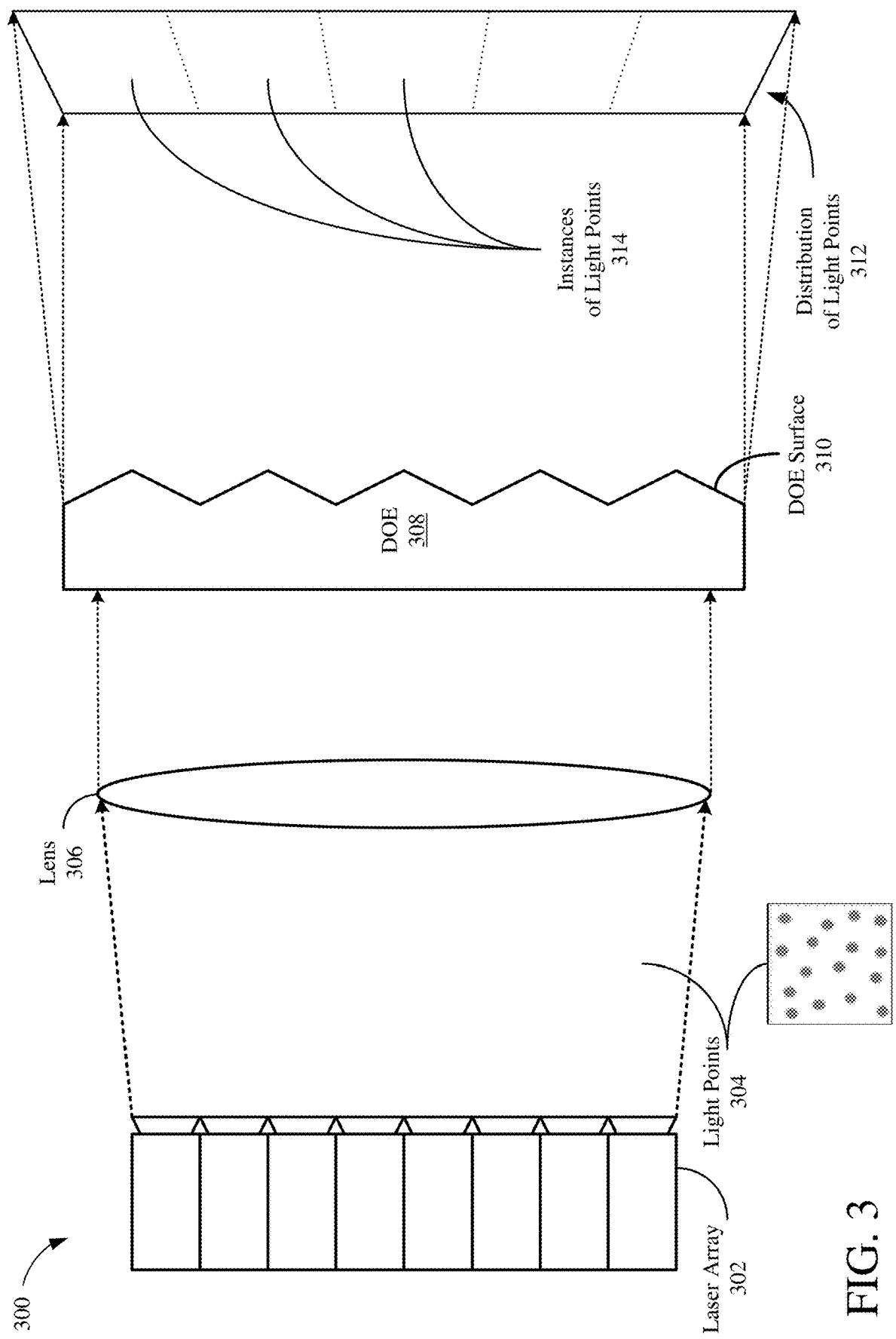
FIG. 3 is a depiction of another example projector of an active depth sensing system.

FIG. 3 is a depiction of another example projector 300 of an active depth sensing system. The projector 300 may be similar to the projector 200 in FIG. 2, except the projector 300 includes a plurality of lasers (such as a laser array 302) instead of one laser 202. The laser array 302 may emit a plurality of light points 304. The light points 304 may be in a patterned distribution, with each point indicating a light emitted by one of the lasers in the laser array 302. The lens 306 may direct the light points 304 to the DOE 308 to project the distribution of light points 304 onto the scene. The DOE 308 may have a first refractive index, and the surface 310 of the DOE 308 may be configured for the DOE 308 to replicate the light points 304 into multiple instances of light points 314. The distribution of light points 312 therefore may include the multiple instances of light points 314. Each instance may be of the patterned distribution of light points 304.

The DOE 308 may be configured to split the light points 304 into instances 314 and vertically stack the instances 314 in projecting the distribution 312. For example, the DOE 308 may include horizontal ridges for splitting the light points 304 vertically. While the example projector 300 is illustrated as vertically splitting and stacking the light points 304, the DOE 308 may be configured to divide the light points 304 and arrange the instances in any suitable manner. For example, the instances may be overlapping or spaced apart, stacked horizontally, tiled, or arranged in another suitable shape or order. The present disclosure should not be limited to a specific configuration for the DOE 308.

Referring to FIG. 2 and FIG. 3, the distribution 212 and the distribution 312 are unchanging for a fixed DOE 208 and DOE 308, respectively. However, the DOE 208 in FIG. 2 or the DOE 308 in FIG. 3 may be replaced with a configurable diffractive element that may be configured to adjust the distribution 212 or the distribution 312, respectively. For example, a configurable diffractive element may be configured to decrease or increase the number of light points in the distribution.

Figure 4:
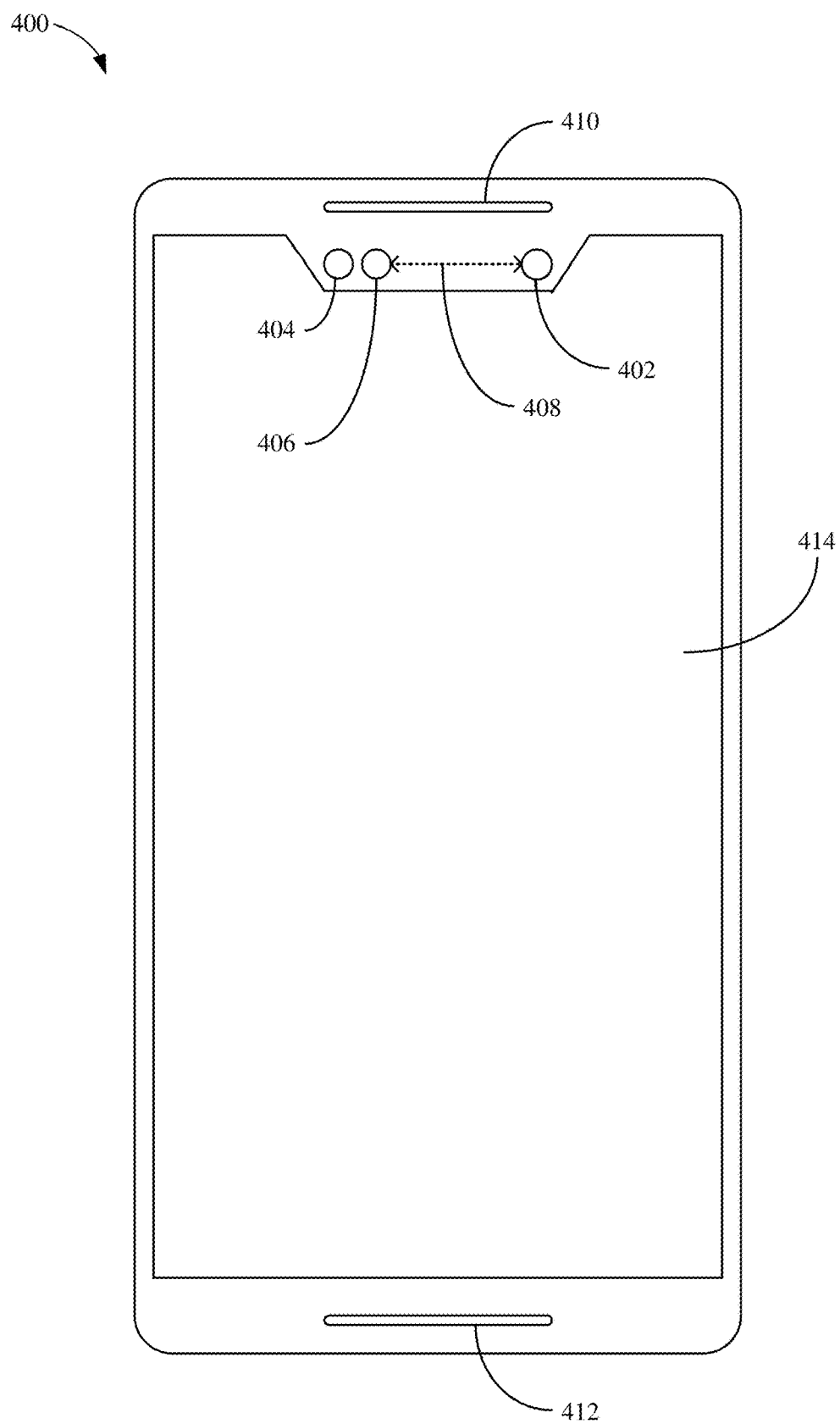
FIG. 4 is a depiction of an example device including an active depth sensing light projector and a flood illuminator.

In addition to active depth sensing, a device may be configured to provide flood illumination. FIG. 4 is a depiction of an example device 400 including an active depth sensing light projector 402 and a flood illuminator 404. The device 400 further may include an IR sensor 406 to capture an image based on the reflections of light from the active depth sensing light projector 402 or the flood illuminator 404 (with the projector 402 and the illuminator 404 projecting IR light). The structured light projector 402 and the IR sensor 406 may be separated by a baseline 408. An example device 400 may be a smartphone, with an earpiece 410 and a microphone 412 for conducting phone calls or other wireless communications. A smartphone also may include a display 414 with or without a notch including the projectors 402, illuminator 404, and the IR sensor 406.

Figure 5:
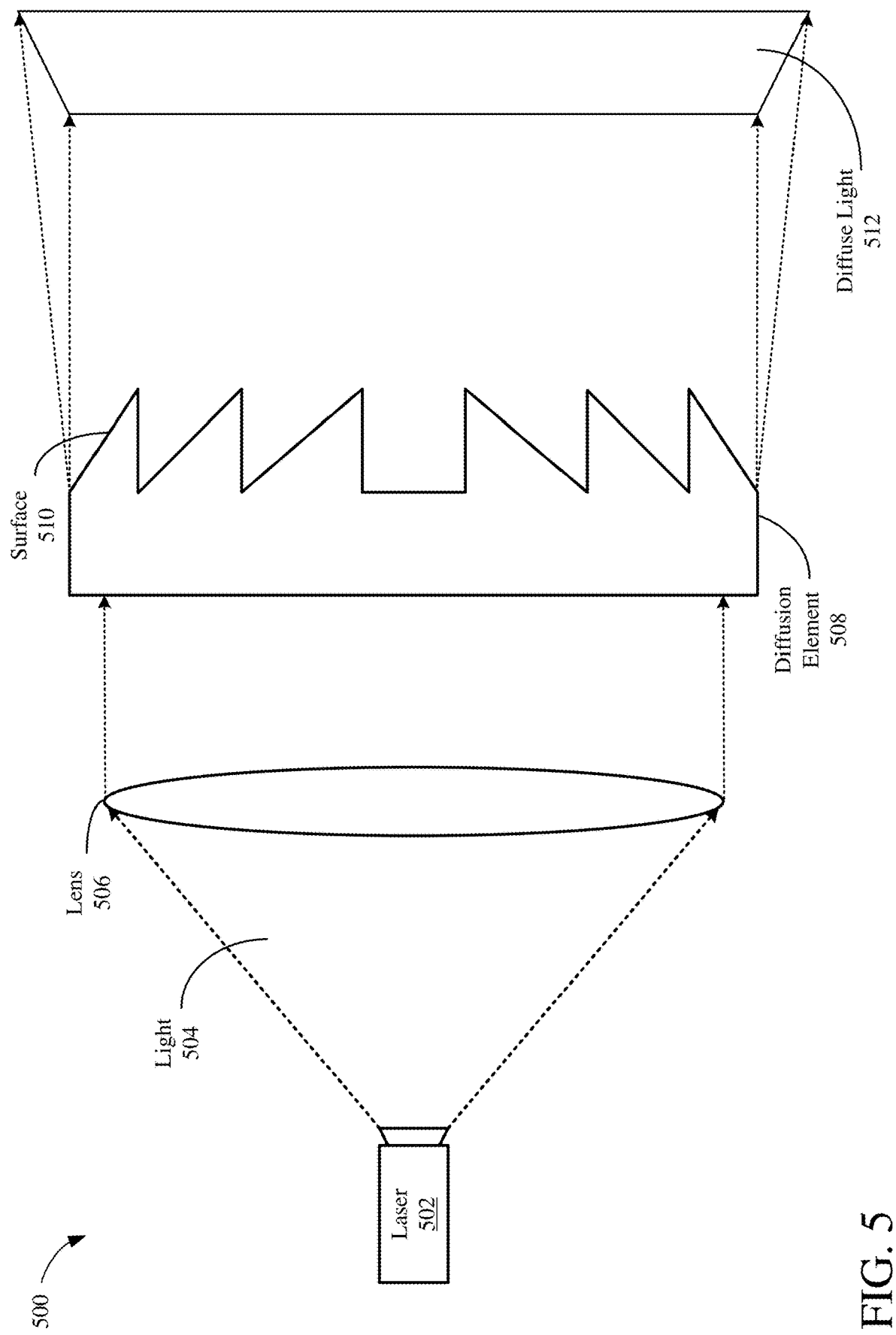
FIG. 5 is a depiction of an example flood illuminator.

A flood illuminator 404 may project a diffuse IR light onto a scene for the IR sensor 406 to capture an image based on reflections of the diffuse IR light. FIG. 5 is a depiction of an example flood illuminator 500. The flood illuminator 500 may be an example implementation of the flood illuminator 404 in FIG. 4. The flood illuminator 500 may include a Laser 502 (such as a DFB laser or a VCSEL) configured to emit light 504 toward a lens 506. The lens 506 may direct the light 504 to a diffusion element 508. The diffusion element 508 may have a refractive index and include a surface 510 configured to adjust the light passing through the diffusion element 508 such that the light projected from the diffusion element 508 is a diffuse light 512. An example diffusion element 508 is a Fresnel lens. However, any suitable diffusion element 508 may be used for diffusing the light 504. A diffusion element may also be referred to as a diffuser, and the terms may be used interchangeably.

Referring back to FIG. 4, a device 400 including an active depth sensing light projector 402 and a flood illuminator 404 would require at least two projectors. In some example implementations, the diffusion element 508 in FIG. 5 or the DOE 208 in FIG. 2 may be replaced with a configurable element so that a projector may be configured to project a diffuse light (when operating as a flood illuminator) and to project a distribution of light (when operating as a light projector for active depth sensing). In this manner, a device may include one projector for both flood illumination and active depth sensing. For example, the projector 402 of the device 400 in FIG. 4 may be configured to perform flood illumination and light projection for active depth sensing, and the device 400 therefore may not include the separate flood illuminator 404.

Figure 6:
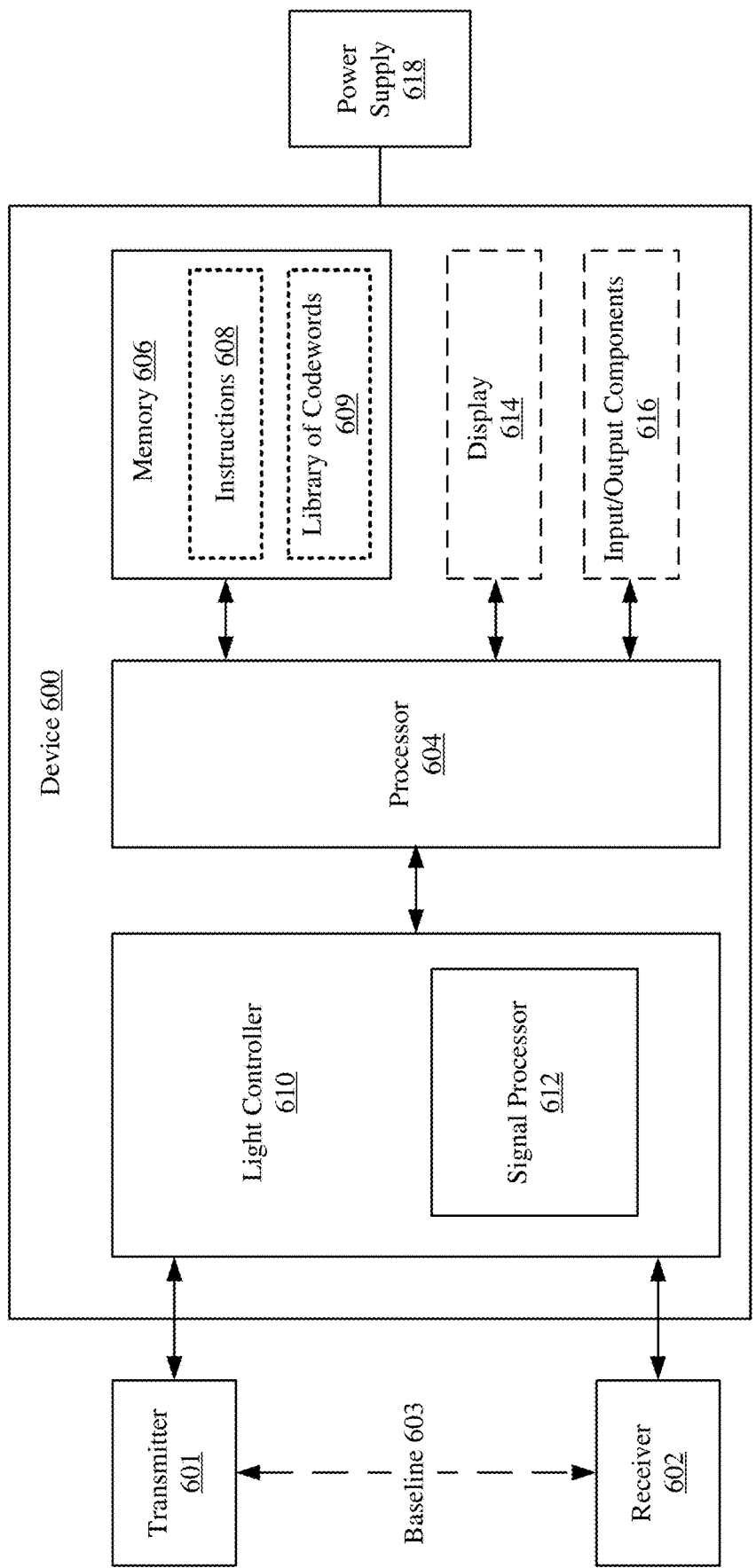
FIG. 6 is a block diagram of an example device including an adjustable diffraction projector.

If a device includes a projector that is configurable to adjust the density of a light distribution for different operating modes, and/or if the device includes a projector that is configurable to adjust a light distribution function between flood illumination and light projection for active depth sensing for different operating modes, the device may control configuring and operating the projector for the different operating modes. FIG. 6 is a block diagram of an example device 600 for configuring a transmitter 601 for active depth sensing (which may project different density distributions of light) and/or flood illumination. In some other examples, a transmitter may be separate from and coupled to the device 600.

The example device 600 may include or be coupled to a transmitter 601 and a receiver 602 separated from the transmitter 601 by a baseline 603. The receiver 602 may be an IR sensor configured to capture images, and the transmitter 601 may be a projector configured to project a distribution of light and/or a diffuse light. The density of the distribution of light from the transmitter 601 may be adjustable.

The example device 600 also may include a processor 604, a memory 606 storing instructions 608, and a light controller 610 (which may include one or more signal processors 612). The device 600 may optionally include (or be coupled to) a display 614 and a number of input/output (I/O) components 616. The device 600 may include additional features or components not shown. For example, a wireless interface, which may include a number of transceivers and a baseband processor, may be included for a wireless communication device to perform wireless communications. In another example, the device 600 may include one or more cameras (such as a contact image sensor (CIS) camera or other suitable camera for capturing images using visible light). The transmitter 601 and the receiver 602 may be part of an active depth sensing system (such as the system 100 in FIG. 1) controlled by the light controller 610 and/or the processor 604. The transmitter 601 and the receiver 602 additionally may be a flood illumination and capture system. The device 600 may include or be coupled to additional light projectors (or flood illuminators) or may include a different configuration for the light projectors. The device 600 also may include or be coupled to additional receivers (not shown) for capturing multiple images of a scene. The disclosure should not be limited to any specific examples or illustrations, including the example device 600.

The memory 606 may be a non-transient or non-transitory computer readable medium storing computer-executable instructions 608 to perform all or a portion of one or more operations described in this disclosure. If the light distribution projected by the transmitter 601 is divided into codewords, the memory 606 optionally may store a library of codewords 609 for the codeword distribution of light. The library of codewords 609 may indicate what codewords exist in the distribution and the relative location between the codewords in the distribution. The device 600 also may include a power supply 618, which may be coupled to or integrated into the device 600.

The processor 604 may be one or more suitable processors capable of executing scripts or instructions of one or more software programs (such as instructions 608 stored within the memory 606). In some aspects, the processor 604 may be one or more general purpose processors that execute instructions 608 to cause the device 600 to perform any number of functions or operations. In additional or alternative aspects, the processor 604 may include integrated circuits or other hardware to perform functions or operations without the use of software. While shown to be coupled to each other via the processor 604 in the example of FIG. 6, the processor 604, the memory 606, the light controller 610, the optional display 614, and the optional I/O components 616 may be coupled to one another in various arrangements. For example, the processor 604, the memory 606, the light controller 610, the optional display 614, and/or the optional I/O components 616 may be coupled to each other via one or more local buses (not shown for simplicity).

The display 614 may be any suitable display or screen allowing for user interaction and/or to present items (such as a depth map, a preview image of the scene, a lock screen, etc.) for viewing by a user. In some aspects, the display 614 may be a touch-sensitive display. The I/O components 616 may be or include any suitable mechanism, interface, or device to receive input (such as commands) from the user and to provide output to the user. For example, the I/O components 616 may include (but are not limited to) a graphical user interface, keyboard, mouse, microphone and speakers, squeezable bezel or border of the device 600, physical buttons located on device 600, and so on. The display 614 and/or the I/O components 616 may provide a preview image or depth map of the scene to a user and/or receive a user input for adjusting one or more settings of the device 600 (such as for adjusting the density of the distribution projected by the transmitter 601, adjusting the projection from diffuse light to a distribution of light points by the transmitter 601, etc.).

The light controller 610 may include a signal processor 612, which may be one or more processors to configure the transmitter 601 and process images captured by the receiver 602. In some aspects, the signal processor 612 may execute instructions from a memory (such as instructions 608 from the memory 606 or instructions stored in a separate memory coupled to the signal processor 612). In other aspects, the signal processor 612 may include specific hardware for operation. The signal processor 612 may alternatively or additionally include a combination of specific hardware and the ability to execute software instructions. While the following examples may be described in relation to the device 600, any suitable device or configuration of device components may be used, and the present disclosure should not be limited by a specific device configuration.

For the projector (such as the transmitter 601 in FIG. 6), the diffractive element may be configured so that the light projection is adjustable. To be configurable to adjust the light projection, the diffractive element may include a plurality of DOEs. In some example implementations, a diffusion element (for flood illumination) may be one of the DOEs. In some other example implementations, two or more DOEs may cause the final light projection to have different light distributions for active depth sensing. In some examples, the multiple DOEs are positionally fixed within the projector or relative to the light source (do not move away or toward the light source), and other projector components may be adjusted when adjusting the light projection. While the following examples describe two DOEs for the projector, any number of DOEs may be used, and the present disclosure should not be limited to a projector including two DOEs.

Figure 7:
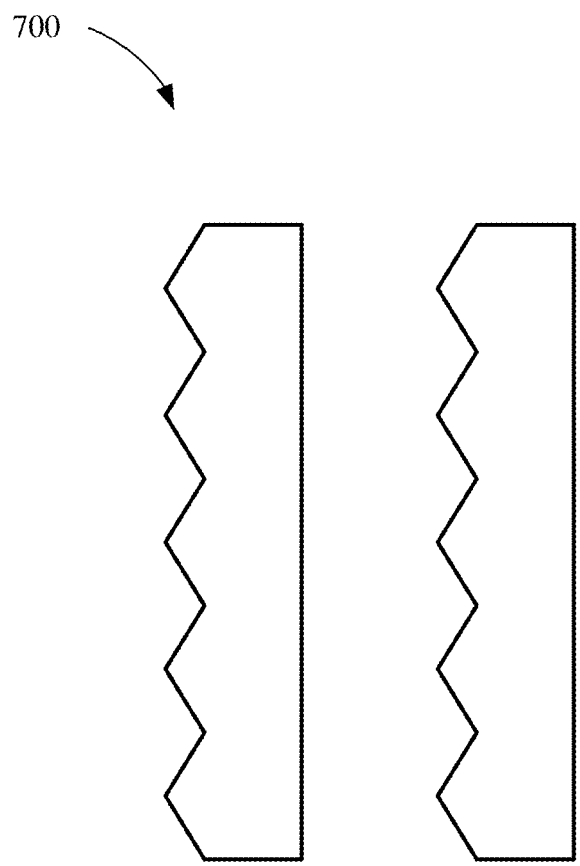
FIG. 7 is a depiction of an example arrangement of multiple diffractive optical elements of an adjustable diffraction projector.

FIG. 7 is a depiction of an example arrangement 700 of two DOEs for a projector. The DOEs may each have an uneven surface (the depicted jagged edges) for active depth sensing (or "diffraction"). The uneven surfaces of the DOEs may be the same or different. The DOEs may be aligned in the projection path of a light source of the projector, and the uneven surfaces of the DOEs (indicated by the jagged lines) may be oriented in the same direction (as illustrated). The uneven surface of the first DOE (e.g., the left DOE for a direction of the light from left to right) is oriented toward the light source (away from the subsequent DOE).

In some implementations, the light projector may include more than two DOEs (not illustrated), and the DOEs may be oriented in any suitable direction. For example, one or more of the DOEs may be oriented as depicted in FIG. 7, and one or more of the other DOEs may be oriented in the opposite direction. In some implementations, one or more of the uneven surfaces of the DOEs may include any shape or design.

For multiple DOE blocks in a projector, the refractive index of a refractive material for each DOE block may be different than the refractive index of the respective DOE when the DOE block is "on." For example, the first DOE in FIG. 7 may be part of a first DOE block (not pictured) that includes a refractive material with a first refractive index, and the second DOE in FIG. 7 may be part of a second DOE block (not pictured) that includes a refractive material with a second refractive index different from the first refractive index. For purposes of discussion herein, refractive indexes may be "different" if they are significantly different (e.g., the difference is greater than a threshold). In this manner, the difference in refraction between the DOEs may be perceptible or substantial for operating purposes.

In some example implementations, the DOEs may be spaced apart from each other. The space between the two DOEs may be filled with a transparent or translucent material having different refractive indexes than the two DOEs. For example, the differences between the refractive index for the material and the two DOEs may be greater than a threshold (and the differences may be perceptible or substantial for operating purposes). In some example implementations, the refractive index of the material may be adjustable. Additionally or alternatively, the refractive index for the material may differ for different polarities of light passing through the material.

The refractive index of a material may be adjustable based on the application of electricity to the material. In some examples, the two DOEs may be fabricated on two transparent substrates (such as glass or another suitable substrate). A layer of transparent electrode film (e.g., indium tin oxide) may be deposited on each substrate. The film thus may conduct electricity and apply electricity to the material. In some aspects, an electrode pair may be placed on either side of the material (such as an anode on one side and a cathode on the other side) to enable the flow of electricity through the material and an electrostatic field across the material.

Figure 8:
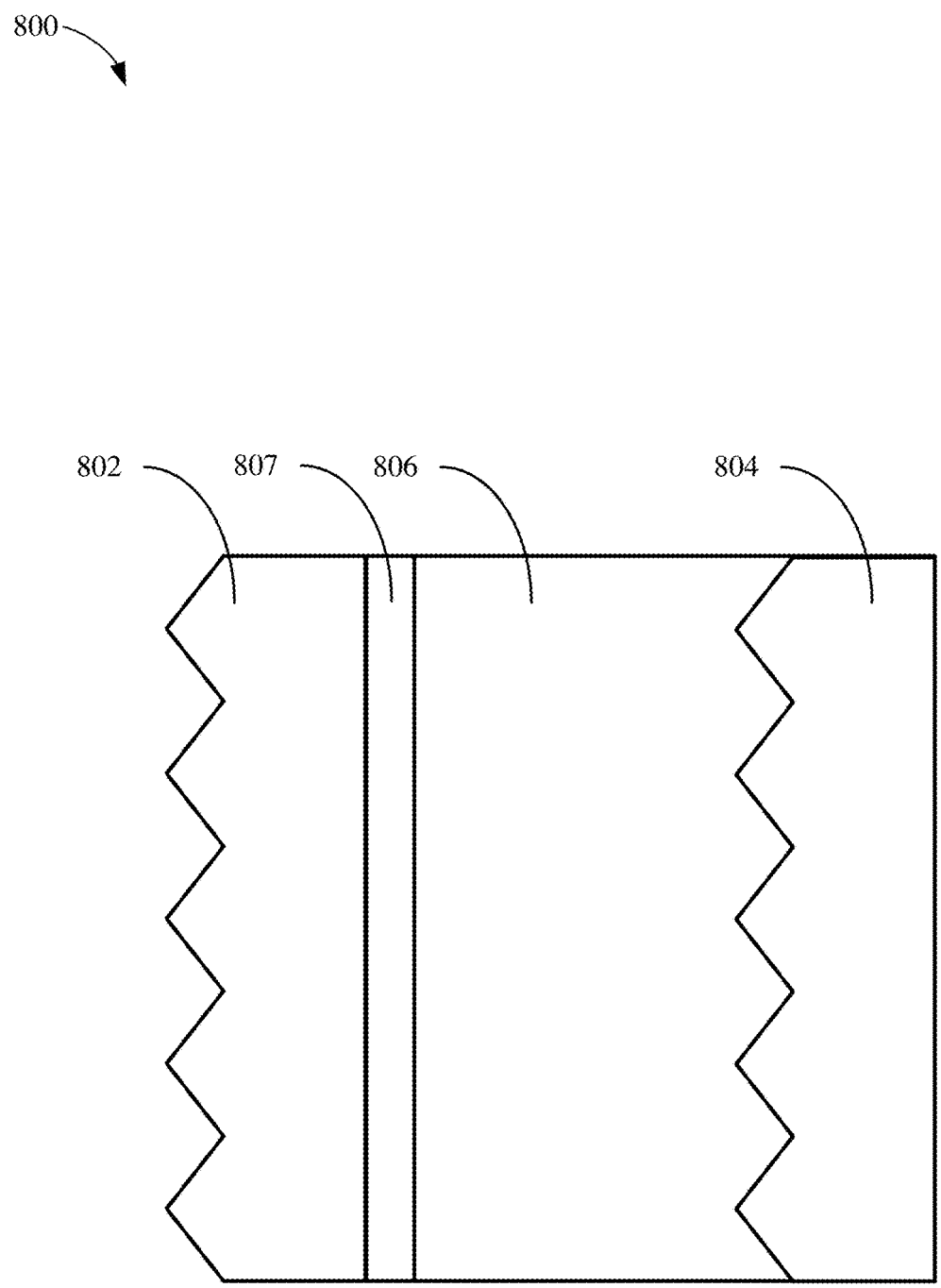
FIG. 8 is a depiction of an example diffractive element including an arrangement of two diffractive optical elements with a refractive material between the two diffractive optical elements (DOE).

FIG. 8 is a depiction of a diffractive element 800 including two DOEs 802 and 804 with a refractive material 806 in between. The refractive material 806 may be a liquid (such as liquid crystal), in some aspects. In some example implementations, one or more spacers (not shown) may be used to support a gap between the DOE 802 and the DOE 804. For example, the refractive material may be a liquid (such as liquid crystal) that fills the gap. In some example implementations, the refractive material 806 may be sufficient to separate the DOEs 802 and 804 (such as by having a sufficient structure or inelasticity). In some example implementations, a refractive material (such as the refractive material 806) may have an average refractive index different (e.g., the differences being greater than a threshold) than the refractive index for a DOE (such as the DOE 804). In the illustrated example, if the refractive indexes are different for the second DOE 804 and the refractive material 806 (e.g., the differences being greater than a threshold), light passing through the DOE 804 and the refractive material 806 may be affected by the DOE 804. In the illustrated example (assuming the light travels from left-to-right), the uneven surface of DOE 802 faces air, so light entering the DOE 802 will be affected (e.g., diffracted or diffused). Furthermore, light passing through the DOE 802 will not be affected by optical properties of either of the refractive material 806 and the DOE 804. For example, if the first DOE 802 splits a light from a laser into a first distribution of light points, the first distribution of light points may pass through the refractive material 806 to the second DOE 804. If the second DOE 804 splits a light into a second distribution of light points, each light point of the first distribution of light points may be split into a separate second distribution of light points. In this manner, the number of light points of the first distribution from the first DOE 802 may be increased by the second DOE 804. In some implementations, the diffractive element 800 may not include an uneven edge on the left-side (not pictured), and the left-side surface of the diffractive element 800 may be flat and face the air. Assuming the light travels from left-to-right, light entering the flat surface will be refracted (e.g., undergo a change in direction) if the refractive indices on the two sides of the flat-surface are different.

When a light point is divided into multiple light points, the energy is divided among the multiple light points. As a result, the intensity of each of the resulting light points is less than the intensity of the original light point. In this manner, the distribution of, e.g., points of light may be denser without the intensity of the light for a portion of the distribution increasing (thus allowing an overall maximum intensity of the projected light to remain below an overall maximum intensity while increasing the density of light points for the projected light).

If the refractive index of the refractive material 806 is the same as the refractive index of the second DOE 804, light may not be affected by DOE 804 with the same refractive index as the refractive material 806. In the depicted configuration of FIG. 8, the first DOE 802 has an uneven edge that is oriented away from the refractive material 806 and is facing the air. Thus, light passing through 800 may be affected by DOE 802 and not by DOE 804. In this way, for the specific example depicted in FIG. 8, the first DOE 802 may be considered as "always-on." Same refractive indexes may be similar refractive indexes, such as the difference between the refractive indexes being less than a threshold. For example, refractive indexes may be the same for two refractive indexes whose difference is less than the threshold and different for two refractive indexes whose difference is greater than the threshold. The following description uses the terms "different," "same," and "similar." However, "different" may be a difference greater than an absolute difference (e.g., the differences being greater than a determined threshold), and "same" or "similar" may not be absolutely the same (e.g., the differences may be less than a determined threshold or the differences are not perceptible for operation of the device). The present disclosure should not be limited to a specific difference or similarity through use of the terms.

In some implementations, the first DOE 802, the second DOE 804, or both, may be fabricated on a substrate (such as glass). In FIG. 8, the first DOE 802 is attached to a substrate 807, and the gap (which may be supported by spacers (not shown)) between the substrate 807 and the second DOE 804 may be filled with refractive material 806. It will be appreciated that the second DOE 804 is also attached to a substrate (not pictured). In some implementations, a polarity rotator is disposed between the first DOE 802 and the refractive material 806 (not pictured). In some implementations, the space between the first DOE 802 and the refractive material 806 may be filled with a conductive material (not pictured). In some implementations, electrodes (not pictured) may be fabricated on the substrate 807 and the second DOE 804 for applying electricity to the refractive material 806.

For purposes of discussion herein, the second DOE 804, the refractive material 806, and the substrate 807 may collectively be referred to as a "DOE block," a "DOE stage," a "block," a "stage," a "building block," a "DOE," and/or a "diffractive optical element." For purposes of discussion herein, the DOE block may also be considered to include the polarity rotator, if present. For purposes of discussion herein, the DOE block may also be considered to include a pair of conductive electrodes, if present. In some implementations, the projector may include two or more DOE blocks. In some aspects, each of the DOE blocks may perform a different function (e.g., project a different distribution of light), such as a low resolution distribution (e.g., a dot distribution), a high resolution distribution (e.g., a dot distribution), a flood illumination, among other light distributions. In some aspects, each of the DOE blocks may be adjustable to be "on" or "off" (e.g., via a polarity rotator, an application of a voltage, etc.). Each possible adjusted combination of functions provided by the two or more configurable DOE blocks may be considered a "mode" for the light projector. Thus, the projector may be a multifunction light projector with multistage adjustable DOEs.

Figure 9A:
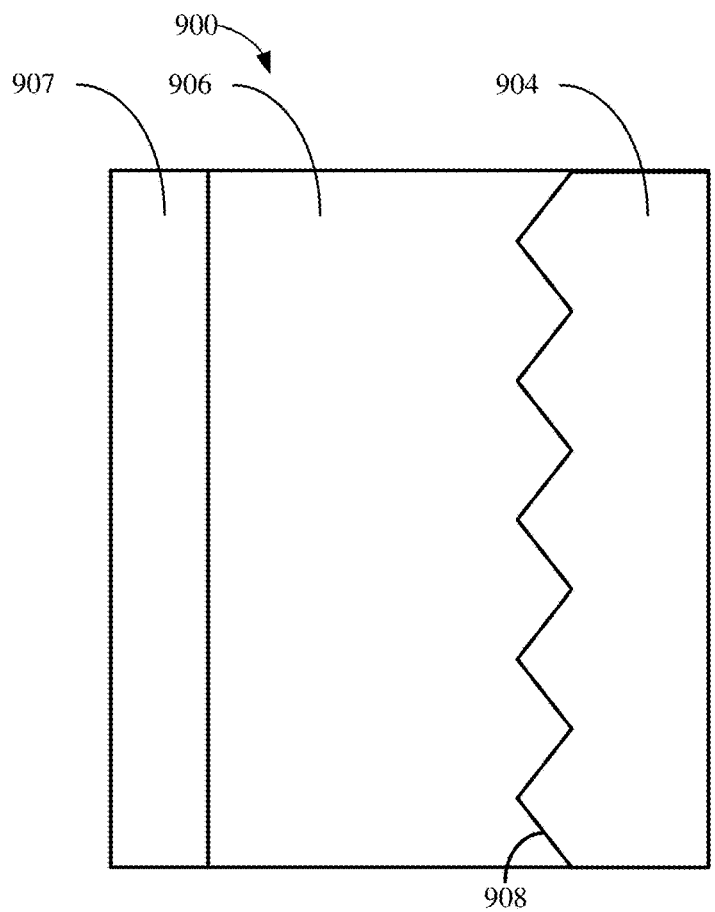
FIG. 9A is a depiction of an example DOE block including a DOE, a substrate, and a refractive material in between, where the DOE and the refractive material have the same refractive index.

FIG. 9A is a depiction 900 of a DOE block including a DOE 904, a substrate 907, and a refractive material 906 in between. In some aspects, the substrate 907 may be associated with a different DOE (not pictured) from the DOE 904. In some aspects, the substrate 907 may be an insulator, a transparent material, or otherwise. The refractive index of the DOE 904 and the refractive index of the refractive material 906 may be the same (e.g., the differences being less than a threshold). In this manner, the uneven surface 908 may seem to be non-existent to light passing through the refractive material 906 and the DOE 904. It will be appreciated that one or more of the features of the DOE block depicted in FIG. 9A may be reversed or otherwise arranged differently. As one non-limiting example, the DOE 904 may be on the left-side of the DOE block (e.g., with its uneven surface 908 facing to the right and merged into the refractive material 906). In this non-limiting example, the substrate 907 may be on the right side of the DOE block.

Figure 9B:
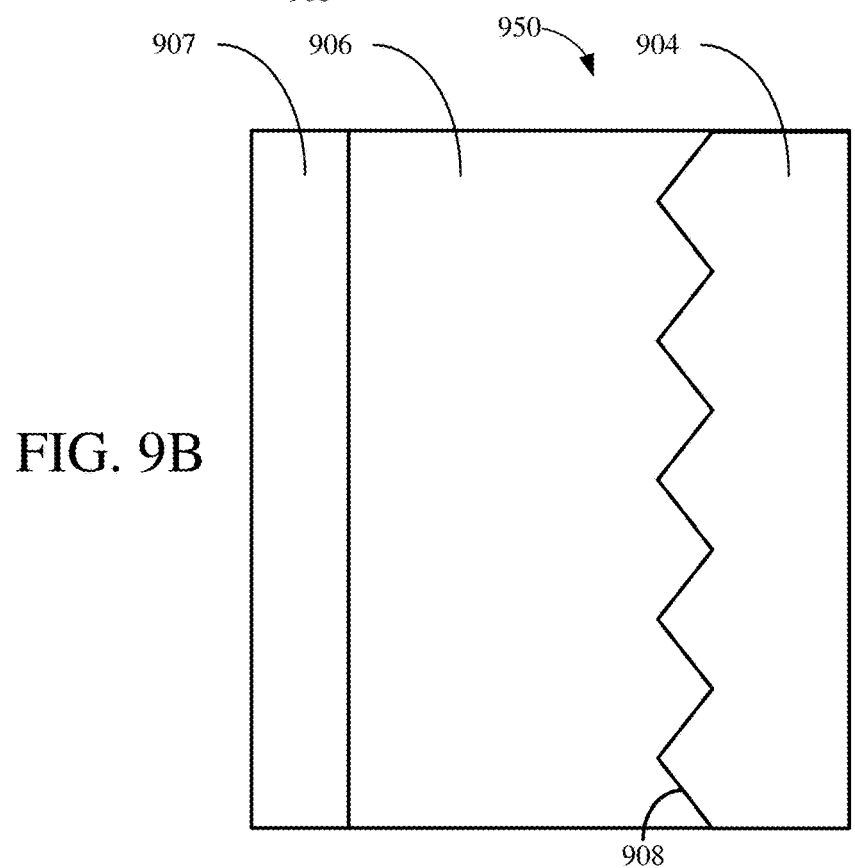
FIG. 9B is another depiction of another example DOE block including a DOE, a substrate, and a refractive material in between, where the DOE and the refractive material have the same refractive index.

FIG. 9B is a depiction 950 of the DOE block including the DOE 904, the substrate 907, and the refractive material 906 in between. Similar to FIG. 9A, the refractive index of the DOE 904 and the refractive index of the refractive material 906 may be the same (e.g., the differences being less than a threshold). In this manner, the uneven surface 908 may seem to be non-existent to light passing through the refractive material 906 and the DOE 904. Similar to the DOE block depicted in FIG. 9A, it will be appreciated that one or more of the features of the DOE block depicted in FIG. 9B may be reversed or otherwise arranged differently.

Figure 9C:
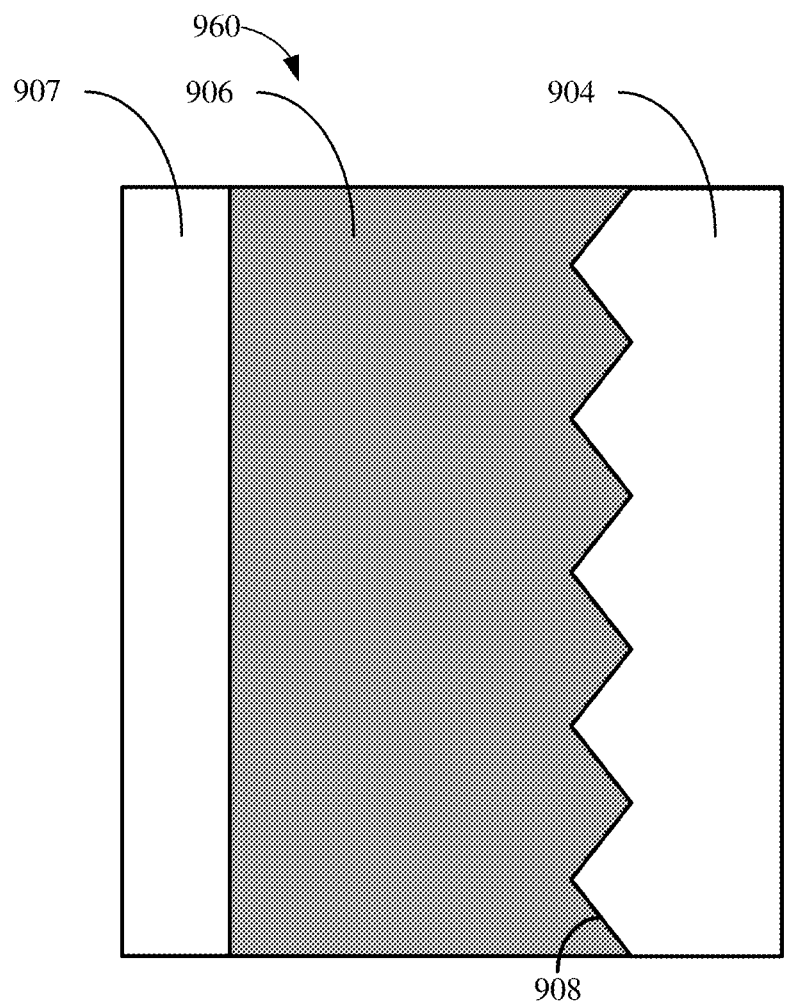
FIG. 9C is a depiction of an example DOE block including a DOE, a substrate, and a refractive material in between, where the DOE and the refractive material have different refractive indexes.

FIG. 9C is a depiction 960 of a DOE block including a DOE 904, a substrate 907, and a refractive material 906 in between. The refractive index of the refractive material 906 may be different from the refractive index of the DOE 904 (as indicated by shading). In this manner, the uneven surface 908 may affect the distribution of light passing through the DOE block. Similar to the DOE block depicted in FIG. 9A, it will be appreciated that one or more of the features of the DOE block depicted in FIG. 9C may be reversed or otherwise arranged differently.

While some example components, component arrangements, and component orientations for the DOE block are illustrated in FIGS. 9A-9C, other suitable components, component arrangements, and component orientations of the DOE block may be used, and the present disclosure should not be limited to the examples in FIGS. 9A-9C.

In some implementations, the projector includes two or more DOE blocks. In some example implementations, the projector may be configured to individually adjust the refractive index of the refractive material with respect to the light passing through each DOE block. The refractive index of the refractive material 906 may appear to be the same as the DOE 904 in some instances or operating modes and different than the DOE 904 in other instances or operating modes. In this manner, the refractive index of the refractive material 906 may appear to be the same as the DOE 904 for one or more of the DOE blocks and different for one or more of the DOE blocks. Through adjusting the refractive index of the refractive material 906 for each of the DOE blocks, the projector may be configured to adjust the generated light distributions from each individual DOE block. That is, the projector may be configured between using any combination of the two or more DOE blocks to generate the light distribution.

In some example implementations, the refractive index of the refractive material 906 may be based on the polarity of the light passing through the material. For example, a light with a first polarity may be associated with a first refractive index, while a light with a second polarity may be associated with a second refractive index for the refractive material 906. In some example implementations, the material may be a birefringent material, with one of the two refractive indexes being the refractive index of the DOE 904. A first refractive index of the material may be for polarized light with light waves (e.g., in a first linear direction). A second refractive index of the material may be for polarized light with light waves (e.g., in a second linear direction) 90 degrees to the first linear direction.

Figure 10:
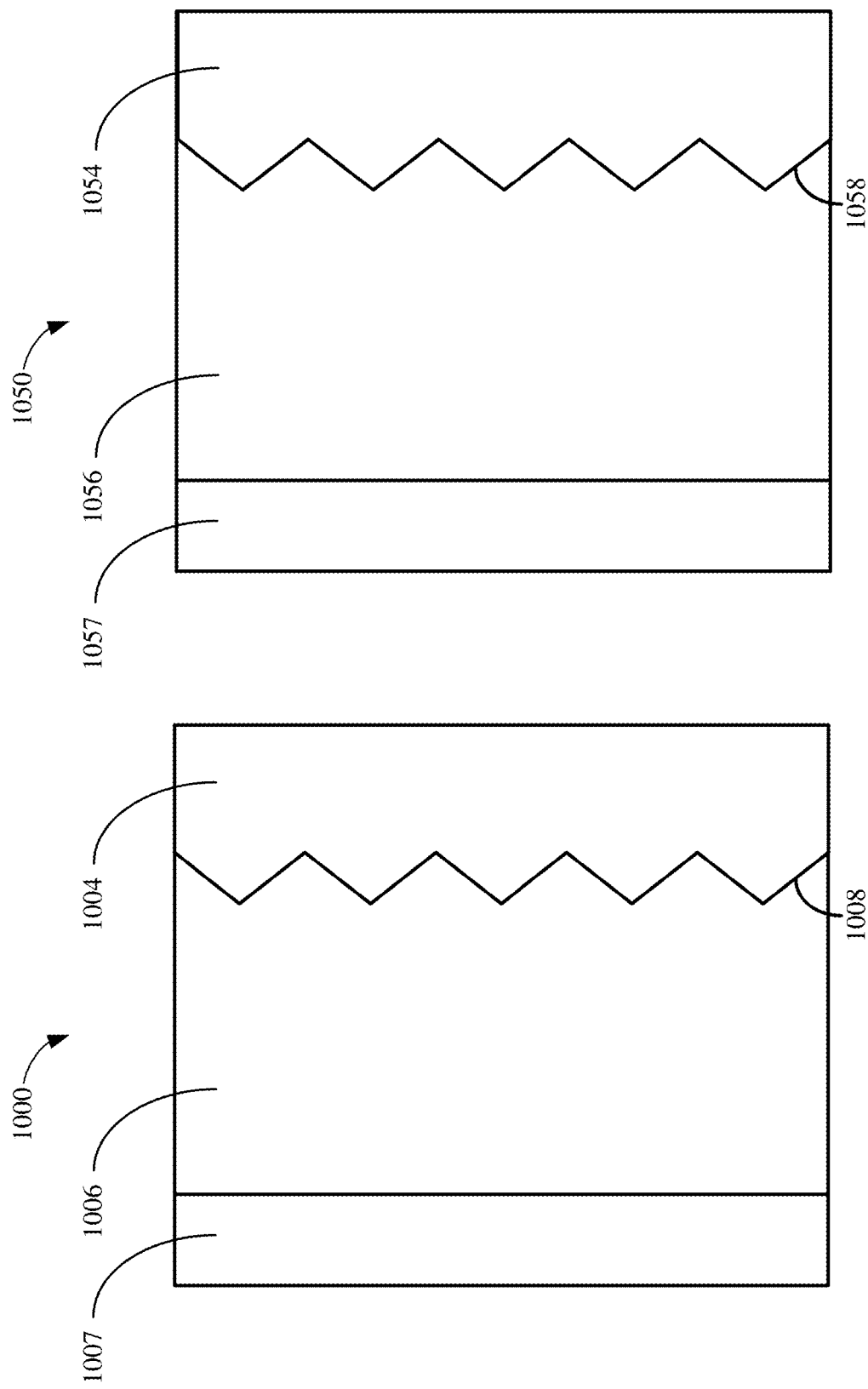
FIG. 10 depicts an example first DOE block and second DOE block.

FIG. 10 depicts a first DOE block 1000 and a second DOE block 1050. The DOE blocks may be similar to the DOE blocks depicted in FIGS. 9A-9D, such as the DOE block of FIG. 9A. For purposes of discussion herein, the first DOE block 1000 and the second DOE block 1050 may also be referred to as "the first DOE" and "the second DOE," respectively. The first DOE block 1000 includes a first DOE 1004 and a first substrate 1007 with a first refractive material 1006 in between. The first DOE 1004 has a first DOE surface 1008. The second DOE block 1050 includes a second DOE 1054 and a second substrate 1057 with a second refractive material 1056 in between. The second DOE 1054 has a second DOE surface 1058.

In some implementations, the first DOE block 1000 and the second DOE block 1050 may be aligned to form a single diffractive element for the light projector. In aligning DOE blocks, the DOE blocks may be stacked without separation from one another or may be separated a distance from one another. For purposes of discussion herein, the first DOE block 1000 and the second DOE block 1050 may collectively be referred to as a "diffractive element" or as a "DOE stack." While "DOE stack" may be used, the phrase does not infer that there is no space between DOE blocks. "DOE stack" may refer to aligned DOE blocks that are spaced apart or not separated by a distance. Further, for purposes of discussion herein, each DOE block of the DOE stack may also be referred to as a "stage." Two DOE blocks for a DOE stack are described for illustrative purposes, but any number of DOE blocks (such as three or more) may be aligned to form a DOE stack. The present disclosure should not be limited to a specific number of DOE blocks.

Further, while a specific orientation of the DOE blocks are shown, the DOE blocks may include other suitable orientations. For example, one or more of the DOE blocks may be flipped or reversed. As such, the present disclosure should not be limited to the specific orientations illustrated for the DOE blocks. It will be appreciated that one or more of the features of the first DOE block 1000 and/or the second DOE block 1050 may be flipped, reversed, or otherwise arranged differently. As one non-limiting example, one or both of the DOE 1004 and the DOE 1054 may be on the left-side of their respective DOE block (e.g., with the uneven surface 1008 and the uneven surface 1058, respectively, facing to the right and merged into the refractive material 1006 and the refractive material 1056, respectively). In this non-limiting example, one or both of the substrate 1007 and the substrate 1057, respectively, may be on the right side of their DOE block.

In some implementations, each of the first DOE block 1000 and the second DOE block 1050 may be capable of performing distinct light projector functions (such as a low resolution distribution, a high resolution distribution, flood illumination, among other light projector functions). In one example, the first DOE block 1000 may be configured to generate a high resolution distribution, and the second DOE block 1050 may be configured for flood illumination. For purposes of discussion herein, the high resolution distribution may be referred to as a distribution having a first resolution, and the low resolution distribution may be referred to as a second resolution different from the first resolution. In some aspects, a first number of dots per square unit (such as square inches) may be above a resolution threshold for the first resolution, and in some aspects, a second number of dots per square unit may be below the resolution threshold for the second resolution. In some implementations, one or more DOEs may be configured to generate the high resolution distribution. In some implementations, one or more DOEs may be configured to generate the low resolution distribution. In some aspects, when two or more DOEs generate the low resolution, the final light distribution may effectively be the high resolution distribution. Any other suitable combination of functions may be possible, and the present disclosure should not be limited to the above examples.

In some implementations, each of the first DOE block 1000 and the second DOE block 1050 may be independently adjustable (or "toggled") to be enabled (or "on") or disabled (or "off"). In some implementations, depending on which of the DOEs are enabled (the first DOE block 1000, the second DOE block 1050, neither, or both), the overall distribution of light projected from the diffractive element may be different. Each different projection may also be referred to herein as a "function" or a "mode." For example: the light projector may be said to be operating in a "first mode" when a first stage of the DOE stack (such as the first DOE block 1000) is enabled (such as for high resolution distribution) and a second stage of the DOE stack (such as the second DOE block 1050) is disabled; the light projector may be said to be operating in a "second mode" when the first DOE block 1000 is disabled and the second DOE block 1050 is enabled (such as for flood illumination); the light projector may be said to be operating in a "third mode" when both the first DOE block 1000 and the second DOE block 1050 are enabled; and the light projector may be said to be operating in a "fourth mode" when both the first DOE block 1000 and the second DOE block 1050 are disabled.

As will be further described below (such as for FIG. 17), in some implementations, the DOE stack may include more than two DOE blocks or "stages." In some implementations, each DOE of the DOE stack may be toggled on or off to provide a different function or light distribution for the light projector. Similar to the first through fourth modes described above, each possible combination of enabled or disabled DOEs of the DOE stack may represent a mode of operation for the light projector. That is, the light projector may be configured between using any combination of the two or more DOE blocks to generate the light distribution.

In some implementations, the number of possible operating modes (or light distributions) for the light projector may increase (for example, exponentially) with the number of DOEs in the DOE stack. For example: a single DOE (such as the first DOE block 1000) in the DOE stack may enable two ($2^1$) possible operating modes; two DOEs (such as the first DOE block 1000 and the second DOE block 1050) in the DOE stack may enable four ($2^2$) possible operating modes; three DOEs (such as the first DOE block 1000, the second DOE block 1050, and a third DOE block (not illustrated)) in the DOE stack may enable eight ($2^3$) possible operating modes; four DOEs (such as the first DOE block 1000, the second DOE block 1050, a third DOE block (not illustrated), and a fourth DOE block (not illustrated)) in the DOE stack may enable sixteen ($2^4$) possible operating modes; and so on.

In some implementations, the two or more DOEs of the DOE stack for the light projector described herein may share certain device components, such as a laser, a lens, a package, etc. Thus, the cost to manufacture the light projector described herein may be lower than for a device that requires separate device components for each DOE. Furthermore, the size of the light projector described herein may be smaller than that of separate light projectors that require separate device components for each DOE.

In some example implementations, the refractive material for a DOE block may be birefringent, and the refractive index of the refractive material may depend on the polarity of the light passing through the refractive material. In this manner, the DOE of the DOE block (including the birefringent refractive material) may be toggled on or off by adjusting the polarity of the light passing through the DOE block.

Figure 11:
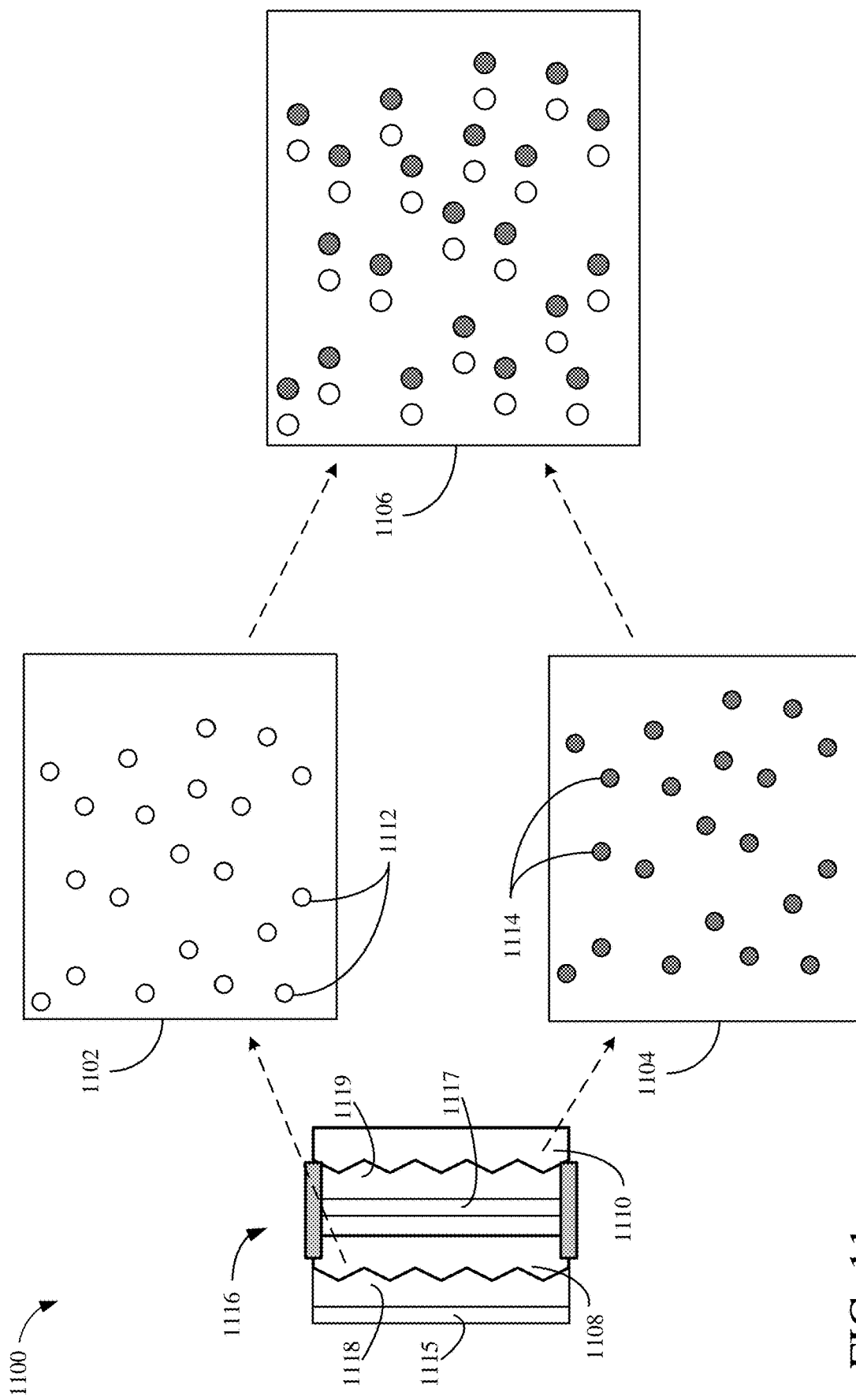
FIG. 11 is a depiction of example first and second distributions combined for a combined distribution.

FIG. 11 is a depiction 1100 of example first and second distributions 1102 and 1104 combined for a combined (or final) distribution 1106. It contains two DOE blocks, which may be the same or similar to the first DOE block 1000 (FIG. 10) and the second DOE block 1050 (FIG. 10), respectively. While the orientation of DOEs 1108 and 1110 (and for any other DOEs discussed herein) are illustrated as having their uneven surfaces each oriented to the left, any suitable orientation of the DOEs may be used. For example, the uneven surfaces may be oriented in opposite directions. Furthermore, the arrangement of the diffractive element 1116 as depicted in FIG. 11 should not be construed as limiting the possible configurations for a diffractive element for the present disclosure. For example, the diffractive element of FIG. 11 may be arranged in any other fashion (such as those described in connection with, and depicted in, for example, FIG. 15 and/or FIG. 19), while the other concepts described in connection with FIG. 11 may still apply. The present disclosure should not be limited by the specific example in FIG. 11.

For light passing from left to right through the diffractive element 1116, the first DOE 1108 may generate the first distribution 1102 with light points 1112. The second DOE 1110 may generate the second distribution 1104 with light points 1114. The combined distribution thus may include the light points 1112 and 1114. FIG. 11 illustrates the second distribution 1104 being a spatial shift of the first distribution 1102. However, the distributions 1102 and 1104 may include different numbers or different locations of light points other than a uniform shift of the light points between distributions. Further, while FIG. 11 illustrates the distributions 1102 and 1104 being interleaved in the combined distribution 1106, the distributions may be combined in other ways, such as being stacked, tiled, or otherwise non-interleaved.

If the overall diffractive element 1116 is configurable, a projector may be able to adjust between projecting the distributions 1102-1106 for different operating modes. In one example, the projector may be configured to adjust between projecting the first distribution 1102 and projecting the combined distribution 1106. In another example, if the second distribution 1104 includes a greater number of light points 1114 than the number of light points 1112 of the first distribution 1102, the projector may be able to adjust between projecting the first distribution 1102, projecting the second distribution 1104, and projecting the final distribution 1106. In this manner, a projector may project fewer light points for scenes with more ambient light (such as outdoors during a sunny day) and may project more light points for scenes with less ambient light (such as indoors or night time). The projector may adjust which distributions of light are to be projected by adjusting the refractive indexes of a refractive material 1118 for the DOE 1108 and/or a refractive material 1119 for the DOE 1110 in relation to the light passing through the diffractive element 1116. In some implementations, a layer of transparent electrode film (e.g., indium tin oxide) may be deposited on each DOE substrate and/or a cover substrate for each DOE block (e.g., substrate 1115 and substrate 1117).

In some example implementations, the refractive indexes of the refractive material 1118 and/or the refractive material 1119 for the diffractive element 1116 may be adjustable by adjusting the polarity of the light passing through each DOE blocks. In some implementations, a polarity of the first DOE block may be different from a polarity of the second DOE block. For example, referring to FIG. 13, the polarity of the light passing through each of the DOE blocks may be adjusted between a first polarity (e.g., 1304 in FIG. 13), a second polarity (e.g., 1306 in FIG. 13), and/or a polarity between the first polarity and the second polarity. In some other example implementations, the refractive indexes of the refractive material 1118 and/or the refractive material 1119 for the element 1116 may be adjusted by adjusting the physical properties (and thus the refractive index) of the refractive materials 1118 and 1119. By adjusting the physical properties of the refractive materials 1118 and 1119, the distribution of light may be adjusted regardless whether the light passing through the diffractive element 1116 is polarized. For example, a distribution of unpolarized light may be adjusted based on adjusting the refractive indices of the refractive materials 1118 and 1119.

Figure 12:
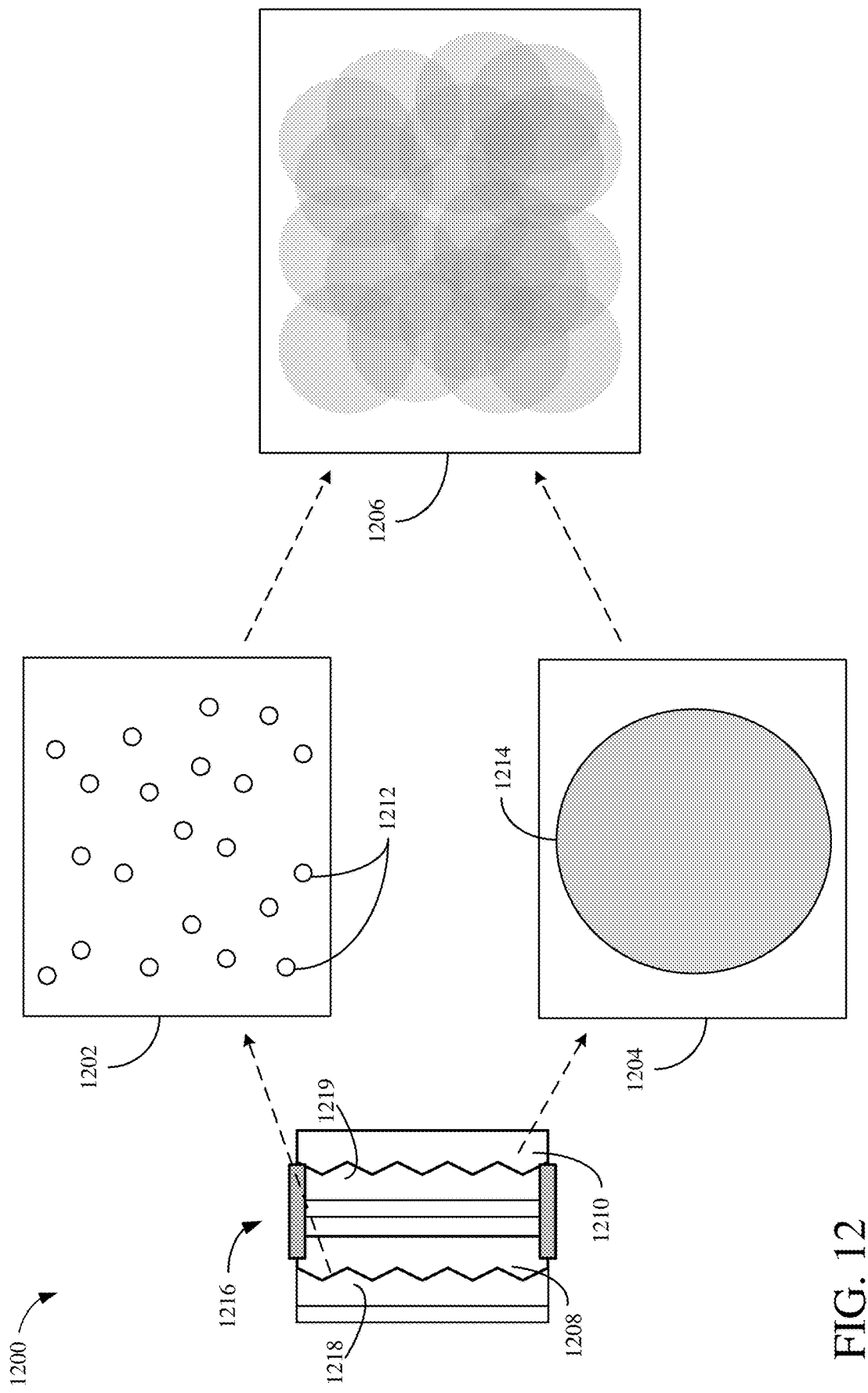
FIG. 12 is a depiction of an example distribution and an example flood illumination combined for a projector.

FIG. 12 is a depiction 1200 of an example distribution 1202 and a flood illumination 1204 that may be projected by a configurable diffractive element 1216 that contains two DOE blocks. DOE 1208 may project the distribution 1202 with light points 1212. The DOE 1210 (which may be a diffusion element, in some implementations) may project a flood illumination 1204 with a diffusion 1214. If the overall diffractive element 1216 is configurable, a projector may be able to adjust between projecting the distributions 1202-1206 for different operating modes. In one example, the refractive indexes for refractive material 1218 and/or refractive material 1219 for the diffractive element 1216 may be adjustable to adjust between projecting the distribution 1202 and the combined projection 1206. The combined projection may include a sufficient diffusion of the light for flood illumination. In another example, the refractive indexes for the diffractive element 1216 may be adjustable to switch between projecting the distribution 1202 and the flood illumination 1204. In some example implementations, the refractive indexes of the refractive material 1218 and the refractive material 1219 may be adjustable, or the polarity of the light passing through each of the DOE blocks may be adjustable. While the example in FIG. 12 illustrates the DOE 1210 as a diffusion element, after the DOE 1208 (with light travelling from left to right), the ordering of the elements 1208 and 1210 may be switched. Further, while the uneven surfaces of the elements are illustrated as oriented to the left, the uneven surfaces may be oriented in opposite directions. Furthermore, the arrangement of the diffractive element 1216 as depicted in FIG. 12 should not be construed as limiting the possible configurations for a diffractive element for the present disclosure. For example, the diffractive element of FIG. 12 may be arranged in any other fashion (such as those described in connection with, and depicted in, for example, FIG. 15 and/or FIG. 19), while the other concepts described in connection with FIG. 12 may still apply. The present disclosure should not be limited by the specific example in FIG. 12. In some implementations, the first (e.g., the left) DOE block may be an always-on DOE including DOE 1208 and not including the refractive material 1218 (e.g., with its uneven surface facing the air, as depicted in FIG. 12). In this example (not pictured), the always-on DOE will generate a light distribution 1202, and when the second DOE 1210 is switched off, the light distribution will be projection 1202. In contrast, when the second DOE 1210 is switched on, the light distribution will be projection 1206, which the light projector may use for flood illumination. As such, the projection may be switched between a dot distribution projection 1202 (e.g., for 3D depth sensing) and a flood illumination projection 1206 (e.g., for face recognition).

Referring back to the diffractive element 1116 in FIG. 11, and similar for the element 1216 in FIG. 12, the refractive indexes of the refractive materials 1118 and 1119 for FIG. 11 may be adjusted when electric charges are applied to the refractive materials 1118 and 1119 respectively. For example, when an electricity is applied, the refractive material 1118 and 1119 may be birefringent materials with a first refractive index for light with a first polarity (e.g., 1304 in FIG. 13) and a second refractive index for light with a second polarity (e.g., 1306 in FIG. 13). The first refractive index may be sufficiently similar to the refractive index of a first DOE (e.g., DOE 1108). The second refractive index may be sufficiently similar to the refractive index of a second DOE (e.g., DOE 1110). When electricity is applied to the refractive materials 1118 and 1119, and when the polarization is the second polarization (e.g., 1306 of FIG. 13), the light will be affected (or "diffracted") by the first DOE 1108 and not by the second DOE 1110, because the refractive index of the refractive material 1119 with the light of a second polarization may be sufficiently identical to the refractive index of the second DOE 1110. As such, the output light distribution may be 1102. When the light is unpolarized or having a polarity between the first polarity (e.g., 1304 of FIG. 13) and the second polarity (e.g., 1306 of FIG. 13), the light of the first polarity will be affected (or "diffracted") by the second DOE 1110, while the light of the second polarity will be affected (or "diffracted") by the first DOE 1108. As such, the output light distribution may be the combined distribution projection 1106.

The refractive material may be coupled to one or more electrical contacts for applying electricity to the refractive material. In some examples of the element 1116 configured to apply electricity to the refractive materials 1118 and 1119, the two DOEs 1108 and 1110 may be fabricated on two substrates. A layer of transparent electrode film (e.g., indium tin oxide) may be deposited on each DOE substrate and/or a cover substrate for each DOE block (e.g., substrate 1115 and substrate 1117). The transparent electrode film may thus conduct electricity and apply the electricity to the refractive materials 1118 and 1119.

An example refractive material 1118 (or 1119) is a liquid crystal (LC). The LC includes a plurality of molecules with one or more orientations, and the orientation of the molecules affects the refractive index of the LC. In this manner, the refractive index of an LC may be configured by orienting the molecules of the LC. For example, if the orientation of the molecules are perpendicular to the LC (or the DOE surfaces), the refractive index of the LC may be one refractive index. The molecules may be oriented perpendicular to the LC by applying an electricity to the LC (such as via one or more electrical contacts). If no electricity is applied, the molecules may shift to different orientations. For some birefringent LCs, the molecules may be oriented in one orientation when no electricity is applied. In this manner, the portion of the light energy with the corresponding first polarity (e.g., 1304 of FIG. 13) is experiencing the first refractive index with the polarity along the molecules orientation, and the remainder of the light energy with the corresponding second polarity (e.g., 1306 of FIG. 13) perpendicular to the molecules orientation is experiencing the second refractive index. For some other birefringent LCs, the molecules may be in a first orientation when no electricity is applied and in a second orientation when electricity is applied. For some further birefringent LCs, the molecules may be randomly oriented with an average or overall refractive index of the LC as a result of the orientations of the molecules. In manufacturing the diffractive element 1116 (FIG. 11) or the diffractive element 1216 (FIG. 12), where the refractive material is an LC, the molecules of the LC may be aligned and oriented in any suitable manner so that the refractive indexes may be adjusted based on applying an electricity to the refractive material or adjusting the polarity of the light passing through the diffractive element 1116 or the diffractive element 1216. If the polarity of the light is adjusted, an electricity may not be applied to the LC. In this manner, the refractive indexes of the LC changes with the change of the light polarization throughout operation of the light projector (and thus the light distribution is based on the polarity of the light passing through the elements).

In applying an electricity to the refractive material between the DOEs, the projector may be similar to the projector 200 in FIG. 2 or to the projector 300 in FIG. 3, other than the DOE 208 or 308 being replaced with a diffractive element having multiple DOEs and a refractive material (such as an LC) in between. The diffractive element may be adjusted by applying electricity to the refractive material via electrical contacts (such as via an indium tin oxide layer).

Figure 13:
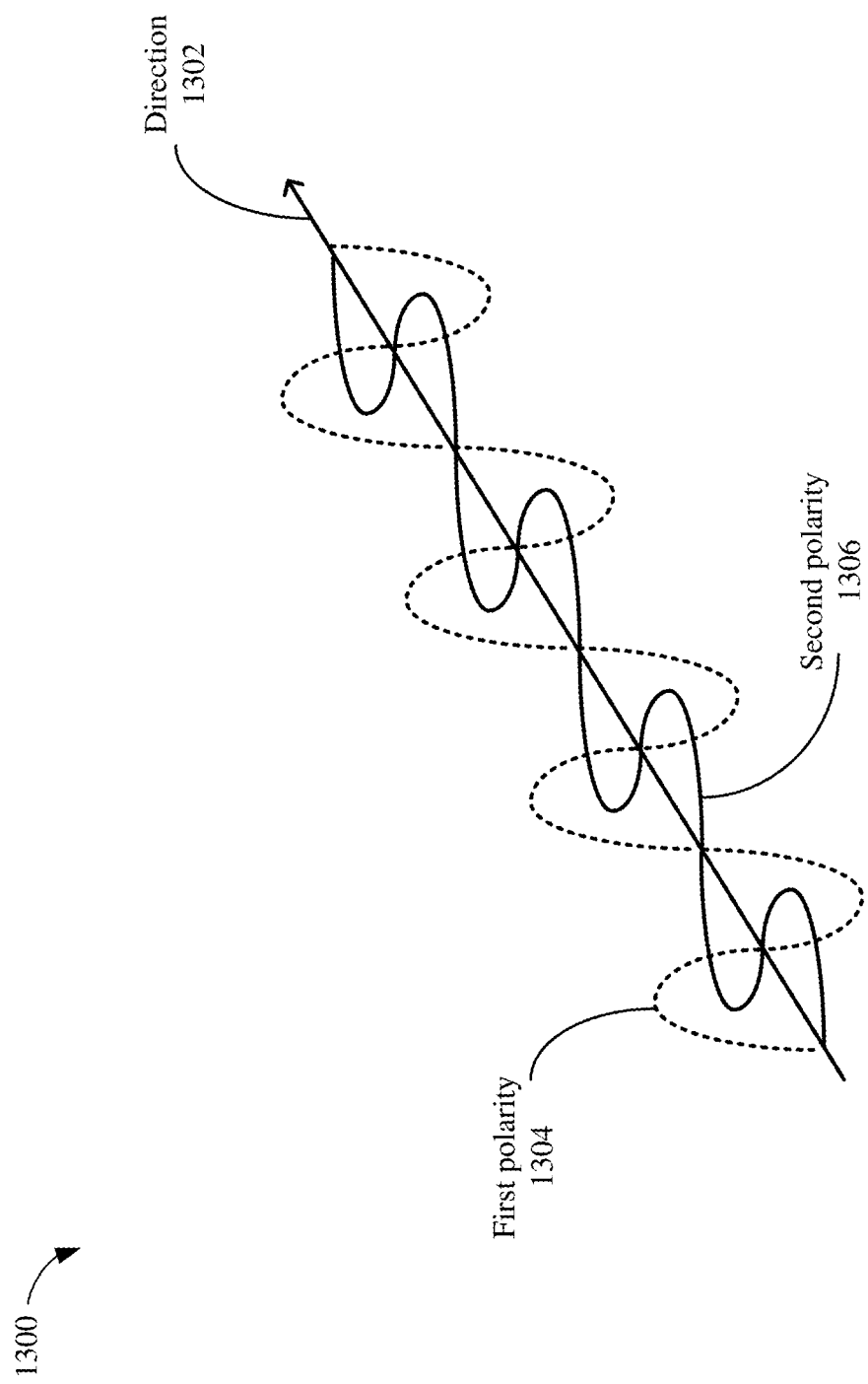
FIG. 13 is a depiction of example polarization orientations including a first polarity and a second polarity ninety degrees from each other.

FIG. 13 is a depiction 1300 of an example waveform for a first polarity 1304 and an example waveform for a second polarity 1306 ninety degrees to the first polarity 1304 (e.g., for light travelling in direction 1302). In some implementations, unpolarized light travelling along direction 1302 includes light with waveforms in any plane on the direction 1302. For example, a portion of the unpolarized light may have the first polarity 1304, another portion of the unpolarized light may have the second polarity 1306, and other portions of the unpolarized light may have polarities between the first polarity 1304 and the second polarity 1306.

Each of the portions of light can be modeled as including a first energy with a first polarity (e.g., the first polarity 1304) and including a second energy with a second polarity (e.g., the second polarity 1306). For example, light with a polarity 45 degrees to the first polarity 1304 and the second polarity 1306 may be modeled as having half of its energy with the first polarity 1304 and having the other half of its energy with the second polarity 1306. Other portions of the unpolarized light may be modeled similarly.

A DOE (e.g., the DOE 904 of FIGS. 9A-C) may be attached to a birefringent material (e.g., the refractive material 906 of FIGS. 9A-C) that has a refractive index based on the polarity of the light passing through it. In some aspects, the DOE may not affect or alter light with a polarity associated with the refractive index of the refractive material that is identical to the refractive index of the DOE. For example, the light with the first polarity 1304 may experience a refractive index in the refractive material 906 that is sufficiently different from the refractive index of the DOE 904. At the same time, the light with the second polarity 1306 may experience a refractive index in the refractive material 906 that is sufficiently identical to the refractive index of the DOE 904. In this manner, if light passing through a DOE block (e.g., collectively, the elements 904, 906, and 907, of FIG. 9) includes a first energy with the first polarity 1304 and a second energy with the second polarity 1306, the first energy of the light may be affected or altered based on the surface 908 of the DOE 904, while the second energy of the light may not be affected or altered based on the surface 908 of the DOE 904. In some implementations, the light from the light source may be altered prior to passing through the DOE 904. In some aspects, for example, the light may pass through a polarity rotator prior to passing through the DOE 904. In some aspects, for example, the projector may apply a voltage to the refractive material 906 so that the light from the light source is altered prior to passing through the DOE 904.

In some implementations, the device may include two cascaded DOEs (e.g., the DOE 1004 of FIG. 10 cascaded with the DOE 1054 of FIG. 10). When an input light is unpolarized (or polarized light 45 degrees to the first polarity 1304 and the second polarity 1306), the DOE 1004 may alter the light of the first polarity 1304 and not alter the light of the second polarity 1306, while the DOE 1054 may alter the light of the second polarity 1306 and not alter the light of the first polarity 1304. In this way, if the DOE 1004 distributes (or replicates) light from a light source (such as a laser or a laser array) into a first distribution of light points, the first energy of the light is divided into the light points of the first distribution. In some aspects, the altered light of the first polarity 1304 may go through the DOE 1054 unaffected, and the unaltered light of the second polarity 1306 may be altered by the DOE 1054. And if the DOE 1054 distributes (or replicates) light from a light source (such as a laser or a laser array) into a second distribution of light points, the second energy of the light may be divided into the light points of the second distribution. The first distribution and the second distribution may be interleaved or otherwise combined (such as without any points between the distributions overlapping) to generate the final distribution for the projector. While the provided examples use the first polarity 1304 and the second polarity 1306 in FIG. 13, any perpendicular polarities along a direction may be used, and the example polarities are provided for ease of explanation. The present disclosure should not be limited to specific directions for the polarities regarding the refractive indexes.

Figure 14:
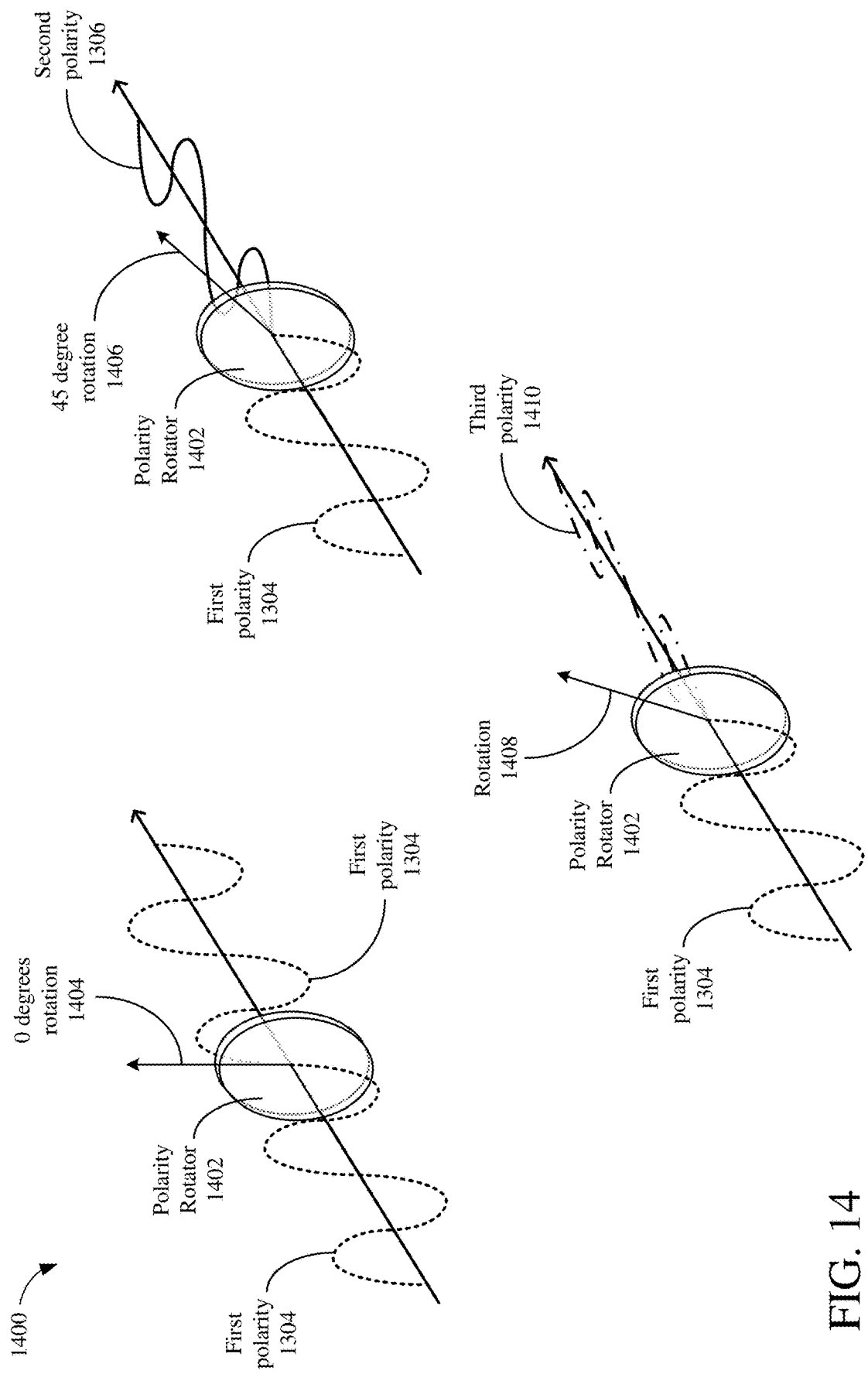
FIG. 14 is a depiction of example adjustments to the polarity of the light by adjusting a polarity rotator.

FIG. 14 is a depiction 1400 of example adjustments to the polarity of the light by adjusting the orientation of a polarity rotator 1402. The examples illustrate a half-wave plate as the polarity rotator 1402 in adjusting the polarity, but any suitable component may be used. In some examples, light with a first polarity 1304 (as illustrated in FIG. 13) may remain at the first polarity 1304 when the polarity rotator 1402 has a 0 degree rotation 1404. Light with the first polarity 1304 may be changed to a second polarity 1306 when the polarity rotator 1402 has a 45 degree rotation 1406. Light with the first polarity 1304 may be changed to a third polarity 1410 (e.g., a polarity between the first polarity 1304 and the second polarity 1306) when the polarity rotator 1402 has a rotation 1408 between 0 degrees and 45 degrees. Thus, light with the third polarity 1410 may have a first component with the first polarity 1304 and a second component with the second polarity 1306.

Figure 15:
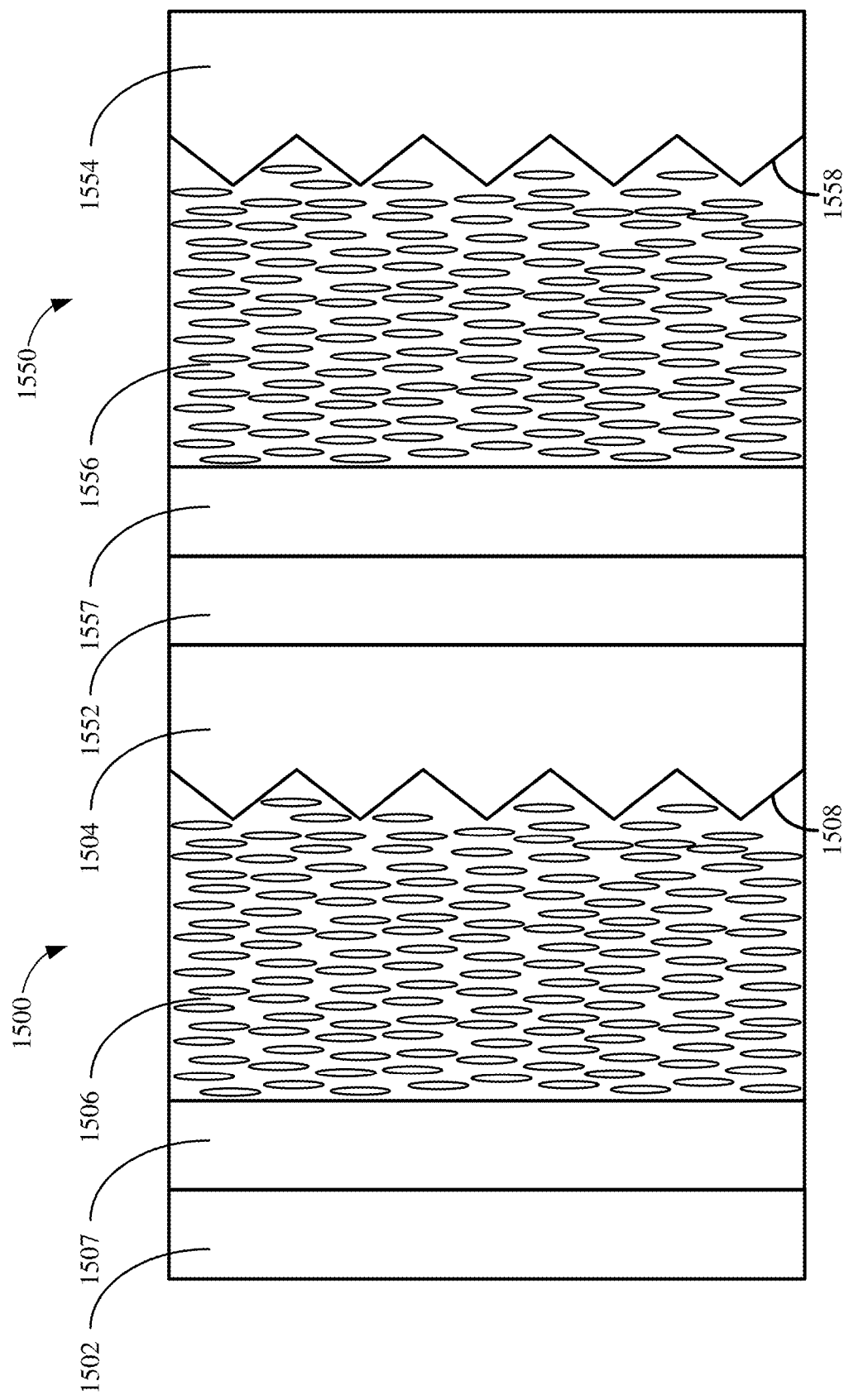
FIG. 15 depicts another example first DOE block and second DOE block.

FIG. 15 depicts a first DOE block 1500 and a second DOE block 1550. The first DOE block 1500 and the second DOE block 1550 may be similar to the first DOE block 1000 (FIG. 10) and the second DOE block 1050 (FIG. 10), respectively, except that the first DOE block 1500 and the second DOE block 1550 also include a first polarity rotator 1502 and a second polarity rotator 1552, respectively. For purposes of discussion herein, the first DOE block 1500 and the second DOE block 1550 may also be referred to as "Type-1" or "Passive" DOE blocks. The first DOE block 1500 includes a first DOE 1504 and a first substrate 1507 with a first refractive material 1506 in between. The first DOE 1504 has a first DOE surface 1508. The second DOE block 1550 includes a second DOE 1554 and a second substrate 1557 with a second refractive material 1556 in between. The second DOE 1554 has a second DOE surface 1558. In some implementations, as depicted in the example of FIG. 15, the second polarity rotator 1552 may be aligned with the first DOE 1504 so as to "stack" the second DOE block 1550 on the first DOE block 1500. It will be appreciated that one or more of the features of the first DOE block 1500 and/or the second DOE block 1550 may be flipped, reversed, or otherwise arranged differently. As one non-limiting example, one or both of the DOE 1504 and the DOE 1554 may be on the left-side of their respective DOE block (e.g., with the uneven surface 1508 and the uneven surface 1558, respectively, facing to the right and merged into the refractive material 1506 and the refractive material 1556, respectively). In this non-limiting example, one or both of the substrate 1507 and the substrate 1557 may be on the right side of their respective DOE block.

Similar to the first DOE block 1000 and the second DOE block 1050 (FIG. 10), each of the first DOE block 1500 and the second DOE block 1550 may be independently adjustable (or "toggleable") to be enabled (or "on") or disabled (or "off"). In some implementations, the first DOE block 1500 may be toggled by rotation of the first polarity rotator 1502, and the second DOE block 1550 may be toggled by rotation of the second polarity rotator 1552. In some aspects, the second DOE block 1550 may be adjustable based on rotation of both the first polarity rotator 1502 and the second polarity rotator 1552.

In some implementations, the first refractive material 1506 and the second refractive material 1556 may include birefringent material, such as liquid crystal (LC). In some aspects, an orientation of the LC molecules may correspond to a refractive index of the subsequent DOE. In some aspects, when all of the LC molecules of the refractive material are oriented in a uniform orientation, the material may be considered to be birefringent. In some implementations, the LC molecules of the LC may be oriented parallel to the DOE surface for the respective DOE block (e.g., molecule orientation 2022 of FIG. 20). For example, as illustrated in FIG. 15 (a LC-axis, which represents the orientation of the LC molecules for that refractive material), the LC molecules of the first refractive material 1506 may be oriented parallel to the first DOE surface 1508, and the LC molecules of the second refractive material 1556 may be oriented parallel to the second DOE surface 1558. In some implementations, each of the first DOE 1504 and the second DOE 1554 may have a refractive index. In some implementations, each of the LC for the DOE blocks may have refractive indices. In some aspects, when the refractive index for the LC is $n_o$ ("ordinary"), the polarity of the input light may be perpendicular to the LC axis, and when the refractive index for the LC is $n_e$ ("extraordinary"), the polarity of the input light may be parallel to the LC axis. In some aspects, the refractive index for a DOE may be sufficiently similar to $n_o$ or $n_e$ of the LC birefringent material refractive indices. In some aspects, when the first polarity rotator 1502 (or the second polarity rotator 1552) sets the polarity for the first refractive material 1506 (or the second refractive material 1556) to be perpendicular to the LC axis of LC 1506 (or LC 1556), the refractive indices of the LC for the first refractive material 1506 (or the second refractive material 1556) may be $n_o$. In some aspects, when the first polarity rotator 1502 (or the second polarity rotator 1552) sets the polarity for the first refractive material 1506 (or the second refractive material 1556) to be parallel to the LC axis of LC 1506 (or LC 1556), the refractive indices of the LC for the first refractive material 1506 (or the second refractive material 1556) may be $n_e$. In some implementations, a DOE block may be rotated in relation to the polarity of the light passing through the DOE block. In some aspects, the light projector may rotate the DOE block as an alternative to a polarity rotator (such as the first polarity rotator 1502) adjusting the polarity (such as for the refractive material).

Figure 16A:
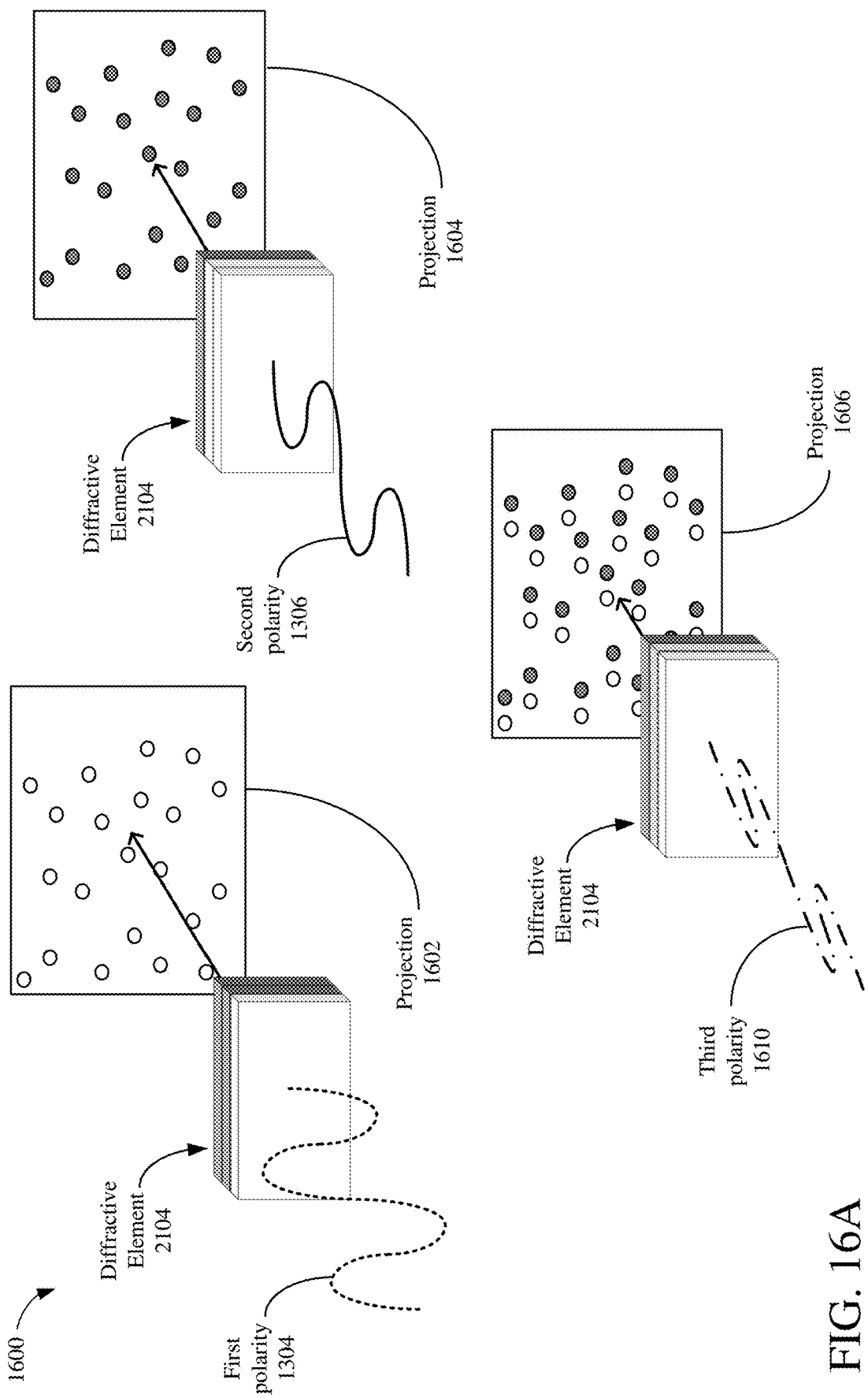
FIG. 16A is a depiction of example projections based on the polarity of light passing through the diffractive element.

FIG. 16A is a depiction 1600 of the projections based on the polarity of light passing through a diffractive element 2104. In some implementations, the diffractive element 2104 may be the same or similar as the diffractive elements described in connection with FIG. 11. For light having a first polarity (e.g., the first polarity 1304 of FIG. 13), the first DOE of the diffractive element 2104 may divide the light into the projection 1602 (with the second DOE having no impact on the distribution of light). For light having a second polarity (e.g., the second polarity 1306 of FIG. 13), the second DOE of the diffractive element 2104 may divide the light into the projection 1604 (e.g., with the first DOE having no impact on the distribution of light). The projection 1604 may have more or less light points than the projection 1602. In this manner, a projector 2100 may adjust the density of the distribution of light points by rotating the polarity of the light by 90 degrees.

For light having a third polarity 1610 (e.g., a polarity between the first polarity 1304 and the second polarity 1306), each DOE of the diffractive element 2104 may divide a portion of the light into the projection 1602 and the projection 1604 combined to generate the projection 1606. If the projection 1604 includes more or less light points than the projection 1602, the angle of the third polarity 1610 may be based on the number of light points of the projection 1604 relative to the number of light points of the projection 1602 so that each light point in the projection 1606 has the same energy. For example, if the projection 1604 includes twice as many light points as the projection 1602, the energy may be dispersed twice as much for the projection 1604 than for the projection 1602. As a result, the third polarity 1610 may be at 54.7 degrees relative to the first polarity 1304 at 0 degrees so that twice as much energy is to be dispersed for the projection 1604 than for the projection 1602. If the projection 1604 has the same number of light points as the projection 1602, the light energy may be divided equally between the first polarity 1304 and the second polarity 1306, and the third polarity 1610 may be at 45 degrees relative to the first polarity 1304 at 0 degrees. While FIG. 16A is depicted regarding adjusting the density of a distribution of light points, the same may apply for adjusting between a distribution of light points for active light depth sensing and a diffuse light for flood illumination.

Figure 16B:
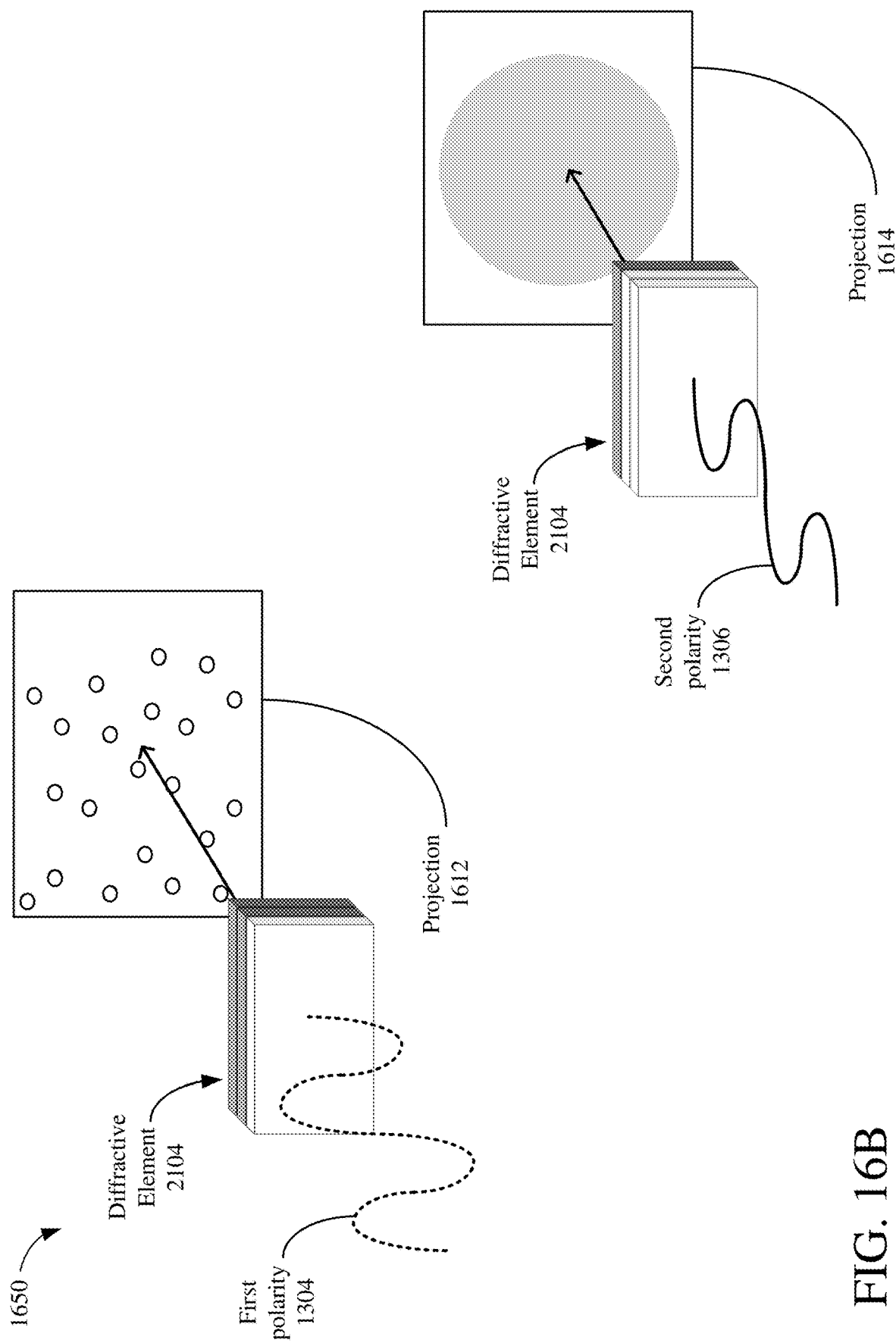
FIG. 16B is a depiction of further example projections based on the polarity of light passing through the diffractive element.

FIG. 16B is a depiction 1650 of projections including a distribution of light points or flood illumination based on the polarity of light passing through the diffractive element 2104. For light having the first polarity 1304, the first DOE of the diffractive element 2104 may divide the light into the projection 1612 (with the second DOE (diffusion element) having no impact). For light having the second polarity 1306, the second DOE (diffusion element) of the diffractive element 2104 may diffuse the light for flood illumination, such as illustrated by the projection 1614. In this manner, the projector 2100 may adjust between projecting a distribution of light points and flood illumination by rotating the polarity of the light 90 degrees.

With a projector configured to adjust its projection (such as adjusting the density of the distribution of light points or adjusting between projecting a distribution of light points and flood illumination), a device including the projector may be configured to control operation of the projector. For example, the device 600 (FIG. 6) may be configured to control operation of the transmitter 601, including adjusting the distribution of light from the transmitter 601. The distribution of light may be adjusted by adjusting the refractive indexes of a diffractive element in the transmitter 601 (such as through applying an electricity to a birefringent refractive material, such as an LC, or through adjusting the polarity of the light passing through the diffractive element). Combining a DOE for generating a distribution of light points and a diffusion element for flood illumination may be similar to the example in FIG. 11.

Figure 17:
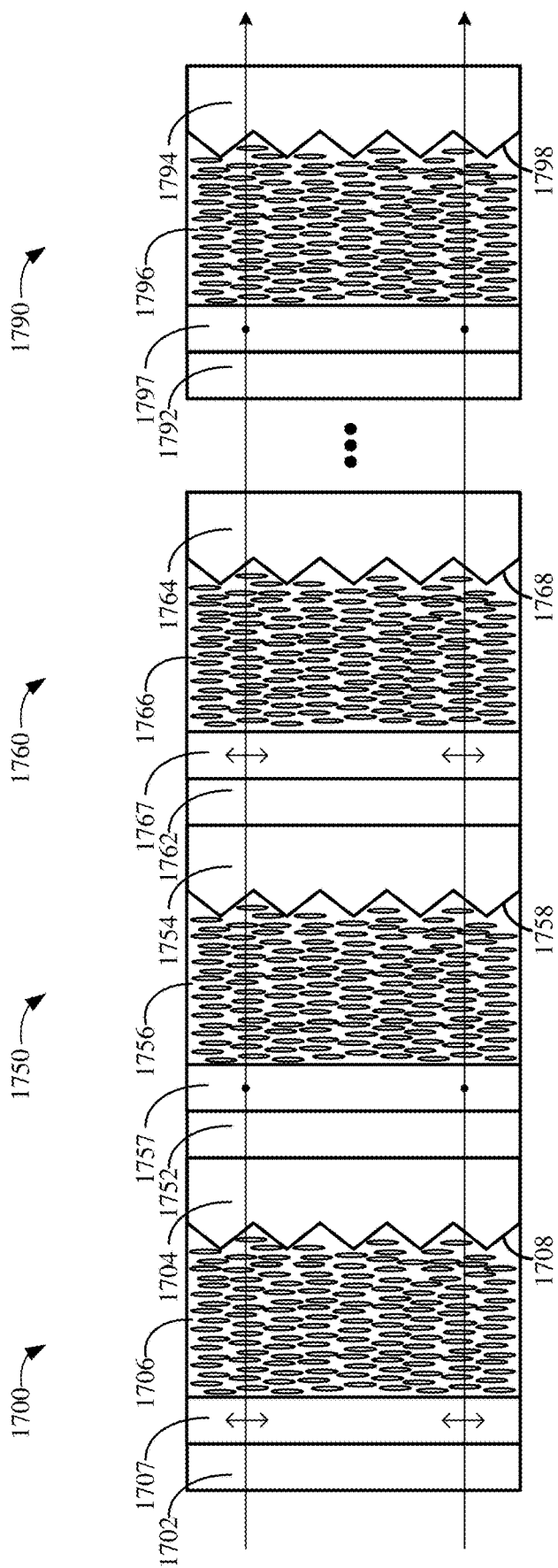
FIG. 17 depicts an example first DOE block, second DOE block, third DOE block, up to an nth DOE block.

Although two DOE blocks have been depicted and described herein, any number of DOE blocks may be present in the DOE stack. To that end, FIG. 17 depicts a first DOE block 1700, a second DOE block 1750, a third DOE block 1760, and so on up to an nth DOE block 1790. For purposes of discussion herein, the nth DOE block 1790 (and its respective components) may represent any number of additional DOE blocks (and their respective components) aligned with the third DOE block 1760. As one non-limiting example, the nth DOE block 1790 may represent seven additional DOE blocks (and their respective components) for a total of ten DOE blocks in the example of FIG. 17. In some aspects, each DOE block may be manufactured according to a uniform block height (e.g., approximately 0.5 mm). The first DOE block 1700, the second DOE block 1750, the third DOE block 1760, and so on up to the nth DOE block 1790 may be similar (or identical) to the first DOE block 1500 (FIG. 15) and the second DOE block 1550 (FIG. 15). Thus, each of the first DOE block 1700, the second DOE block 1750, the third DOE block 1760, and so on up to the nth DOE block 1790 may be "Type-1" or "Passive" DOE blocks, and may be collectively referred to herein as a "passive DOE stack," "Type-1 stack," or simply "DOE stack." It will be appreciated that one or more of the features of the first DOE block 1700, the second DOE block 1750, the third DOE block 1760, and/or so on up to the nth DOE block 1790, may be flipped, reversed, or otherwise arranged differently. Further for purposes of discussion herein, each DOE block of the DOE stack may also be referred to as a "stage" (e.g., the first DOE block 1700 being "Stage 1," the second DOE block 1750 being "Stage 2," the third DOE block 1760 being "Stage 3," and so on up to the nth DOE block 1790 being "Stage n"). The polarities of the light are depicted by either the double head arrows (indicating polarization parallel to the plane of incident) or dots (indicating polarization perpendicular to the plane of incident). As depicted by the two double-head arrows in FIG. 17, input light (such as a polarized laser from a DFB, a VCSEL, an array of VCSELs (continuous wave or pulsed), etc.) may enter the DOE stack at the first polarity rotator 1702, travel through each component of the DOE stack, and exit from the nth DOE 1794. In some aspects, the light that exits the DOE stack from the nth DOE 1794 may be referred to herein as a final distribution of light.

The first DOE block 1700 includes a first DOE 1704 and a first substrate 1707 with a first refractive material 1706 in between. The first DOE 1704 also has a first DOE surface 1708 and includes a first polarity rotator 1702 aligned with the first substrate 1707. The second DOE block 1750 includes a second DOE 1754 and a second substrate 1757 with a second refractive material 1756 in between. The second DOE 1754 also has a second DOE surface 1758 and includes a second polarity rotator 1752 aligned with the second substrate 1757. In some implementations, as depicted in the example of FIG. 17, the second polarity rotator 1752 may be aligned with the first DOE 1704 so as to "stack" the second DOE block 1750 on the first DOE block 1700. The third DOE block 1760 includes a third DOE 1764 and a third substrate 1767 with a third refractive material 1766 in between. The third DOE 1764 also has a third DOE surface 1768 and includes a third polarity rotator 1762 aligned with the third substrate 1767. In some implementations, as depicted in the example of FIG. 17, the third polarity rotator 1762 may be aligned with the second DOE 1754 so as to "stack" the third DOE block 1760 on the second DOE block 1750. The nth DOE block 1790 includes an nth DOE 1794 and an nth substrate 1797 with an nth refractive material 1796 in between. The nth DOE 1794 also has an nth DOE surface 1798 and includes an nth polarity rotator 1792 aligned with the nth substrate 1797. In some implementations (not pictured), the nth polarity rotator 1792 may be aligned with the immediately preceding DOE block (such as the third DOE block 1760) so as to "stack" the nth DOE block 1790 on the immediately preceding DOE block (such as the third DOE block 1760).

Similar to the first DOE block 1500 and the second DOE block 1550 (FIG. 15), in some implementations, each of the first DOE block 1700, the second DOE block 1750, the third DOE block 1760, and so on up to the nth DOE block 1790 may be independently adjustable (or "togglable") to be enabled (or "on") or disabled (or "off"). In some aspects, the light projector may toggle any combination of the DOE blocks separately or simultaneously. In some implementations, the first DOE block 1700 may be toggled by rotation of the first polarity rotator 1702, the second DOE block 1750 may be toggled by rotation of the second polarity rotator 1752, the third DOE block 1760 may be toggled by rotation of the third polarity rotator 1762, and so on up to the nth DOE block 1790 may be toggled by rotation of the nth polarity rotator 1792. In some implementations, depending on which combination of the DOEs are enabled, the overall distribution of light projected from the diffractive element (all of the DOE blocks) may be different. Each different projection may also be referred to herein as a "function" or a "mode." As described in connection with FIG. 10, the light projector (e.g., of FIG. 17) may thus be capable of projecting in $2^n$ different modes, where n represents the number of DOE blocks, and where one of the different modes is a mode in which all of the DOE blocks are "off".

As illustrated in FIG. 17, and as one non-limiting example, the LC molecules of the refractive materials 1706, 1756, 1766, and 1796 may be oriented parallel to the first DOE surface 1708, the second DOE surface 1758, the third DOE surface 1768, and so on up to the nth DOE surface 1798, respectively, and may be in the plane of FIG. 17. For example, the LC may have a nematic phase (such as the LC being a uniaxial nematic). In this manner, the LC may be birefringent, where the refractive index of the LC is based on the polarity of light passing through the LC. In some implementations, each of the first DOE 1704, the second DOE 1754, the third DOE 1764, and so on up to the nth DOE 1794 may have a refractive index. In some aspects, the refractive index for a DOE may sufficiently equal to $n_o$ ("ordinary") or $n_e$ ("extraordinary") of the LC refractive indices. Other suitable orientations of the LC molecules may exist, and the present disclosure should not be limited to the provided examples.

In some implementations, when the polarity rotator (such as the third polarity rotator 1762) rotates the linear polarities of light along a path of light passing through a refractive material (such as the third refractive material 1766), the refractive index of the refractive material (such as the third refractive material 1766) may be $n_o$ for a specific polarity (with the refractive index changing based on the polarity of the light). In some aspects, when the refractive index of the DOE (such as the third DOE 1764) is $n_o$ (or sufficiently similar to $n_o$) of the ordinary refractive index of LC, the respective DOE block (such as the third DOE 1764) may be active ("enabled") via an input light having a polarization vector that is parallel to the LC-axis (as depicted within the third refractive material 1766), because the refractive index of the LC perceived by the light is $n_e$ (extraordinary refractive index) that is sufficiently different from $n_o$. In some other aspects, when the refractive index of the DOE (such as the third DOE 1764) is $n_o$ (or sufficiently similar to $n_o$) of the ordinary refractive index of LC, the respective DOE block (such as the third DOE 1764) may be inactive ("disabled") via an input light having a vertical polarization vector that is perpendicular to the LC-axis (as depicted within the third refractive material 1766), because the refractive index of the LC perceived by the light is $n_o$ (extraordinary refractive index) that is sufficiently similar to the refractive index of the DOE.

When the polarity of light is rotated 90 degrees relative to the polarity associated with the LC refractive index $n_o$, the refractive index of the LC perceived by the light may be $n_e$.

When the refractive index of the DOE (such as the third DOE 1764) is sufficiently similar to $n_e$ and the DOE block is enabled when the light polarity is perpendicular to the LC axis and the refractive index of LC perceived by the light is $n_o$. The respective DOE block (such as the third DOE 1764) may be inactive ("disabled") via an input light having a polarization vector that is parallel to the LC-axis (as depicted within the third refractive material 1766) and the refractive index of LC is $n_e$ that is sufficiently similar to the refractive index of the DOE.

Figure 18:
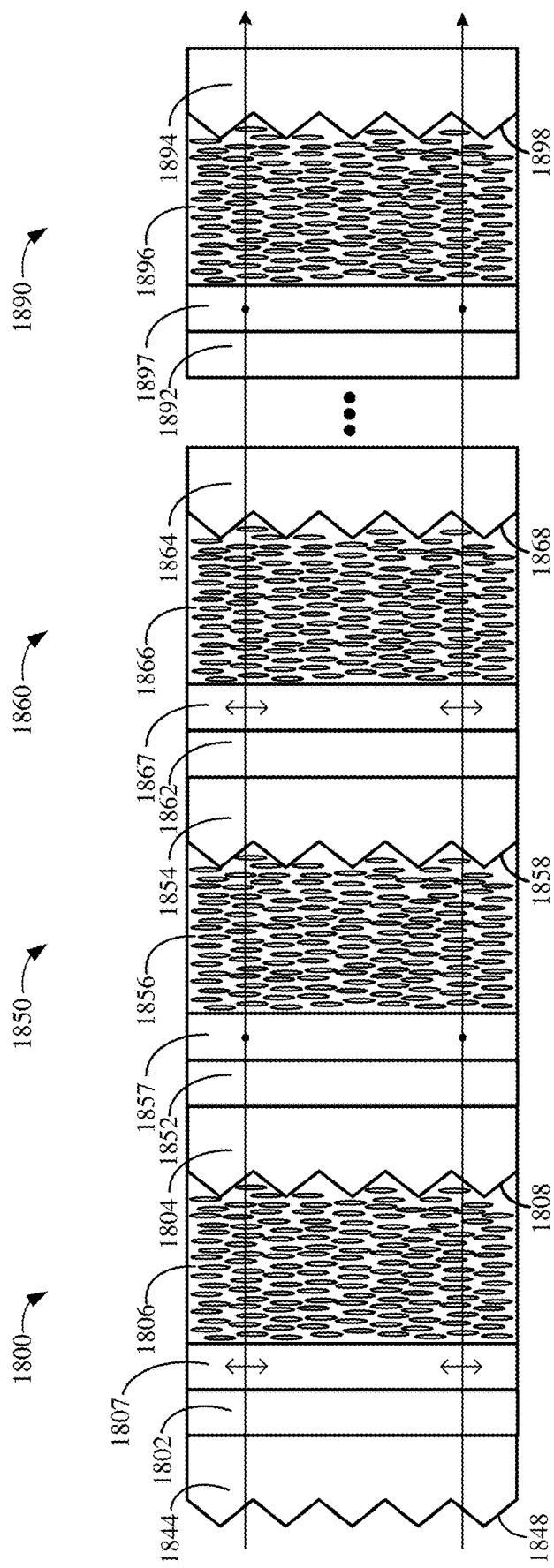
FIG. 18 depicts another example first DOE block, second DOE block, third DOE block, up to an nth DOE block.

FIG. 18 depicts a first DOE block 1800, a second DOE block 1850, a third DOE block 1860, up to an nth DOE block 1890. For purposes of discussion herein, the nth DOE block 1890 (and its respective components) may represent any number of additional DOE blocks (and their respective components) aligned with the third DOE block 1860. The first DOE block 1800, the second DOE block 1850, the third DOE block 1860, and so on up to the nth DOE block 1890 may be similar (or identical) to the first DOE block 1700 (FIG. 17), the second DOE block 1750 (FIG. 17), the third DOE block 1760 (FIG. 17), and so on up to the nth DOE block 1790 (FIG. 17), respectively. Thus, each of the first DOE block 1800, the second DOE block 1850, the third DOE block 1860, and so on up to the nth DOE block 1890 may be "Type-1" or "Passive" DOE blocks.

The first DOE block 1800 includes a first DOE 1804 and a first substrate 1807 with a first refractive material 1806 in between. The first DOE 1804 also has a first DOE surface 1808 and includes a first polarity rotator 1802 aligned with the first substrate 1807. The second DOE block 1850 includes a second DOE 1854 and a second substrate 1857 with a second refractive material 1856 in between. The second DOE 1854 also has a second DOE surface 1858 and includes a second polarity rotator 1852 aligned with the second substrate 1857. The third DOE block 1860 includes a third DOE 1864 and a third substrate 1867 with a third refractive material 1866 in between. The third DOE 1864 also has a third DOE surface 1868 and includes a third polarity rotator 1862 aligned with the third substrate 1867. The nth DOE block 1890 includes an nth DOE 1894 and an nth substrate 1897 with an nth refractive material 1896 in between. The nth DOE 1894 also has an nth DOE surface 1898 and includes an nth polarity rotator 1892 aligned with the nth substrate 1897.

In some implementations, an always-on DOE 1844 with an always-on DOE surface 1848 may be aligned with the first polarity rotator 1802. In some aspects, unlike the other DOEs in FIG. 18, the input light may enter the always-on DOE 1844 without first passing through a polarity rotator. In some aspects, the always-on DOE 1844 may be situated in the path of the input light before the first polarity rotator 1802 (as depicted in FIG. 18). As depicted by the two double-head arrows in FIG. 18, the input light may pass through the always-on DOE 1844, then enter the DOE stack at the first polarity rotator 1802, then travel though each component of the DOE stack, and then exit from the nth DOE 1894. In some aspects, the light that exits the DOE stack from the nth DOE 1894 may be referred to herein as a final distribution of light. In some implementations, the always-on DOE 1844 may persistently enable DOE features for the light projector, regardless of which combination of the DOE blocks of the DOE stack are enabled (if any). Thus, for example, even if one of the polarity rotators (such as the first polarity rotator 1802) has disabled one of the DOE blocks (such as the first DOE block 1800), the DOE block may still operate as a diffuser and provide, for example, flood illumination for the light projector. As another non-limiting example, if the light projector is operating in a mode in which all of the DOE blocks are disabled, the always-on DOE 1844 will determine the final light distribution that exits the DOE stack (if any).

Figure 19:
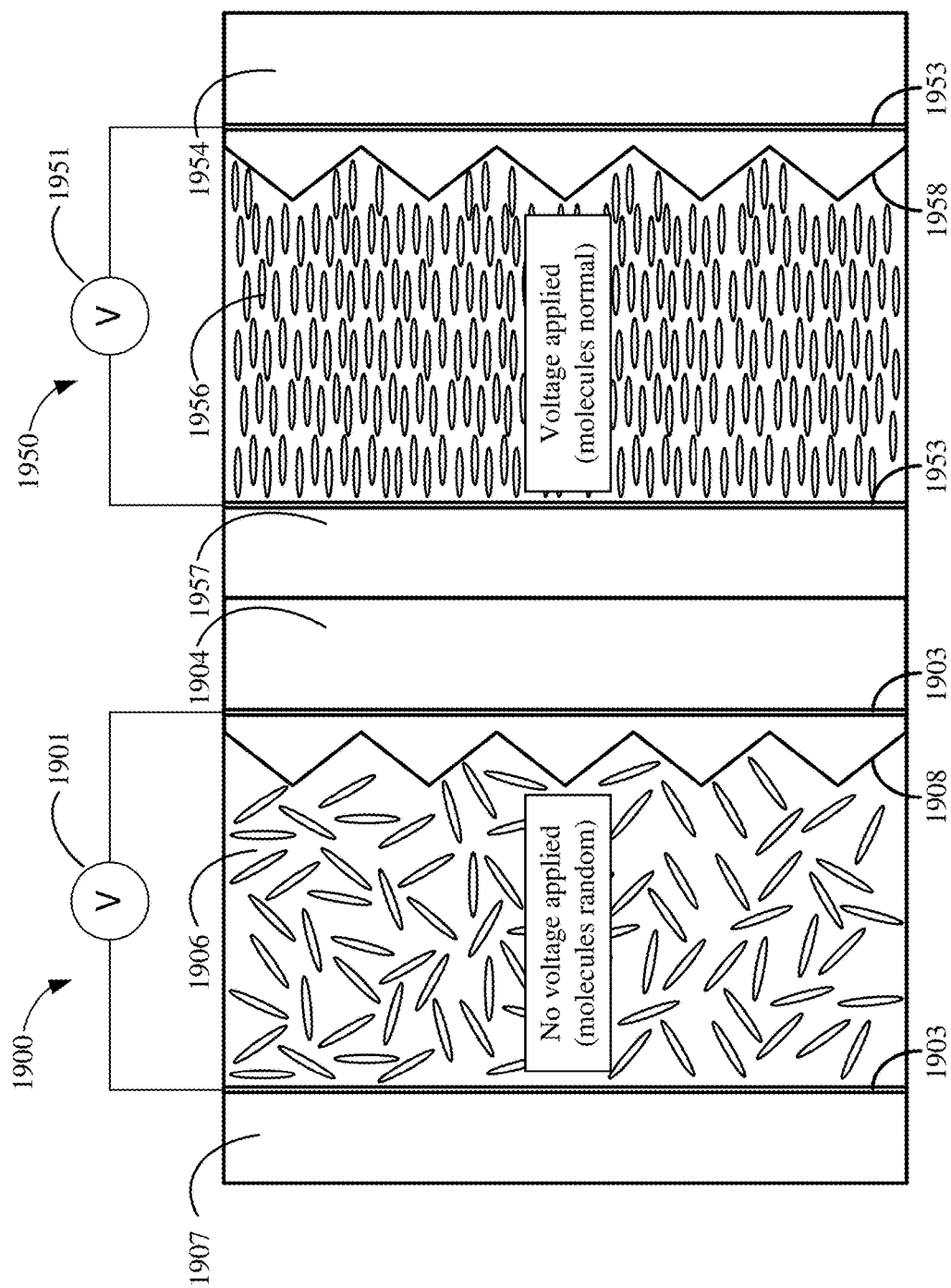
FIG. 19 depicts another example first DOE block and second DOE block.

In some implementations, one or more DOE blocks may be independently adjustable (or "toggleable") to be enabled (or "on") or disabled (or "off") with electricity (such as by applying a voltage to a refractive material of an individual DOE block), rather than with a polarity rotator. FIG. 19 depicts a first DOE block 1900 and a second DOE block 1950. The first DOE block 1900 and the second DOE block 1950 may be similar to the first DOE block 1000 (FIG. 10) and the second DOE block 1050 (FIG. 10), respectively, except that the first DOE block 1900 includes a first pair of conductive materials 1903 with a first voltage 1901, and the second DOE block 1950 includes a second pair of conductive materials 1953 with a second voltage 1951. For purposes of discussion herein, the first DOE block 1900 and the second DOE block 1950 may also be referred to as "Type-2" or "Active" DOE blocks. The first DOE block 1900 includes a first DOE 1904 and a first substrate 1907 with a first refractive material 1906 in between. The first DOE 1904 has a first DOE surface 1908. The second DOE block 1950 includes a second DOE 1954 and a second substrate 1957 with a second refractive material 1956 in between. The second DOE 1954 has a second DOE surface 1958. In some implementations, as depicted in the example of FIG. 19, the second substrate 1957 may be aligned with the first DOE 1904 so as to "stack" the second DOE block 1950 on the first DOE block 1900. It will be appreciated that one or more of the features of the first DOE block 1900 and/or the second DOE block 1950 may be flipped, reversed, or otherwise arranged differently. As one non-limiting example, one or both of the DOE 1904 and the DOE 1954 may be on the left-side of their respective DOE block (e.g., with the uneven surface 1908 and the uneven surface 1958, respectively, facing to the right and merged into the refractive material 1906 and the refractive material 1956, respectively). In this non-limiting example, one or both of the substrate 1907 and the substrate 1957 may be on the right side of their respective DOE block.

Similar to the first DOE block 1000 and the second DOE block 1050 (FIG. 10), in some implementations, each of the first DOE block 1900 and the second DOE block 1950 may be independently adjustable (or "togglable") to be enabled (or "on") or disabled (or "off"). In some implementations, the first conductive material pair 1903 may contact the first DOE block 1900 at opposite ends of the first refractive material 1906 to electrically enable (e.g., apply the first voltage 1901 to) or electrically change the refractive index of the first refractive material 1906, and thereby, "enable" (or "toggle on", when the refractive index of the LC material 1906 is sufficiently different to the DOE 1904) or "disable" (or "toggle off", when the refractive index of the LC material 1906 is sufficiently similar to the DOE 1904) the first DOE block 1900, respectively. In some implementations, the second conductive material pair 1953 may contact the second DOE block 1950 at opposite ends of the second refractive material 1956 to electrically change the refractive index of the second refractive material 1956, and thereby, "enable" (or "toggle on", when the refractive index of the LC material 1956 is sufficiently different to the DOE 1954) or "disable" (or "toggle off", when the refractive index of the LC material 1956 is sufficiently similar to the DOE 1954) the second DOE block 1950, respectively.

In some aspects, the first refractive material 1906 and the second refractive material 1956 may be birefringent material, such as liquid crystal (LC). In some implementations, the DOEs (such as the first DOE 1904 and the second DOE 1954) of the stack of "type-2" DOE blocks (such as the first DOE block 1900 and the second DOE block 1950) may have a refractive index that is sufficiently identical to the extraordinary refractive index $n_o$ of the LC material. In some aspects, the first refractive material 1906 and the second refractive material 1956 may be transparent electrodes (e.g., made of ITO, or Indium Tin Oxide). In some implementations, when the voltage (such as the first voltage 1901) is disabled from the refractive material (such as the first refractive material 1906), the corresponding LC molecules may be randomly oriented. As one having ordinary skill in the art will appreciate, a LC refractive index with random molecule orientation (e.g., as perceived by a (polarized or non-polarized) light) may not be birefringent and may have a refractive index of $n_a$ (i.e., about the average of $n_o$ and $n_e$) that is significantly different from $n_o$ or $n_e$. In some implementations, each of the LC for the DOE blocks may have a refractive index of $n_o$ when a voltage is applied. In other words, the LC molecules may be randomly oriented when the DOE is active. Thus, in some aspects, when a voltage is applied to the LC, whether the polarity of the input light is parallel or perpendicular to the LC axis, or even if the light is non-polarized, the LC will have a refractive index of $n_o$, and the respective DOE may not diffract or diffuse the light (e.g., because the refractive index of the DOE may be sufficiently similar to $n_o$). Furthermore, in some aspects, when the first voltage 1901 is enabled (the first voltage 1901 equals zero or is sufficiently small), the first refractive material 1906 may not have a birefringent property, may have a refractive index of $n_a$ (e.g., approximately an average of $n_o$ and $n_e$, where $n_a \# n_o$), and may thus operate independently of any polarizations for incoming light. Since $n_a$ is significantly different from the DOE refractive index that is similar to $n_o$, the DOE (e.g., the first DOE block 1900) may be enabled. In some implementations, when the voltage (such as the second voltage 1951) is enabled for the refractive material (such as the second refractive material 1956), the corresponding LC molecules may be oriented along the electric field and the substrate (such as the second substrate 1957) normal (as depicted in FIG. 19 and similar to 2020 in FIG. 20). That is, when the second voltage 1951 is enabled (the second voltage 1951 is not equal to zero and is sufficiently high to align the LC molecules), the second refractive material 1956 may become birefringent. Thus, input light from near the normal of the surface of the second substrate 1957 (regardless of the input light polarization) may have a refractive index of $n_o$ that is sufficiently similar to the refractive index of DOE, and the DOE (e.g., the second DOE block 1950) may thus be disabled.

Figure 20:
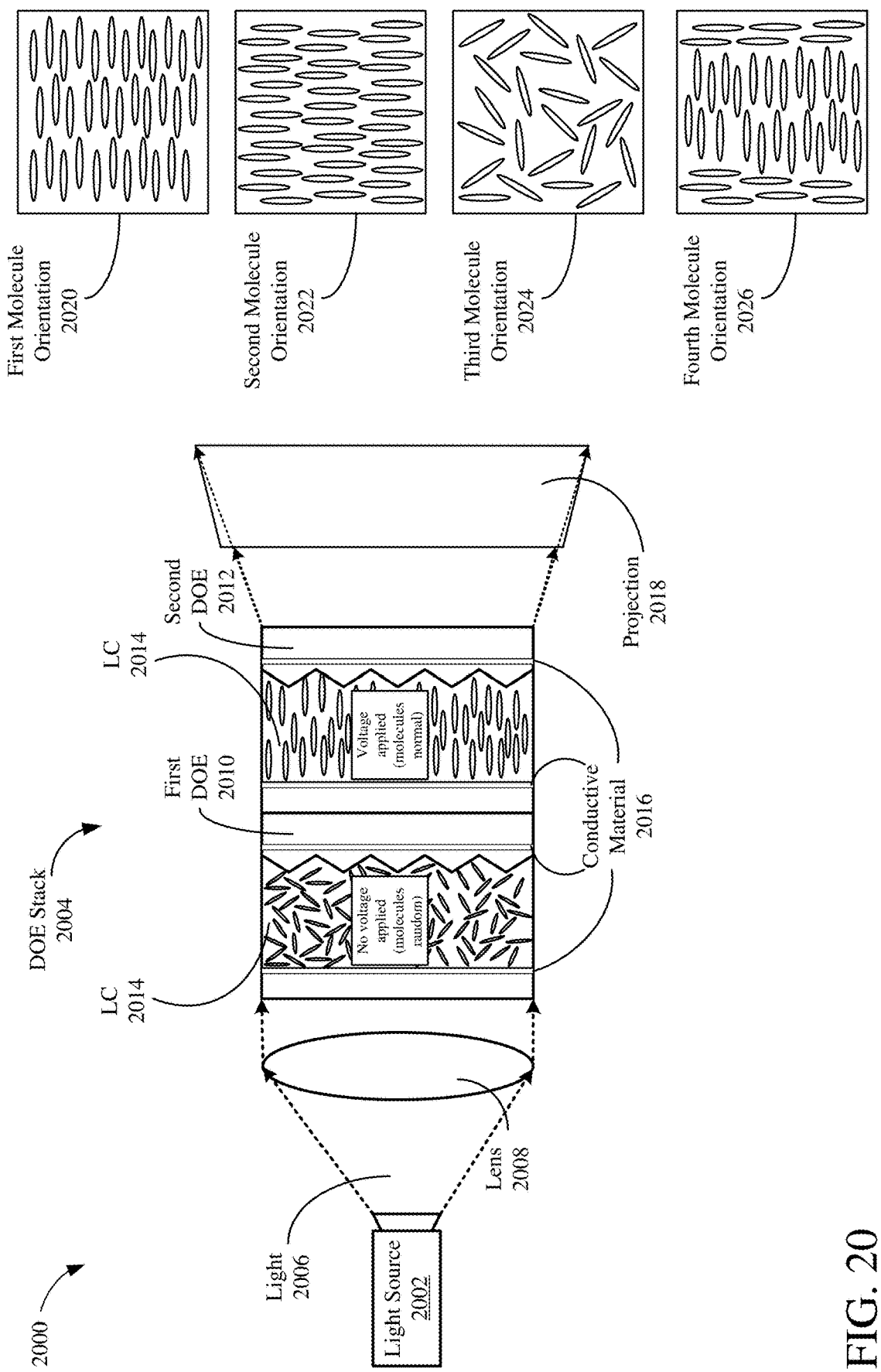
FIG. 20 is a depiction of an example projector configured to apply an electricity to the liquid crystal of the diffractive element of the projector for generating a projection.

FIG. 20 is a depiction of an example projector 2000 configured to apply an electricity to one or more of the LC 2014 (or other suitable refractive material) of a DOE stack 2004 to adjust the orientation of molecules for one or more of the LC 2014. For simplicity, certain components of the DOE stack may not be depicted or described in connection with FIG. 20; nonetheless, in some implementations, the DOE stack 2004 may be the same or similar to the DOE stack (that is, the first DOE block 1900 and the second DOE block 1950) depicted and described in connection with FIG. 19. The projector 2000 may include a light source 2002 (such as a VCSEL, DFB laser, or an array of VCSELs or DFB lasers). The light source 2002 may be configured to project light 2006 toward a lens 2008, and the lens 2008 may be configured to direct the light 2006 to the DOE stack 2004 to project the projection 2018. In some example implementations, the DOE stack 2004 includes a first DOE and a second DOE 2012. LC 2014 is sandwiched a substrate a DOE for both 2010 and 2012. A lens located between the light source (e.g., a laser, or an array of lasers) and the DOE stack is used to collimate the light source or project the light source pattern distribution or DOE diffraction pattern as the projection distribution 2018. The first DOE 2010 and the second DOE 2012 may be a combination of a first element to project a first distribution of light points and a second element to project a second distribution of light points. Alternatively, the first DOE 2010 and the second DOE 2012 may be a combination of a first element to project a distribution of light points and a second element to project a diffuse light. The DOE stack 2004 also may include one or more pairs of conductive materials 2016 as electrical contacts for applying electricity to one or more of the LC 2014 to adjust the orientation of the molecules in one or more of the LC 2014 (thus adjusting the distribution of light of the projection 2018).

The arrangement of the components and the configuration of the DOE stack 2004 as depicted in FIG. 20 should not be construed as limiting the possible configurations for the DOE stack 2004. It will be appreciated that one or more of the features of the first DOE 2010 and/or the second DOE 2012 may be flipped, reversed, or otherwise arranged differently. As one non-limiting example, one or both of the DOE 2010 and the DOE 2012 may be on the left-side of their respective DOE block (e.g., with the uneven surface facing to the right and merged into the respective LC 2014). In this non-limiting example, one or both of the substrates (not pictured) for the DOEs may be on the right side of their respective DOE block.

First molecule orientation 2020 is illustrated as the molecules being perpendicular to the LC 2014 and the DOEs 2010 and 2012 surfaces (or along the normal of the surfaces). The first molecule orientation 2020 may be the orientation of molecules in one or more of the LC 2014 when an electricity is applied to the respective LC 2014. In this manner, the refractive index of the LC 2014 may be the same as (or sufficiently similar to) the refractive index of the first DOE 2010 (or, alternatively, the refractive index of the second DOE 2012). Light passing through the DOE stack 2004 thus may not be altered by the first DOE 2010 (or, alternatively, the second DOE 2012).

Second molecule orientation 2022 is illustrated as the molecules being parallel to the LC 2014 and the DOEs 2010 and 2012. The second molecule orientation 2022 may be the orientation of molecules in one or more of the LC 2014 when no electricity is applied to the respective LC 2014.

Third molecule orientation 2024 is illustrated as the molecules randomly oriented. The third molecule orientation 2024 is another example orientation of molecules in one or more of the LC 2014 when no electricity is applied to the respective LC 2014. The LC 2014 with the third molecule orientation 2024 may be configured to have an average refractive index that is different than the refractive index of the first DOE 2010 and that is different than the refractive index of the second DOE 2012 (e.g., the differences being greater than a threshold). The average refractive index for the LC 2014 with the third molecule orientation 2024 may be an approximate average of (i) the refractive index of the LC 2014 with the first molecule orientation 2020 and (ii) the refractive index of the LC 2014 with the second molecule orientation 2022. In this manner, all of the light passing through the DOE stack 2004 experiences the refractive index that is different from the first DOE 2010 and the second DOE 2012. As a result, all of the light passing through the DOE stack 2004 is first altered by the first DOE 2010, and then altered by the second DOE 2012.

Fourth molecule orientation 2026 is illustrated as some of the molecules oriented as in the orientation 2020 and the other molecules oriented as in the orientation 2022 when an electricity is applied to the LC 2014. The electricity may not cause some of the molecules near the surface of the LC or DOE to orient to a first molecule orientation (such as perpendicular to the LC or DOE surface). However, the molecules that remain in the second molecule orientation (such as parallel to the LC or DOE surfaces) may be a thin layer relative to the feature size of the DOE. For example, the magnitudes of the peaks and valleys of the DOE surface may be multiples of the magnitude of the layer thickness of molecules not changing their orientation. The LC 2014 may affect a small portion of the light based on the parallel orientation of some molecules, and the LC 2014 may affect the large remainder of the light based on the perpendicular orientation of the remaining molecules (such as similar to the first molecule orientation 2020).

In some examples of manufacturing the LC 2014 so that the molecules may be oriented in a specific direction (such as for orientations 2022), orientating the molecules may be difficult near the surfaces of the DOEs 2010 and 2012. For example, the molecules' orientation in the creases of the DOE surfaces may be slightly misaligned. Use of a random orientation of molecules allows for the LC 2014 to be filled in between the first DOE 2010 and the second DOE 2012 without concern for the orientation of the molecules (simplifying the manufacturing process). However, any suitable methods for manufacturing the LC 2014 may be used, and the present disclosure should not be limited to a random molecule orientation when no electricity is applied to the LC 2014 or any other described molecule orientations when no electricity is applied to the LC 2014. Further, the present disclosure should not be limited to a specific molecule orientation when an electricity is applied to the LC 2014. In some example implementations, one or both of the uneven surfaces of the DOEs 2010 and 2012 may be oriented away from the LC 2014, alleviating issues in attempting to orient the molecules along the uneven surfaces.

Applying and removing an electricity to and from one or more of the LC 2014 may configure the molecule orientation between the first molecule orientation 2020 for a first mode and one of the third molecule orientations 2024 for a second mode. In this manner, the projector 2000 may adjust between using one of the DOEs 2010 and 2012 and using both DOEs 2010 and 2012 for the projection 2018 (such as when rotating the molecule orientation between orientation 2020 and orientation 2024), or the projector 2000 may adjust between using a first DOE 2010 and using a second DOE 2012 for the projection 2018 (such as when rotating the molecule orientation between orientation 2020 and orientation 2024).

FIG. 20 depicts that the conductive material 2016 may be connected to or embedded in the LC 2014 (or suitable refractive material) and the DOEs in coupling the conductive material 2016 to the LC 2014. In some other example implementations, the conductive material 2016 may be embedded in or connected to one or more other components of the DOE stack 2004 in coupling the conductive material 2016 to the LC 2014 for applying electricity to the LC 2014.

Figure 21:
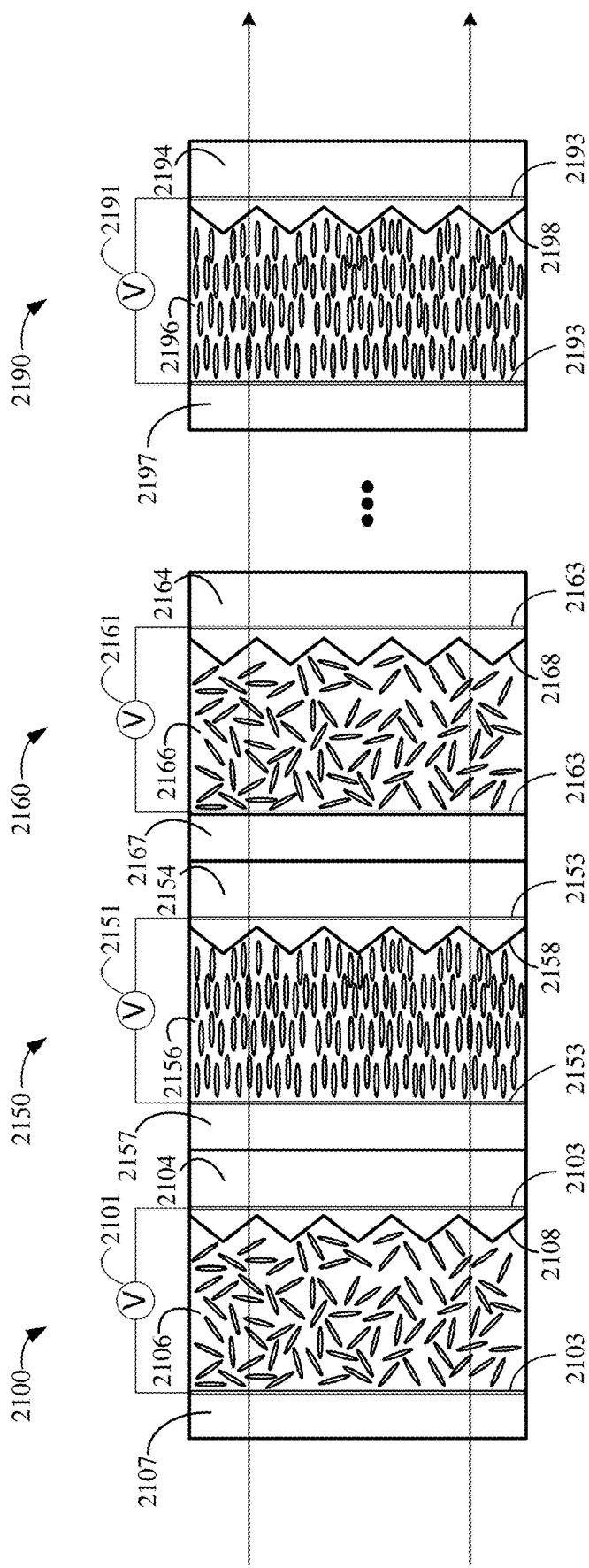
FIG. 21 depicts another example first DOE block, second DOE block, third DOE block, up to an nth DOE block.

In some example implementations, more than two DOE blocks may exist for a DOE stack. FIG. 21 depicts a first DOE block 2100, a second DOE block 2150, a third DOE block 2160, up to an nth DOE block 2190. For purposes of discussion herein, the nth DOE block 2190 (and its respective components) may represent any number of additional DOE blocks (and their respective components) aligned with the third DOE block 2160. As one non-limiting example, the nth DOE block 2190 may represent seven additional DOE blocks (and their respective components) for a total of ten DOE blocks in the example of FIG. 21. In some aspects, each DOE block may be manufactured according to a uniform stack height (e.g., approximately 0.5 mm). Thus, in some aspects, ten stacked DOE blocks may have a height of approximately 5.0 mm in this example. The first DOE block 2100, the second DOE block 2150, the third DOE block 2160, and so on up to the nth DOE block 2190 may be similar (or identical) to the first DOE block 1900 (FIG. 19) and the second DOE block 1950 (FIG. 19). Thus, each of the first DOE block 2100, the second DOE block 2150, the third DOE block 2160, and so on up to the nth DOE block 2190 may be "Type-2" or "Active" DOE blocks, and may be collectively referred to herein as an "active DOE stack," "Type-2 stack," or simply "DOE stack." Further for purposes of discussion herein, each DOE block of the DOE stack may also be referred to as a "stage" (e.g., the first DOE block 2100 being "Stage 1," the second DOE block 2150 being "Stage 2," the third DOE block 2160 being "Stage 3," and so on up to the nth DOE block 2190 being "Stage n"). As depicted by the two horizontal arrows in FIG. 21, input light (such as a polarized laser from a DFB, a VCSEL, an array of VCSELs (continuous wave or pulsed), etc.) may enter the DOE stack at the first substrate 2107, travel though each component of the DOE stack, and exit from the nth DOE 2194. In some aspects, the light that exits the DOE stack from the nth DOE 2194 may be referred to herein as a final distribution of light.

The first DOE block 2100 includes a first DOE 2104 and a first substrate 2107 with a first refractive material 2106 in between. The first DOE 2104 also has a first DOE surface 2108 and includes a first conductive material 2103 capable of providing a first voltage 2101 to the refractive material 2106. The second DOE block 2150 includes a second DOE 2154 and a second substrate 2157 with a second refractive material 2156 in between. The second DOE 2154 also has a second DOE surface 2158 and includes a second conductive material 2153 capable of providing a second voltage 2151 to the refractive material 2156. In some implementations, as depicted in the example of FIG. 21, the second substrate 2157 may be aligned with the first DOE 2104 so as to "stack" the second DOE block 2150 on the first DOE block 2100. The third DOE block 2160 includes a third DOE 2164 and a third substrate 2167 with a third refractive material 2166 in between. The third DOE 2164 also has a third DOE surface 2168 and includes a third conductive material 2163 capable of providing a third voltage 2161 to the refractive material 2166. In some implementations, as depicted in the example of FIG. 21, the third substrate 2167 may be aligned with the second DOE 2154 so as to "stack" the third DOE block 2160 on the second DOE block 2150. The nth DOE block 2190 includes an nth DOE 2194 and an nth substrate 2197 with an nth refractive material 2196 in between. The nth DOE 2194 also has an nth DOE surface 2198 and includes an nth conductive material 2193 capable of providing an nth voltage 2191 to the refractive material 2196. In some implementations (not pictured), as depicted in the example of FIG. 21, the nth substrate 2197 may be aligned with the immediately preceding DOE block (such as the third DOE 2164) so as to "stack" the nth DOE block 2190 on the immediately preceding DOE block (such as the third DOE block 2160).

Similar to the first DOE block 1900 and the second DOE block 1950 (FIG. 19), in some implementations, each of the first DOE block 2100, the second DOE block 2150, the third DOE block 2160, and so on up to the nth DOE block 2190 may be independently adjustable (or "togglable") to be enabled (or "on") or disabled (or "off"). In some aspects, the light projector may toggle any combination of the DOE blocks separately or simultaneously. That is, in some implementations, the first conductive material pair 2103 may contact the first DOE block 2100 at opposite ends of the first refractive material 2106 to electrically change the refractive index of the first refractive material 2106, and thereby, "enable" (or "toggle on", when the refractive index of the LC material 2106 is sufficiently different to the DOE 2104) or "disable" (or "toggle off", when the refractive index of the LC material 2106 is sufficiently similar to the DOE 2104) the first DOE block 2100, respectively. In some implementations, the second conductive material pair 2153 may contact the second DOE block 2150 at opposite ends of the second refractive material 2156 to electrically change the refractive index of the second refractive material 2156, and thereby, "enable" (or "toggle on", when the refractive index of the LC material 2156 is sufficiently different to the DOE 2154) or "disable" (or "toggle off", when the refractive index of the LC material 2156 is sufficiently similar to the DOE 2154) the second DOE block 2150, respectively. In some implementations, the third conductive material 2163 may contact the third DOE block 2160 at opposite ends of the third refractive material 2166 to electrically change the third refractive material 2166, and thereby, "enable" (or "toggle on", when the refractive index of the LC material 2166 is sufficiently different to the DOE 2164) or "disable" (or "toggle off", when the refractive index of the LC material 2166 is sufficiently similar to the DOE 2164) the third DOE block 2160, respectively. In some implementations, the nth conductive material pair 2193 may contact the nth DOE block 2190 at opposite ends of the nth refractive material 2196 to electrically change the nth refractive material 2196, and thereby, "enable" (or "toggle on", when the refractive index of the LC material 2196 is sufficiently different to the DOE 2194) or "disable" (or "toggle off", when the refractive index of the LC material 2196 is sufficiently similar to the DOE 2194) the nth DOE block 2190, respectively. In some implementations, depending on which combination of the DOEs are enabled, the overall distribution of light projected from the diffractive element (all of the DOE blocks) may be different. Each different projection may also be referred to herein as a "function" or a "mode." As described in connection with FIG. 10, the light projector (e.g., of FIG. 21) may thus be capable of projecting in $2^n$ different modes.

In some implementations, the DOEs (such as the first DOE 2104, the second DOE 2154, the third DOE 2164, and so on up to the nth DOE 2194) of the stack of "type-2" DOE blocks (such as the first DOE block 2100, the second DOE block 2150, the third DOE block 2160, and so on up to the nth DOE block 2190) may have a refractive index that is sufficiently similar to the ordinary refractive $n_o$ of the LC material. In some aspects, the first refractive material 2106, the second refractive material 2156, the third refractive material 2166, and so on up to the nth refractive material 2196 may include: a first material (such as liquid crystal (LC)) with molecules in a first orientation (such as random) and with a first refractive index; and a second material (again, such as LC) with molecules in a second orientation (such as perpendicular to the DOE of the respective DOE block) and with a second refractive index. In some aspects, the first refractive material 2106, the second refractive material 2156, the third refractive material 2166, and so on up to the nth refractive material 2196 may be transparent electrodes (e.g., made of ITO, or Indium Tin Oxide). In some implementations, when the voltage (such as the third voltage 2161) is disabled (or is too low) from the refractive material (such as the third refractive material 2166), the corresponding LC molecules may be randomly oriented (as depicted in FIG. 21). That is, when the third voltage 2161 is disabled (the third voltage 2161 equals zero or is too low to alter/align the molecule orientation), the third refractive material 2166 may not have a birefringent property, may have a refractive index of $n_a$ (e.g., approximately an average of $n_o$ and $n_e$, where $n_a \neq n_o$), and may thus operate independently of any polarizations for incoming light. In some implementations, when the voltage (such as the nth voltage 2191) is enabled for the refractive material (such as the nth refractive material 2196), the corresponding LC molecules may be oriented along the substrate (such as the nth substrate 2197) normal (as depicted in FIG. 21). That is, when the nth voltage 2191 is enabled (the nth voltage 2191 is not equal to zero), the nth refractive material 2196 may become birefringent; and thus, input light from near the normal of the surface of the nth substrate 2197 (regardless of the input light polarization) may experience a refractive index of $n_o$.

Figure 22:
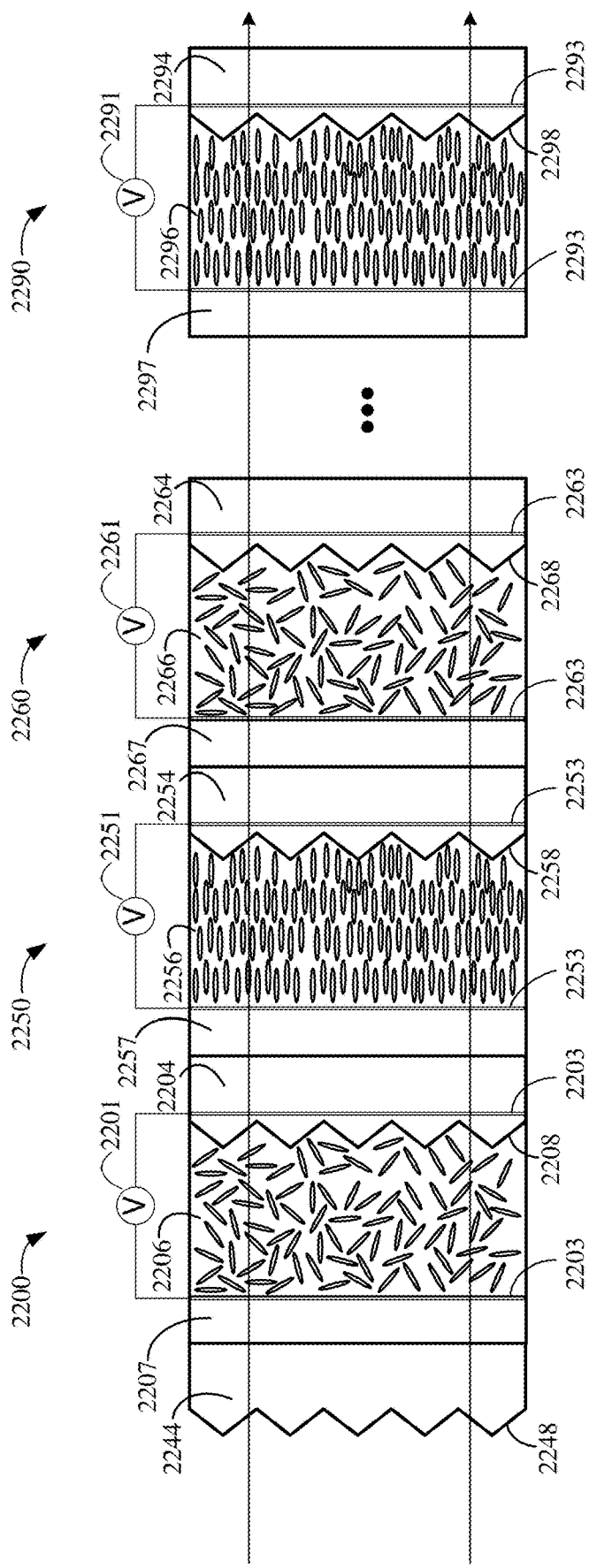
FIG. 22 depicts another example first DOE block, second DOE block, third DOE block, up to an nth DOE block.

FIG. 22 depicts a first DOE block 2200, a second DOE block 2250, a third DOE block 2260, and so on up to up to an nth DOE block 2290. For purposes of discussion herein, the nth DOE block 2290 (and its respective components) may represent any number of additional DOE blocks (and their respective components) aligned with the third DOE block 2260. The first DOE block 2200, the second DOE block 2250, the third DOE block 2260, and so on up to the nth DOE block 2290 may be similar (or identical) to the first DOE block 2100 (FIG. 21), the second DOE block 2150 (FIG. 21), the third DOE block 2160 (FIG. 21), and so on up to the nth DOE block 2190 (FIG. 21), respectively. Thus, each of the first DOE block 2200, the second DOE block 2250, the third DOE block 2260, and so on up to the nth DOE block 2290 may be "Type-2" or "Active" DOE blocks.

The first DOE block 2200 includes a first DOE 2204 and a first substrate 2207 with a first refractive material 2206 in between. The first DOE 2204 also has a first DOE surface 2208 and includes a first conductive material pair 2203 with a first voltage 2201. The second DOE block 2250 includes a second DOE 2254 and a second substrate 2257 with a second refractive material 2256 in between. The second DOE 2254 also has a second DOE surface 2258 and includes a second conductive material pair 2253 with a second voltage 2251. The third DOE block 2260 includes a third DOE 2264 and a third substrate 2267 with a third refractive material 2266 in between. The third DOE 2264 also has a third DOE surface 2268 and includes a third conductive material pair 2263 with a third voltage 2261. The nth DOE block 2290 includes an nth DOE 2294 and an nth substrate 2297 with an nth refractive material 2296 in between. The nth DOE 2294 also has an nth DOE surface 2298 and includes an nth conductive material pair 2293 with an nth voltage 2291.

In some implementations, an always-on DOE 2244 with an always-on DOE surface 2248 may be aligned with the first substrate 2207. In some aspects, unlike the other DOEs in FIG. 22, the input light may enter the always-on DOE 2244 without first passing through an electrically active refractive material. In some aspects, the always-on DOE 2244 may be situated in the path of the input light before the first substrate 2207 (as depicted in FIG. 22). As depicted by the longer pair of horizontal arrows in FIG. 22, the input light may pass through the always-on DOE 2244, then enter the DOE stack at the first substrate 2207, then travel though each component of the DOE stack, and then exit from the nth DOE 2294. In some aspects, the light that exits the DOE stack from the nth DOE 2294 may be referred to herein as a final distribution of light. In some implementations, the always-on DOE 2244 may persistently enable DOE features for the light projector, regardless of which combination of the DOE blocks of the DOE stack are enabled (if any). Thus, for example, even if one of the DOE blocks (such as the second DOE block 2250) is disabled (e.g., the second voltage 2251 is equal to zero), the DOE block may generate a final distribution that is the overall contribution of the always on DOE 2244 and the rest of the enabled DOE blocks, for example, flood illumination for the light projector. In some implementation, if all the active DOE blocks are enabled, the final light distribution will be solely determined by the always-on DOE. In some implementation, the projector includes the combination of passive DOE blocks (e.g., the DOE blocks in FIG. 15) and active DOE blocks (e.g., the DOE blocks in FIG. 19).

Figure 23:
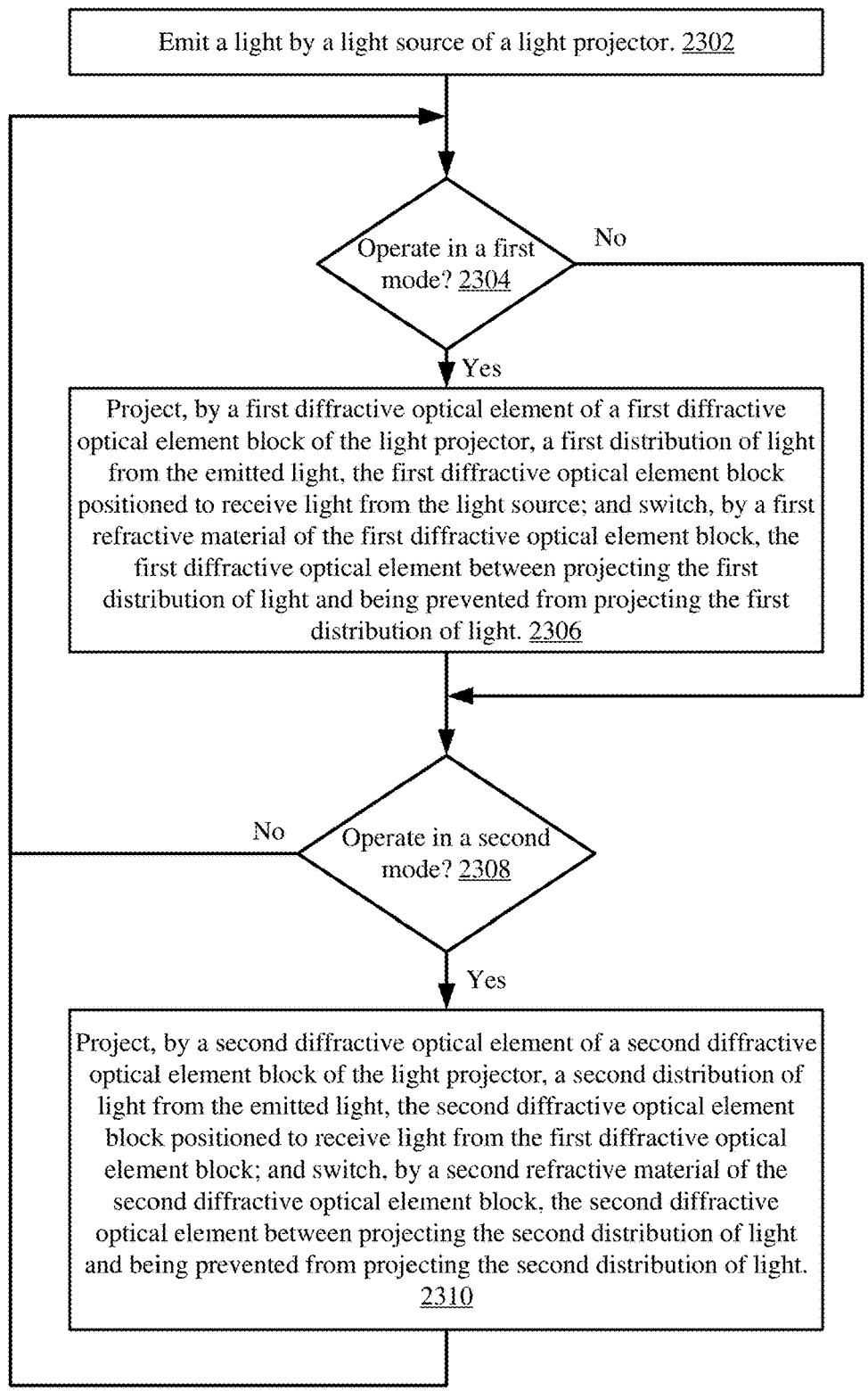
FIG. 23 shows a flowchart illustrating an example process for light projection according to some implementations.

FIG. 23 shows a flowchart illustrating an example process 2300 for light projection according to some implementations. In some implementations, the process 2300 may be performed by the transmitter or projector 601 of the device 600 (FIG. 6). A light source of the light projector may emit a light (2302).

Referring to 2304, the device 600 may determine whether the transmitter 601 is to operate in a first mode corresponding to a first distribution of light to be projected from a first diffractive optical element of a first diffractive optical element block of the light projector. In some example implementations, the first mode is associated with active depth sensing using high resolution distribution. In some example implementations, the first mode is associated with active depth sensing using low resolution distribution. In some example implementations, the first mode is associated with flood illumination. In some example implementations, the first mode is associated with other appropriate light distributions.

If the transmitter 601 is to operate in the first mode, the first diffractive optical element may project, by a first diffractive optical element of a first diffractive optical element block of the light projector, a first distribution of light from the emitted light, the first diffractive optical element block positioned to receive light from the light source. A first refractive material of the first diffractive optical element block may switch the first diffractive optical element between projecting the first distribution of light and being prevented from projecting the first distribution of light (2306).

Regardless of whether the transmitter 601 is to operate in the first mode, referring to 2308, the device 600 may determine whether the transmitter 601 is to operate in a second mode corresponding to a second distribution of light to be projected from a second diffractive optical element of a second diffractive optical element block of the light projector. In some example implementations, the second mode is associated with active depth sensing using high resolution distribution. In some example implementations, the second mode is associated with active depth sensing using low resolution distribution. In some example implementations, the second mode is associated with flood illumination. In some example implementations, the second mode is associated with other appropriate light distributions.

If the transmitter 601 is to operate in the second mode, the second diffractive optical element may project, by a second diffractive optical element of a second diffractive optical element block of the light projector, a second distribution of light from the emitted light, the second diffractive optical element block positioned to receive light from the first diffractive optical element block. A second refractive material of the second diffractive optical element block may switch the second diffractive optical element between projecting the second distribution of light and being prevented from projecting the second distribution of light (2310). In some implementations, when operating in the second mode, the first diffractive optical element may be prevented from projecting the first distribution of light. Regardless of whether the transmitter 601 is to operate in the second mode, the method may return to 2304.

Figure 24:
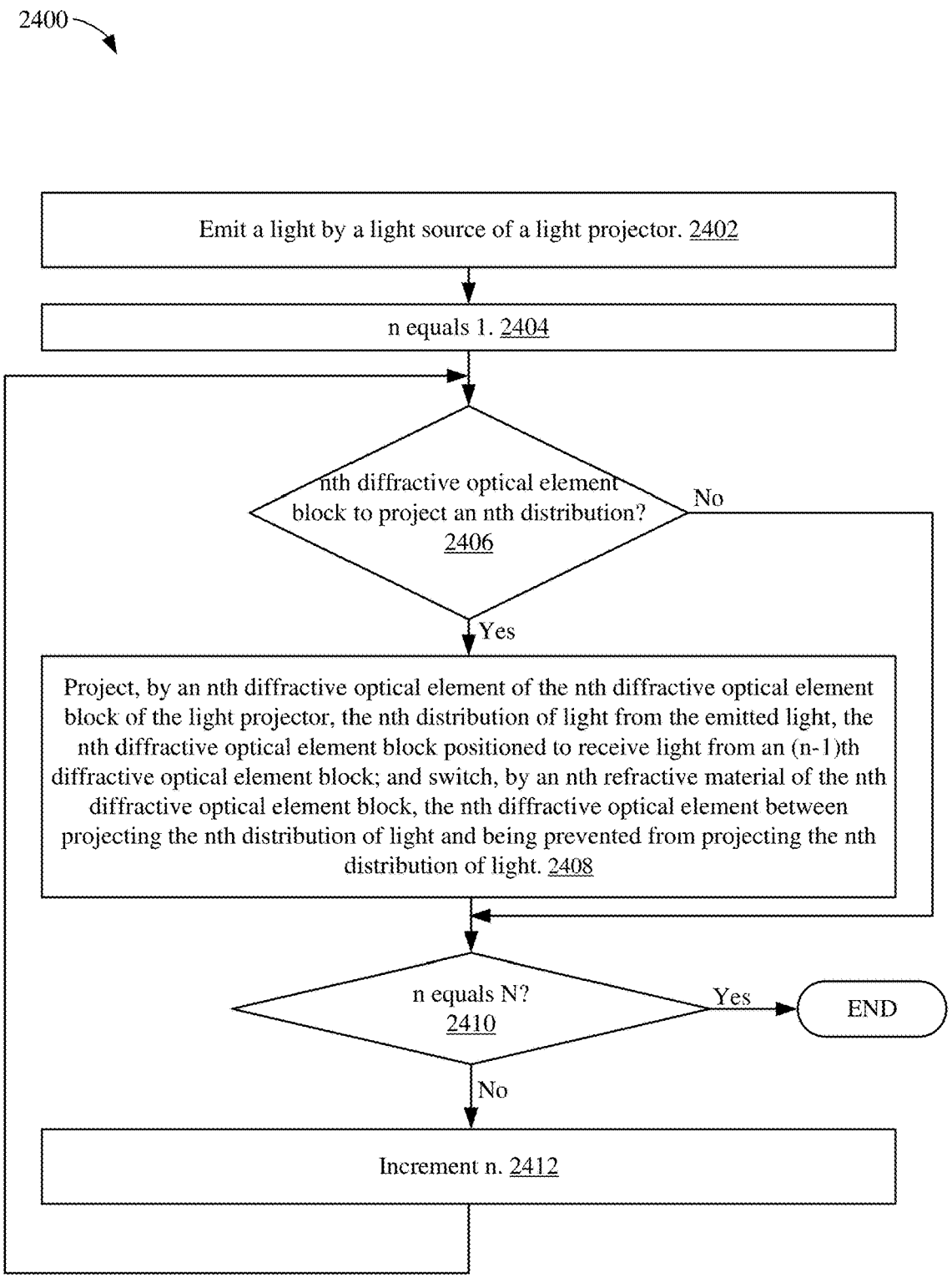
FIG. 24 shows a flowchart illustrating another example process for light projection according to some implementations.

FIG. 24 shows a flowchart illustrating an example process 2400 for light projection according to some implementations. In some implementations, the process 2400 may be performed by the transmitter or projector 601 of the device 600 (FIG. 6). A light source of the light projector may emit a light (2402).

Referring to 2404, the device 600 may set a recursive loop variable (e.g., n) equal to an initial value (e.g., 1). Referring to 2406, the device 600 may determine whether a diffractive optical element (DOE) block of the light projector is to project a distribution of light. In the example of n=1, at 2406, the device 600 may determine whether an nth (e.g., first, in this example) DOE block of the light projector is to project an nth (e.g., first, in this example) distribution of light.

If the nth DOE block is to project the nth distribution, an nth DOE of the nth DOE block may project the nth distribution of light from the emitted light. The nth DOE block may be positioned to receive light from an (n−1)th DOE block. The first DOE block may not receive light from a previous DOE block when n=1(1−1=0). Instead, when n=1, the first DOE block may receive light directly from the light source or from a fixed (e.g., always-on) DOE. Still referring to 2408, an nth refractive material of the nth DOE block may switch the nth DOE between projecting the nth distribution of light and being prevented from projecting the nth distribution of light. In some implementations, the device 600 may include one or more controls (e.g., the light controller 610 and/or the processor 604) configured to, and/or conditions by which to, switch the nth DOE between projecting the nth distribution of light and being prevented from projecting the nth distribution of light. As some non-limiting examples, the light controller 610 may be configured to switch based on one or more of: an interference level being greater than a threshold, an application being executed by the device, a level of ambient light for illuminating the scene falling below a threshold, and/or any other appropriate condition for switching the nth DOE between projecting the nth distribution of light and being prevented from projecting the nth distribution of light. In some implementations, one or more (and up to all) of the DOE blocks of the light projector may be configured to transition the light projector between a plurality of modes.

Regardless of whether the transmitter 601 is to project the nth distribution, referring to 2410, the device 600 may determine whether n=N, where N is equal to a predetermined maximum value, and n is the recursive loop variable described above. In a non-limiting example, n=1 and N=100. Since 1≠100, in this example, the device 600 may increment n (e.g., by 1) so that n=2 (2412). The method may then return to 2406.

As a non-limiting example starting from 2412 (and where N=100), the device 600 may increment n to 2. Returning to 2406, the device 600 may then determine whether a second (n=2) DOE block is to project a second (n=2) distribution. If so, then during the "project" and "switch" step at 2408, the second (n=2) DOE block may be positioned to receive light from the first (n−1=1) DOE block. In either case, since 2≠100 at 2410, the device 600 may increment n to 3 at 2412. Returning to 2406, the device 600 may then determine whether a third (n=3) DOE block is to project a third (n=3) distribution. If so, then during the "project" and "switch" step at 2408, the third (n=3) DOE block may be positioned to receive light from the second (n−1=2) DOE block. In either case, since 3≠100 at 2410, the device 600 may increment n to 4 at 2412. The recursive loop of this non-limiting example may continue until the device 600 increments n to 100 at 2412 and returns to 2406, where the device 600 may determine whether a hundredth (n=100) DOE block is to project a hundredth (n=100) distribution. If so, then during the "project" and "switch" step at 2408, the hundredth (n=100) DOE block may be positioned to receive light from the ninety-ninth (n−1=99) DOE block. In either case, since n=100=N at 2410, the example method ends. It will be understood that N could be any appropriate value.

In some implementations (e.g., such as for a "Passive DOE Block," as described in connection with, for example, FIG. 17), a first DOE block (e.g., such as the first DOE block described above) further includes a polarity rotator configured to rotate a polarity of the received light (e.g., during 2408). A first DOE of the first DOE block may be configured to diffract the received light when the polarity rotator rotates the polarity to a first polarization. The first DOE may be configured to not affect the received light when the polarity rotator rotates the polarity to a second polarization.

In some implementations (e.g., such as for a "Passive DOE Block," as described in connection with, for example, FIG. 17), the light projector may include a diffractive element having a number (n) of cascaded DOE blocks including a first, second, and up to an nth DOE block, wherein each of the n DOE blocks are positioned to receive light from the light source, and wherein the light source is a polarized laser. Each of the n DOE blocks may include a DOE, a substrate, a birefringent material between the DOE and the substrate, and a polarity rotator. The birefringent material may be a liquid crystal (LC) having a number of molecules aligned along a c-axis in parallel with the DOE and the substrate. Each of the n DOE blocks may have a refractive index, wherein each of the birefringent materials has an ordinary refractive index and an extraordinary refractive index. A difference between the refractive index and one of the ordinary refractive index and the extraordinary refractive index may be below a threshold. In some aspects, the polarity rotator may be configured to rotate a polarity of the received light, the DOE may diffract the received light when the polarity rotator rotates the polarity to a first polarization, and the DOE may not affect the received light when the polarity rotator rotates the polarity to a second polarization. In some aspects, the second polarization may be 90 degrees to the first polarization. The diffractive element may be configured to project a final distribution of light according to one of a number of combinations of light. Each of the number of combinations of light may be a combined projection from each of the n DOE blocks that are diffracting light. In some aspects, the number of combinations may be equal to $2^n$.

In some implementations (e.g., such as for a "Passive DOE Block," as described in connection with, for example, FIG. 17), the diffractive element may further include one or more always-on DOEs that diffract the received light irrespective of a polarity of the received light. The diffractive element may be configured to project a final distribution of light that is a combined projection from the always-on DOEs and each of the n DOE blocks that are diffracting light. In some aspects, each of the n DOE blocks may be configured to project at least one projection from the group consisting of: a distribution having a first resolution, a distribution having a second resolution different from the first resolution, and a distribution of diffused light.

In some implementations (e.g., such as for an "Active DOE Block," as described in connection with, for example, FIG. 21), a first DOE block (e.g., such as the first DOE block described above) may include a liquid crystal (LC) having a number of molecules. An orientation of the number of molecules may be based on whether a pair of electrodes is applying a voltage to the LC.

In some implementations (e.g., such as for an "Active DOE Block," as described in connection with, for example, FIG. 21), the light projector may include a diffractive element having a number (n) of cascaded DOE blocks including a first, second, and up to an $n^{th}$ DOE block, wherein each of the n DOE blocks are positioned to receive light from the light source, and wherein the light source is one of a polarized laser or a non-polarized laser. Each of the n DOE blocks may include a DOE, a substrate, a birefringent material between the DOE and the substrate, and a pair of electrodes fabricated on the DOE and the substrate. The birefringent material may be a liquid crystal (LC) having a number of molecules. An orientation of the number of molecules may be based on whether the pair of electrodes is applying a voltage to the birefringent material. In some implementations, when the pair of electrodes does not apply a voltage to the birefringent material, the number of molecules may be randomly oriented, the LC may be isotropic, and the LC may have a first refractive index. In some implementations, when the pair of electrodes applies a voltage greater than a threshold to the birefringent material, the LC may be birefringent, and the LC may have a second refractive index different from the first refractive index. In some aspects, each of the n DOE blocks may have a refractive index, and a difference between the refractive index and one of the first refractive index and the second refractive index may be below a threshold.

In some implementations (e.g., such as for an "Active DOE Block," as described in connection with, for example, FIG. 21), the pair of electrodes may be configured to selectively apply a voltage to the DOE. In some aspects, the DOE may diffract the received light when the pair of electrodes applies a voltage to the DOE, and the DOE may not affect the received light when the pair of electrodes does not apply a voltage to the DOE. In some aspects, the pair of electrodes may be configured to not apply a voltage to the DOE when a difference between the refractive index and the first refractive index is below a threshold.

In some other implementations (e.g., such as for an "Active DOE," as described in connection with, for example, FIG. 21), the pair of electrodes may be configured to selectively apply a voltage to the DOE. In some aspects, the DOE may diffract the received light when the pair of electrodes does not apply a voltage to the DOE, and the DOE may not affect the received light when the pair of electrodes applies a voltage to the DOE. In some aspects, the pair of electrodes may be configured to apply a voltage to the DOE when a difference between the refractive index and the second refractive index is below a threshold.

In some implementations (e.g., such as for an "Active DOE Block," as described in connection with, for example, FIG. 21), the diffractive element may be configured to project a final distribution of light according to one of a number of combinations of light. Each of the number of combinations of light may be a combined projection from each of the n DOE blocks enabled by the pair of electrodes. In some aspects, the number of combinations may be equal to $2^n$.

In some implementations (e.g., such as for an "Active DOE Block," as described in connection with, for example, FIG. 21), the diffractive element may further include one or more always-on DOEs that diffract the received light irrespective of whether any of the pairs of electrodes are applying the voltage. In some aspects, each of the n DOE blocks may be configured to project at least one projection from the group consisting of: a distribution having a first resolution, a distribution having a second resolution different from the first resolution, and a distribution of diffused light.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 606 in the example device 600 of FIG. 6) comprising instructions 608 that, when executed by the processor 604 (or the controller 610 or the signal processor 612), cause the device 600 to perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 604 or the signal processor 612 in the example device 600 of FIG. 6. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. For example, while the projectors are illustrated as including a lens to direct light toward a diffractive element, a projector may not include a lens or may include multiple lenses. In another example, while two elements of a diffractive element are described (such as a diffusion element and a DOE for light distribution, or two DOEs for different light distributions), any number of DOEs and/or diffusion elements may exist in the diffractive element, and multiple refractive materials may exist in the diffractive element. In another example, the electricity applied by the device or light projector in adjusting the projection may be alternating current (AC) or direct current (DC), and the voltage may be constant or non-constant. The electricity therefore may be any suitable electricity for adjusting the projection. Additionally, the functions, steps or actions of the method claims in accordance with aspects described herein need not be performed in any particular order unless expressly stated otherwise. For example, the steps of the described example operations, if performed by the device 600, the controller 610, the processor 604, and/or the signal processor 612, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A device comprising a light projector, the light projector comprising:
    a light source configured to emit a light;
    a first diffractive optical element block positioned to receive light from the light source, the first diffractive optical element block comprising:
        a first diffractive optical element configured to project a first distribution of light from the emitted light; and
        a first refractive material configured to switch the first diffractive optical element between projecting the first distribution of light and being prevented from projecting the first distribution of light; and
    a second diffractive optical element block positioned to receive light from the first diffractive optical element block, the second diffractive optical element block comprising:
        a second diffractive optical element configured to project a second distribution of light from the emitted light; and
        a second refractive material configured to switch the second diffractive optical element between projecting the second distribution of light and being prevented from projecting the second distribution of light,
        wherein the light projector is configured to transition between a plurality of modes using at least one of the first diffractive optical element block and the second diffractive optical element block.

2. The device of claim 1, wherein the first refractive material is positioned between the light source and the first diffractive optical element, and wherein the second refractive material is positioned between the first diffractive optical element and the second diffractive optical element.

3. The device of claim 1, wherein the emitted light that enters the first refractive material has a first polarity in a first mode of the plurality of modes and wherein the emitted light that enters the second refractive material has a second polarity in a second mode of the plurality of modes, wherein the first polarity is rotated relative to the second polarity.

4. The device of claim 3, further comprising:
a first polarity rotator between the light source and the first refractive material, the first polarity rotator configured to rotate the first polarity based on a first refractive index of the first refractive material; and
a second polarity rotator between the first diffractive optical element and the second refractive material, the second polarity rotator configured to rotate the second polarity based on a second refractive index of the second refractive material.

5. The device of claim 1, further comprising a diffractive element comprising at least the first diffractive optical element block, the second diffractive optical element block, and a fixed diffractive optical element between the light source and the first diffractive optical element, the fixed diffractive optical element configured to project a fixed distribution of light from the emitted light during all of the plurality of modes.

6. The device of claim 1, further comprising a diffractive element comprising at least the first diffractive optical element block, the second diffractive optical element block, and a third diffractive optical element block including at least a third diffractive optical element and a third refractive material between the second diffractive optical element and the third diffractive optical element, the third diffractive optical element configured to project a combined distribution of the first and second distributions of light.

7. The device of claim 1, wherein:
during a first mode of the plurality of modes, the first diffractive optical element is activated, the second diffractive optical element is deactivated, and the light projector is configured to project a first projection,
during a second mode of the plurality of modes, the first diffractive optical element is deactivated, the second diffractive optical element is activated, and the light projector is configured to project a second projection,
during a third mode of the plurality of modes, each of the first and second diffractive optical elements are activated, and the light projector is configured to project a third projection including at least the first and second projections, and
during a fourth mode of the plurality of modes, each of the first and second diffractive optical elements are deactivated.

8. The device of claim 1, wherein:
the first diffractive optical element block further comprises a first conductive material coupled to the first refractive material, the first conductive material configured to receive a first signal that applies a first voltage to the first refractive material to transition a state of the light projector to a first mode of the plurality of modes, and
the second diffractive optical element block further comprises a second conductive material coupled to the second refractive material, the second conductive material configured to receive a second signal that applies a second voltage to the second refractive material to transition the state of the light projector to a second mode of the plurality of modes.

9. The device of claim 1, wherein the first and second refractive material each comprise a liquid crystal including liquid crystal molecules having a first overall orientation when electricity is applied and having a second overall orientation when electricity is not applied.

10. The device of claim 1, wherein the plurality of modes comprise the light projector projecting at least one projection from the group consisting of: a flood illumination, a distribution having a first resolution, and a distribution having a second resolution different from the first resolution.

11. The device of claim 1, wherein the light source is configured to emit infrared light.

12. The device of claim 11, further comprising an infrared receiver configured to receive reflections of the infrared light emitted by the light source.

13. The device of claim 12, further comprising one or more processors configured to control the light projector, wherein the device is a wireless communication device comprising one or more wireless transceivers.

14. The device of claim 1, wherein the first diffractive optical element block further comprises a polarity rotator configured to rotate a polarity of the received light, wherein the first diffractive optical element diffracts the received light when the polarity rotator rotates the polarity to a first polarization, and wherein the first diffractive optical element does not affect the received light when the polarity rotator rotates the polarity to a second polarization.

15. The device of claim 1, wherein the first diffractive optical element block comprises a liquid crystal (LC) having a number of molecules, and wherein an orientation of the number of molecules is based on whether a pair of electrodes is applying a voltage to the LC.

16. A method, comprising:
emitting a light by a light source of a light projector;
projecting, by a first diffractive optical element of a first diffractive optical element block of the light projector, a first distribution of light from the emitted light, the first diffractive optical element block positioned to receive light from the light source;
switching, by a first refractive material of the first diffractive optical element block, the first diffractive optical element between projecting the first distribution of light and being prevented from projecting the first distribution of light;
projecting, by a second diffractive optical element of a second diffractive optical element block of the light projector, a second distribution of light from the emitted light, the second diffractive optical element block positioned to receive light from the first diffractive optical element block; and
switching, by a second refractive material of the second diffractive optical element block, the second diffractive optical element between projecting the second distribution of light and being prevented from projecting the second distribution of light, wherein the light projector is configured to transition between a plurality of modes using at least one of the first diffractive optical element block and the second diffractive optical element block.

17. The method of claim 16, wherein the first refractive material is positioned between the light source and the first diffractive optical element, and wherein the second refractive material is positioned between the first diffractive optical element and the second diffractive optical element.

18. The method of claim 16, wherein the emitted light that enters the first refractive material has a first polarity in a first mode of the plurality of modes, and wherein the emitted light that enters the second refractive material has a second polarity in a second mode of the plurality of modes, the method further comprising rotating the first polarity relative to the second polarity.

19. The method of claim 18, further comprising:
rotating, by a first polarity rotator between the light source and the first refractive material, the first polarity based on a first refractive index of the first refractive material; and
rotating, by a second polarity rotator between the first diffractive optical element and the second refractive material, the second polarity based on a second refractive index of the second refractive material.

20. The method of claim 16, further comprising projecting, by a fixed diffractive optical element of a diffractive element of the light projector, a fixed distribution of light from the emitted light during all of the plurality of modes, wherein the fixed diffractive optical element is between the light source and the first diffractive optical element.

21. The method of claim 16, further comprising projecting, by a third diffractive optical element of a third diffractive optical element block of the light projector, a combined distribution of the first and second distributions of light.

22. The method of claim 16, further comprising:
activating the first diffractive optical element, deactivating the second diffractive optical element, and projecting a first projection from the light projector during a first mode of the plurality of modes;
deactivating the first diffractive optical element, activating the second diffractive optical element, and projecting a second projection from the light projector during a second mode of the plurality of modes;
activating each of the first and second diffractive optical elements and projecting a third projection from the light projector during a third mode of the plurality of modes, wherein the third projection includes at least the first and second projections; and
deactivating each of the first and second diffractive optical elements during a fourth mode of the plurality of modes.

23. The method of claim 16, further comprising:
receiving, by a first conductive material coupled to the first refractive material, a first signal that applies a first voltage to the first refractive material to transition a state of the light projector to a first mode of the plurality of modes; and
receiving, by a second conductive material coupled to the second refractive material, a second signal that applies a second voltage to the second refractive material to transition the state of the light projector to a second mode of the plurality of modes.

24. The method of claim 16, wherein the first and second refractive material each comprise a liquid crystal including liquid crystal molecules having a first overall orientation when electricity is applied and having a second overall orientation when electricity is not applied.

25. The method of claim 16, wherein the plurality of modes comprise the light projector projecting at least one projection from the group consisting of: a flood illumination, a distribution having a first resolution, and a distribution having a second resolution different from the first resolution.

26. The method of claim 16, further comprising:
emitting, by the light source, infrared light; and
receiving, by an infrared receiver, reflections of the infrared light emitted by the light source.

27. The method of claim 26, further comprising controlling, by one or more processors, the light projector, wherein the light projector is a wireless communication device comprising one or more wireless transceivers.

28. The method of claim 16, further comprising:
rotating, by a polarity rotator of the first diffractive optical element block, a polarity of the received light;
diffracting, by the first diffractive optical element, the received light when the polarity rotator rotates the polarity to a first polarization; and
not affecting, by the first diffractive optical element, the received light when the polarity rotator rotates the polarity to a second polarization.

29. The method of claim 16, wherein the first diffractive optical element block comprises a liquid crystal (LC) having a number of molecules, and wherein an orientation of the number of molecules is based on whether a pair of electrodes is applying a voltage to the LC.

30. A device, comprising:
means for emitting a light;
means for projecting a first distribution of light from the emitted light;
means for switching the means for projecting the first distribution of light between projecting the first distribution of light and being prevented from projecting the first distribution of light;
means for projecting a second distribution of light from the emitted light; and
means for switching the means for projecting the second distribution of light between projecting the second distribution of light and being prevented from projecting the second distribution of light, wherein the device is configured to transition between a plurality of modes using at least one of the means for projecting the first distribution of light and the means for projecting the second distribution of light.

* * * * *